(12) United States Patent
Pendell

(10) Patent No.: US 6,788,031 B2
(45) Date of Patent: Sep. 7, 2004

(54) INDUCTION GENERATOR SYSTEM AND METHOD

(76) Inventor: Larry Stuart Pendell, 30068 Westlake Dr., Elkhart, IN (US) 46514

(*) Notice: Subject to any disclaimer, the term of this patent is extended or adjusted under 35 U.S.C. 154(b) by 0 days.

(21) Appl. No.: 10/056,371

(22) Filed: Jan. 24, 2002

(65) Prior Publication Data

US 2003/0094929 A1 May 22, 2003

(51) Int. Cl.$^7$ ............................. H02P 9/00; H02P 9/46; H02P 9/40
(52) U.S. Cl. ............................ 322/44; 322/47; 322/49; 322/51; 322/52
(58) Field of Search .......................... 322/44, 47, 49, 322/51–52

(56) References Cited

U.S. PATENT DOCUMENTS

| | | | |
|---|---|---|---|
| 4,132,932 A | | 1/1979 | Wanlass ..................... 318/795 |
| 4,152,630 A | * | 5/1979 | Wanlass ..................... 318/796 |
| 4,187,457 A | * | 2/1980 | Wanlass ..................... 318/729 |
| 4,228,391 A | | 10/1980 | Owen .......................... 322/35 |
| 4,242,628 A | | 12/1980 | Mohan et al. ................. 322/35 |
| 4,417,194 A | | 11/1983 | Curtiss et al. ................. 322/47 |
| 4,484,125 A | * | 11/1984 | Hertz .......................... 318/768 |
| 4,761,602 A | * | 8/1988 | Leibovich ................... 318/816 |
| 4,786,853 A | | 11/1988 | VanMaaren .................. 322/75 |
| 4,792,740 A | * | 12/1988 | Smith .......................... 318/768 |
| 4,808,868 A | | 2/1989 | Roberts ....................... 310/68 |
| 4,896,063 A | * | 1/1990 | Roberts .................... 310/68 R |
| 4,959,573 A | * | 9/1990 | Roberts .................... 310/68 R |
| 5,039,933 A | | 8/1991 | Dong .......................... 322/47 |
| 5,065,305 A | * | 11/1991 | Rich ........................... 363/150 |
| 5,134,332 A | * | 7/1992 | Nakamura et al. .......... 310/208 |
| 5,300,870 A | * | 4/1994 | Smith .......................... 318/768 |
| 5,424,626 A | | 6/1995 | Roberts ....................... 323/208 |
| 5,434,496 A | | 7/1995 | Roberts ....................... 323/208 |
| 5,486,739 A | | 1/1996 | Roberts ....................... 315/277 |
| 5,545,965 A | * | 8/1996 | Smith .......................... 318/768 |
| 5,598,079 A | * | 1/1997 | Robert ........................ 318/780 |
| 5,986,438 A | * | 11/1999 | Wallace et al. ............... 322/20 |
| 6,020,725 A | | 2/2000 | Roberts ....................... 322/90 |
| 6,049,188 A | * | 4/2000 | Smith .......................... 318/786 |
| 6,331,760 B1 | * | 12/2001 | McLane, Jr. ................. 318/767 |
| 6,356,041 B1 | * | 3/2002 | Smith .......................... 318/34 |

OTHER PUBLICATIONS

"Using Induction Motors as Generators," via Internet at http://www.smallhydropower.com/induction.htm, p.1.
"AC Fundamentals," via Internet at http://onlinetools.chip-center.com/netsim/tesla/acbasics.html, pp. 1–4.
"Dual Stator Winding Induction Machine Drive," *Wisconsin Alumni Research Foundation*, via Internet at http://wiscinfo.wisc.edu/warf.boi/p98173us.html, p.1.
Arthur D. Little. "Distributed Generation: System Interfaces," pp. 1–25.

* cited by examiner

Primary Examiner—Burton S. Mullins
Assistant Examiner—Pedro J. Cuevas
(74) Attorney, Agent, or Firm—Richard F. Frankeny; Winstead Sechrest & Minick P.C.

(57) ABSTRACT

An induction generator having one or more energy windings and one or more auxiliary windings where the auxiliary windings have fixed and switched capacitors which are used to control the induction generator output under variable load conditions. The auxiliary windings are electrically and magnetically isolated from the energy windings. The fixed capacitors are used under minimum load condition and the switched capacitors added in response to controls signals. The control signals are determined by analyzing the load voltage and current and the voltage across the particular capacitor being added. The induction generator is included in systems where the generator is rotationally driven by an engine and which couples the energy windings to a power grid and/or to a variable load. The engine may also employ a controller that receives the load current and voltage signals to determine engine speed.

11 Claims, 60 Drawing Sheets

INDUCTION GENERATOR SYSTEM AND METHOD

TECHNICAL FIELD

The present invention relates in general to induction machines and in particular to rotating induction generators and motors.

BACKGROUND INFORMATION

Induction machine refers to a broad class of electromagnetic machines where force or rotational torque or electrical energy are produced by the interaction of a driven and a generated magnetic field and currents which occur because of induction. A rotating induction motor or generator is one of these induction machines. To create a rotating induction motor a cylindrically shaped stator or stationary element has stator coils that are disposed into slots in a magnetic material. A cylindrical rotor or rotating magnetic material element is disposed on the same center line as the stator and mechanically rotates on bearings placed outside the stator. The rotor typically has slots parallel to its center line and on the outside surface of the rotor into which conducting (typically copper) bars, which are electrically isolated from the rotor magnetic material, are placed. These conductor bars are then electrically connected on both ends of the rotor creating a number of loops of conductors wherein the axis perpendicular to the plane formed by each loop is perpendicular to the axial center line of the cylindrical rotor. Magnetic flux that couples through each of these conducting loops of the rotor may induce (by magnetic induction) currents to flow in the conductors. The interaction of the current in the rotor conductor loops and a rotating magnetic field is used to either create a motor (rotational torque producing machine) or a generator (alternating current producing machine).

Induction machines employing multiple phased electrical excitation may easily produce a rotating magnetic field by judicious placement of the stator coils around the cylindrical stator and proper connection of the coils so that the direction of the current flow in the coils creates magnetic fields that interact with corresponding induced currents in the rotor conducting coils.

When an induction machine is operated as a motor, then an energy source (e.g., a three-phase power line) is connected to the stator coils and the current that flows in the stator coils produces a magnetic field that in turn couples with corresponding rotor conductor loops which also produce a magnetic field. The stator field rotates because of the fact that the stator coils are driven by voltages with a shifted phase relationship (typically, 120 electrical degrees apart). The rotating magnetic field will create a torque on currents induced in the rotor conductor loops and the rotor will begin to rotate. Since the rotational speed of the magnetic field is dictated by the frequency of the energy source, the rotor rotation speed will lag that of the magnetic field of the stator. Depending on the torque load on the rotor shaft and the magnitude of the stator rotating field and the induced currents in the rotor, the rotor accelerates up to a rotation speed that is close to but slightly (a few percent) slower or higher than the rotation speed of the magnetic field. In the case of the motor, the excitation for the field of the rotor is provided by induction from the magnetic field of the stator coils. Multiple phased induction motors other than three phases are possible by the proper choice of the stator and rotor coils and the placement in the stator and rotor magnetic structures respectively. A single phase induction motor is also possible even though a single phase stator does not produce a rotating magnetic field. In the single phase induction motor the stator windings and the field windings are placed so that their axes are orthogonal (90 degrees).

Induction generators require some energy source to provide excitation of the field windings. This excitation along with providing mechanical rotation of the rotor conducting loops, enable energy stored in the field of the rotor windings to be transferred to an output or energy winding. In applications where the AC power grid of the power company provides the excitation of the generator, an engine may be used to rotate the rotor above a synchronous speed to allow the generator to both supply current to a load and also supply energy back to the grid. However, if a standalone operation is desired, then some other source of excitation must be supplied in case the power grid is disconnected or fails.

To run an induction generator in a stand-alone mode requires that another excitation source. This may be done by providing a field winding separate from an energy or output winding and driving the field windings with the separate excitation source wherein the frequency of the energy supplied to the output is governed by the rotational speed of the rotor. If auxiliary field windings with corresponding energy storage capacitance are added to the stator, then a self-excited induction generator is also possible. Residual magnetism in the rotor is usually adequate to start a process of self-excitation. The residual magnetic field, by rotating the rotor will excite by induction the auxiliary winding with the corresponding capacitance and cause the capacitor to be charged to a voltage which sometime later creates a current in the winding inductance. This current, in turn, induces a current in the rotor loops which again excites another auxiliary winding until the fields in the auxiliary windings reach a steady state with an excitation frequency dependent of the rotational speed of the rotor. To obtain optimal efficiency, there is a phase relationship between a field current and the corresponding output or stator current. However, this phase relationship may be influenced by the load current supplied by the stator winding receiving stored energy from the rotor. To keep a self-excited induction generator operating efficiently, the currents in the auxiliary field winding may have to be adjusted to generate a stable output with a variable load.

Producing a stand-alone induction generator which may supply a load when driven from a prime mover (e.g., engine), an induction generator operable to power condition energy from the AC power grid, and an induction system where energy may be supplied to the AC power grid, a variable load, or both, is desirable because of the low cost and simplicity of the induction machine. There have been many attempts to control the output of a self-excited induction generator, but no commercially viable system is on the market. There is therefore a need for an induction machine design where all the induction machine combinations are possible while allowing the induction machine to be controlled to produce energy efficiently with a low distortion and stable output voltage.

SUMMARY OF THE INVENTION

An induction generator which may have various configurations has one or more energy windings. The induction generators have one or more energy windings which may be electrically and magnetically isolated from each other by their relative positions as they are wound on the stator. Additionally, auxiliary windings are placed on the stator so that they are electrically isolated and either magnetically isolated from or coupled to the energy windings. The auxiliary windings have a no load capacitor placed across (in parallel) with individual coils of the auxiliary winding. Each winding also has a capacitor which may be selectively coupled (in parallel) with an individual coil by an electronic AC switch in series with the capacitor by gating the electronic AC switch with a load control signal. Each load control signal is generated in response to feedback signals comprising parameters of the voltage across each capacitor, an energy winding load voltage and the corresponding load current. Induction systems are constructed using variations of the induction generator to produce a stand-alone induction generator driven by a prime mover (e.g., engine) to supply an isolated load, an induction generator wherein the field is supplied by an AC power grid and the induction generator supplies power to the AC grid and/or an isolated load. Also a combination induction generator system is produced where the induction system receives energy from or supplies energy to the AC grid on a first energy winding and supplies an isolated load on a second energy winding wherein the efficiency, losses, and output voltage are regulated by feedback signals used to control of the capacitor combinations coupled to the auxiliary windings within the induction generator.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
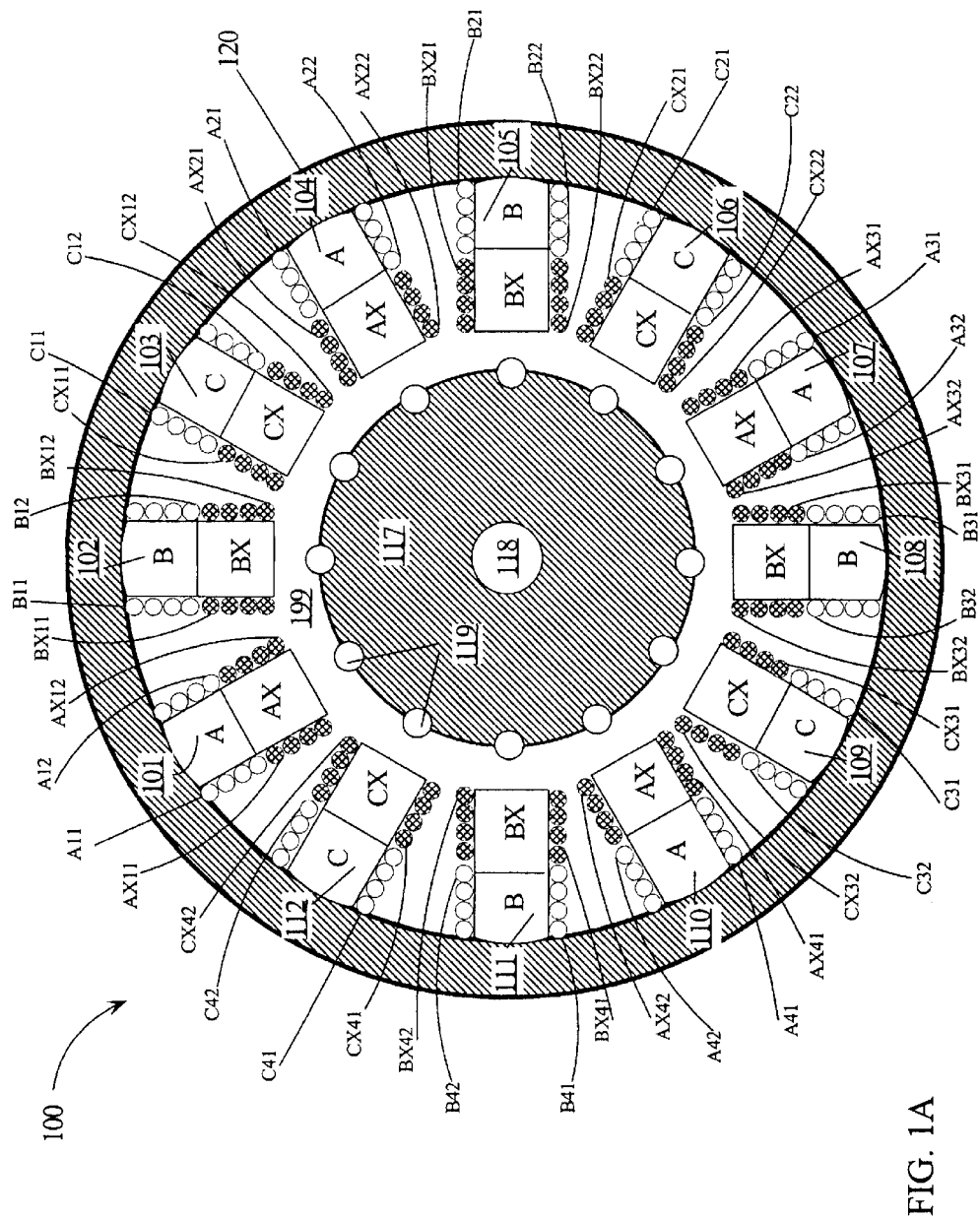
FIG. 1A illustrates a cross-section of an induction machine with a three-phase four pole energy and auxiliary winding structure used in embodiments of the present invention where the auxiliary winding is magnetically coupled to the energy windings and electrically isolated from the energy windings.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Refer to FIG. 1A for an explanation of terminology that will be used throughout this description to explain embodiments of the present invention. FIG. 1A is a cross-section of an induction machine used in one of the embodiments of the present invention. Coils on like designated "teeth" (e.g., A, B, C, AX, BX, CX) may be electrically coupled in series or parallel with the current flow direction dictating the electrical terminal connections to create particular magnetic poles (North or South) on a give tooth. In the figures a number on a tooth (e.g., 101 in FIG. 1A) designates a particular tooth and the letters (e.g., A) designates a particular coil wound on that tooth (e.g., A101, AX101). For example, see FIG. 5B. This graphic representation is not meant to describe how actual motors are wound in practice, but rather to show the topology of the coils and the different magnetic and electrical configurations covered in the present invention.

Coils with like letter designators are coupled together to create a winding branch of either a single phase winding (only one pair of input or output terminals) or a three phase winding (three of four input or output terminals) depending on whether it is a three phase Wye or Delta configuration. The terminology and convention used in the figures are used to simplify the explanation of embodiments of the present invention.

The "X" designator on a coil (e.g., AX) is used to indicate an "auxiliary" or control coil for auxiliary windings. Single letter designators (e.g., A, B, C) designate "energy" coils used to make input (motor) or output (generator) energy windings. Each coil has two terminals, for example, coil A101 has terminals A11 and A12. A second "A" coil, for example, coil A104 has terminals A21 and A22. Designating the coil terminals in this manner enables the different electrical coil connections to be more easily understood.

Figure 5A:
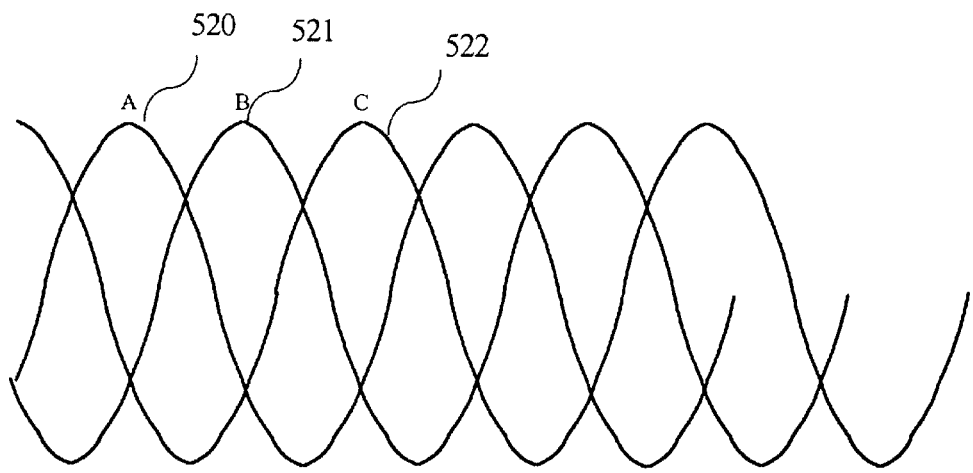
FIG. 5A is a diagram of three phase currents or voltages which supplied to or resulting from embodiments of the present invention with three phase energy or auxiliary windings.
Figure 5B:
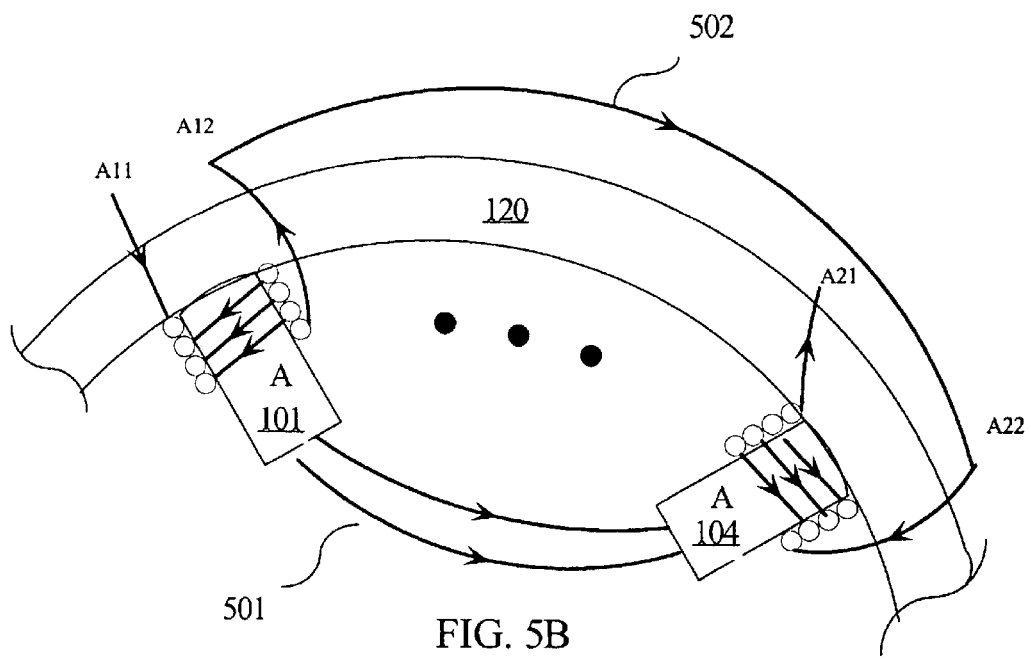
FIG. 5B is a diagram of a portion of a rotor from FIG. 1 showing a connection of energy coils and the corresponding current flow and resulting magnetic flux lines according to one connection of energy coils.

FIG. 5B illustrates coupling coils A101 and A104 to create a North magnetic pole at tooth 101 and a South magnetic pole at tooth 104. Terminals A12 and A22 are electrically connected so that the direction of coil current 502, for an applied potential between A11 and A21, creates flux lines 501. Since the voltage potential between A11 and A21 results in an alternating current (AC) circuit, the flux lines 501 represent a direction only in a particular time interval where the potential difference from A11 to A21 is positive.

FIG. 1A illustrates an embodiment of the present invention where the inductive machine 100 is configured so that the coils (A101, A104, A107, A110, B102, B105, B108, B111, C103, C106, C109, C112) maybe interconnected to create an induction machine with three phase (A, B, C) energy windings in a four-pole configuration. Likewise, "auxiliary coils" (AX101, AX104, AX107, AX110, BX102, BX105, BX108, BX111, CX103, CX106, CX109, CX112) may be interconnected to create three phase auxiliary windings that are magnetically coupled to (wound on the same teeth) but electrically isolated from the energy windings. FIG. 5A is a waveform diagram of three phase waves A520, B521 and C522 (voltage or current) approximately 120 electrical degrees apart.

Induction machine 100 has a stator 120 with "teeth" 101–112 on which corresponding coils, A101, A104, A107, A110, B102, B105, B108, B111, C103, C106, C109, C112, AX101, AX104, AX107, AX110, BX102, BX105, BX108, BX111, CX103, CX106, CX109, and CX112 are wound. Rotor 117 is rotatably disposed within and on the center axis of the stator 120 and rotates on shaft 118. Rotor 117 has coils (e.g., rotor coils 119) wound in slots on it outer surface. Magnetic flux lines (e.g., like 501 in FIG. 5B) couple to the rotor 117 and thus to rotor coils through the circumferential air gap 199 between the rotor 117 and stator 120. Rotor coils like exemplary coils 119 are typically shorted loops which create what is termed a "squirrel cage" rotor design.

Figure 1B:
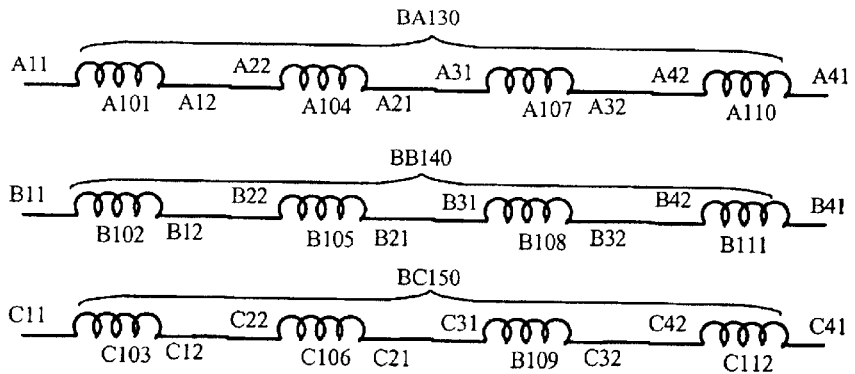
FIGS. 1B and 1C are circuit diagrams illustrating connections of individual coils for a branch energy winding and an auxiliary winding for the induction machine in FIG. 1A.

FIG. 1B is a circuit diagram of the connection sequence for the coils (e.g., A101, A104, A107, A110) on stator teeth 101–112. The particular electrical connection of the terminals, A12 to A22 and A21 to A31 and A32 to A42, for coils A101, A104, A107, A110, creates a North magnetic pole at tooth 101 and a South magnetic pole at tooth 104 for a current flow into terminal A11 and out of terminal A42. The connection of coils A101, A104, A107, A110, in FIG. 1B creates a branch winding BA130. A same connection sequence for coils B102, B105, B108, B111 (B12 to B22 and B21 to B31 and B32 to B42) creates a branch winding BB140. For a current flow into terminal B11 and out of terminal B41, branch winding BB140 creates a North magnetic pole at tooth 102 and a South magnetic pole at tooth 105. Likewise a same connection sequence for coils C103, C106, C109, and C112 (C12 to C22 and C21 to C31 and C32 to C42) create a branch winding BC150. For a current flow into terminal C11 and out of terminal C41, branch winding BC150 creates a North magnetic pole at tooth 103 and a South magnetic pole at tooth 106.

Figure 1C:
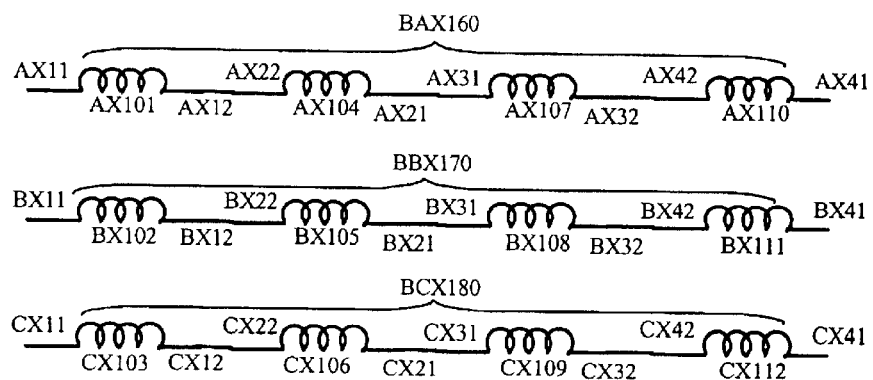

FIG. 1C is a circuit diagram of the connection sequence for the auxiliary coils AX101, AX104, AX107, AX110 to create auxiliary branch winding BAX160, auxiliary coils BX102, BX105, BX108, BX111 to create auxiliary branch winding BBX 170, and auxiliary coils CX103, CX106, CX109, CX112 to create auxiliary branch winding BCX180. The circuit diagrams in FIG. 1B and FIG. 1C illustrate the symmetrical wiring employed in winding induction machines used in embodiments of the present invention. It should be noted that the branch windings (e.g., BAX160, BBX170 and BCX180) are a series connection of individual inductances that have connections that may be wired outside the stator 120 to enable the connection of additional circuit elements. For example, the connection node of exemplary terminals A12 and A22 may have a connection wired so that additional external components may be used. Embodiments of the present invention use the partitioning of the auxiliary branch windings (e.g., BAX160, BBX170 and BCX180) to create control windings for induction generator configurations.

Figure 1D:
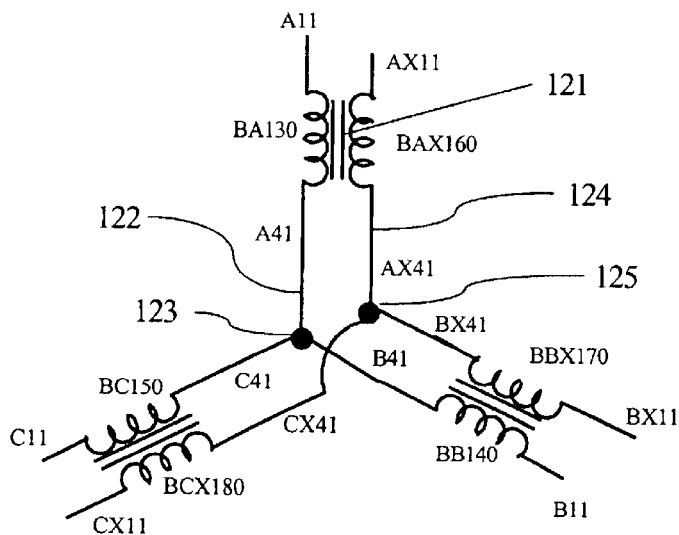
FIG. 1D is a circuit diagram illustrating three phase Wye configured energy and auxiliary windings by connecting the branch windings of FIGS. 1B and 1C.

FIG. 1D is a circuit diagram that illustrates the magnetic and electrical structure created when branch energy windings BA130, BB140 and BC150 are configured as a three phase Wye configured winding 122 by connecting terminals A41, B41 and C41, creating a node 123, and branch auxiliary windings BAX160, BBX170 and BCX180 are also configured as a three phase Wye configured winding 124 by connecting terminals AX41, BX41 and CX41 creating note 125. Nodes 122 and 125 are electrically neutral potential points with respect to the three phase windings 122 and 124, respectively, and may be used in embodiments of the present invention as ground or reference points. Lines 121 indicate that the three phase energy winding 122 and the three phase auxiliary winding 124 are magnetically coupled. Electrical terminals A11, C11 and B11 and node 123 may be wired to external inputs or outputs (not shown). Likewise, electrical terminals AX11, CX11 and BX11 and node 125 may be wired to external circuits to create a control winding according to embodiments of the present invention.

Figure 1E:
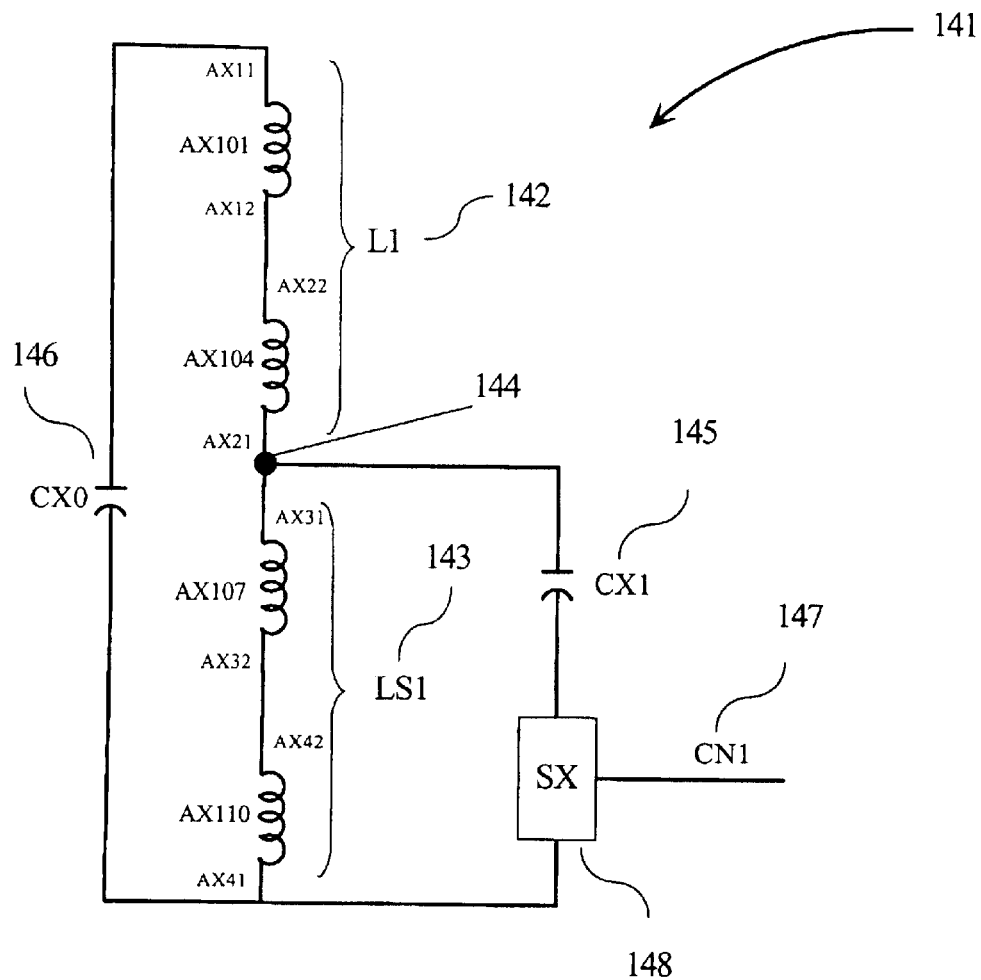
FIGS. 1E, 1F and 1G are circuit diagrams of individual branch windings from FIGS. 1B and 1C wired to control elements to make branch control windings.

FIG. 1E, is a circuit diagram of the inductance elements (coils) AX101, AX104, AX107, and AX110 which make up auxiliary branch winding BAX160, as described in FIG. 1C, wired to form control branch winding 141 according to embodiments of the present invention. Coils AX101 and AX104 form a series inductance L1 142, and coils AX107 and AX110 form a series inductance LS1 143. This is the partitioning of an auxiliary winding discussed herein. The connection of inductances L1 142 and LS1 143 creates a circuit node 144. A series circuit connection of capacitor CX1 145 and electronic AC switch SX 148 are connected from node 144 to electrical terminal AX41 on coil AX110. A second capacitor CX0 146 is connected from electrical terminal AX11 on coil AX101 to terminal AX41 on coil AX110. Electronic AC switch SX 148 has a control input CN1 147 which is used in embodiments of the present invention to switch capacitor CX1 145 into and out of control branch winding 141.

Figure 1F:
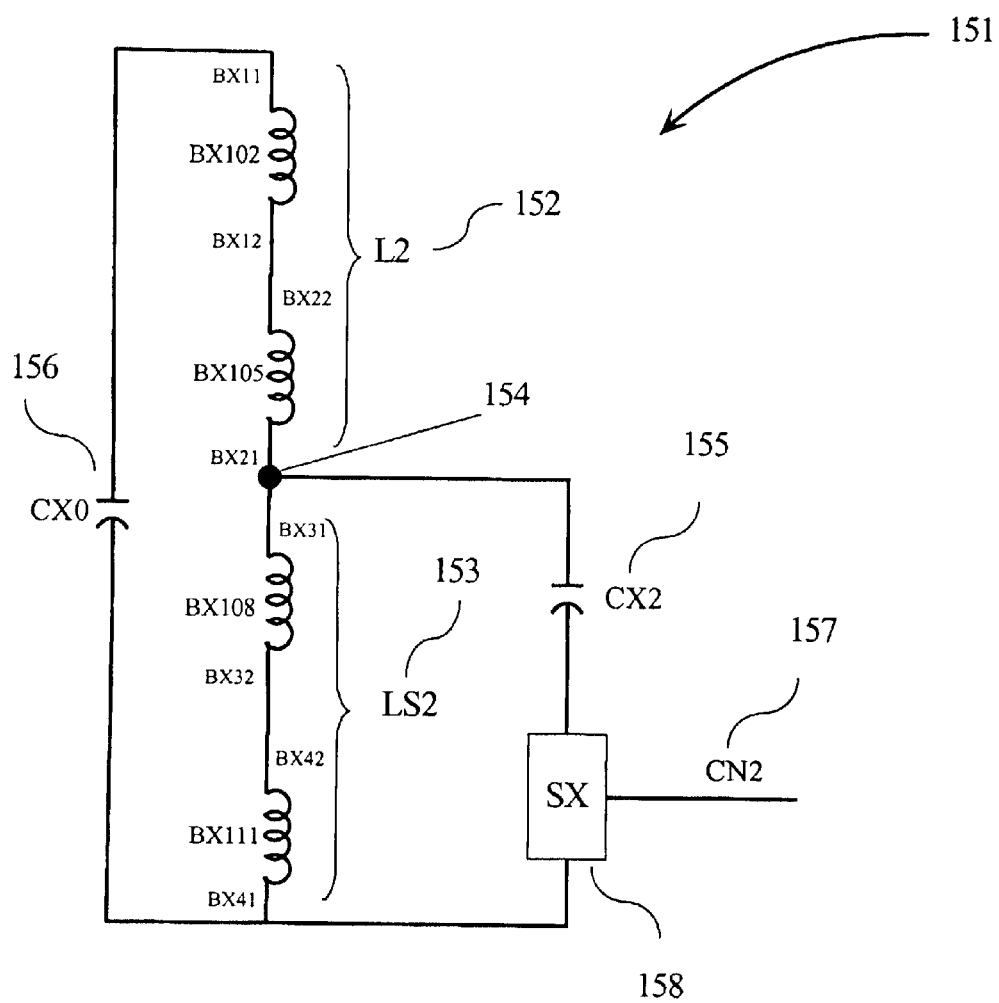

FIG. 1F is a circuit diagram of the inductance elements (coils) BX102, BX105, BX108, and BX111 which make up auxiliary branch winding BBX170, as described in FIG. 1C, wired to form control branch winding 151 according to embodiments of the present invention. Coils BX102 and BX105 form a series inductance L2 152, and coils BX108 and BX111 form a series inductance LS2 153. This is the partitioning of an auxiliary winding discussed herein. The connection of inductances L2 152 and LS2 153 creates a circuit node 154. A series circuit connection of capacitor CX2 155 and electronic AC switch SX 158 are connected from node 154 to electrical terminal BX41 on coil BX111. A second capacitor CX0 156 is connected from electrical terminal BX11 on coil BX102 to terminal BX41 on coil BX11. Electronic AC switch SX 158 has a control input CN2 157 which is used in embodiments of the present invention to switch capacitor CX2 155 into and out of control branch winding 151.

Figure 1G:
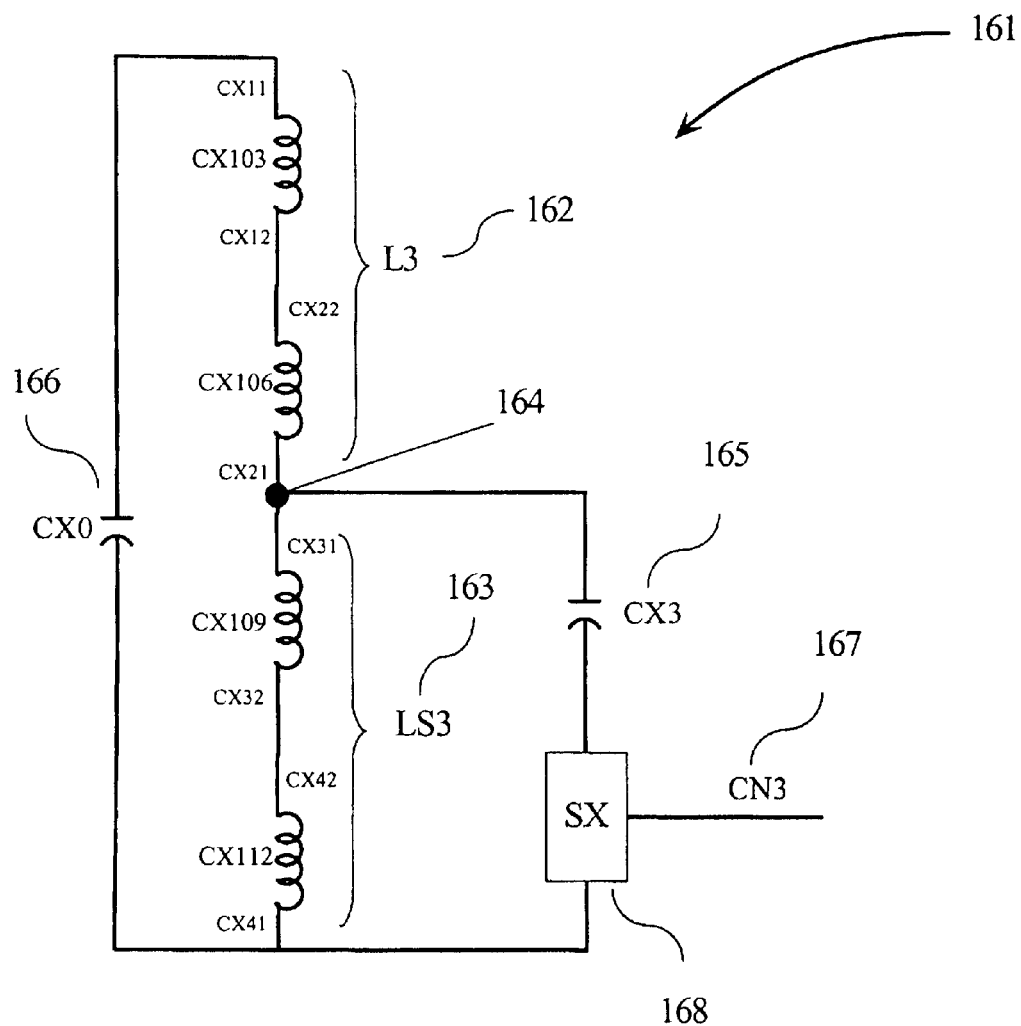

FIG. 1G is a circuit diagram of the inductance elements (coils) CX103, CX106, CX109, and CX112 which make up auxiliary branch winding BCX180, as described in FIG. 1C, wired to form control branch winding 161 according to embodiments of the present invention. Coils CX103 and CX106 form a series inductance L2 162, and coils CX109 and CX112 form a series inductance LS2 163. This is the partitioning of an auxiliary winding discussed herein. The connection of inductances L2 162 and LS2 163 creates a circuit node 164. A series circuit connection of capacitor CX2 165 and electronic AC switch SX 168 are connected from node 164 to electrical terminal CX41 on coil CX111. A second capacitor CX0 166 is connected from electrical terminal CX11 on coil CX103 to terminal CX41 on coil CX112 Electronic AC switch SX 168 has a control input CN3 167 which is used in embodiments of the present invention to switch capacitor CX3 165 into and out of control branch winding 161.

Figure 1H:
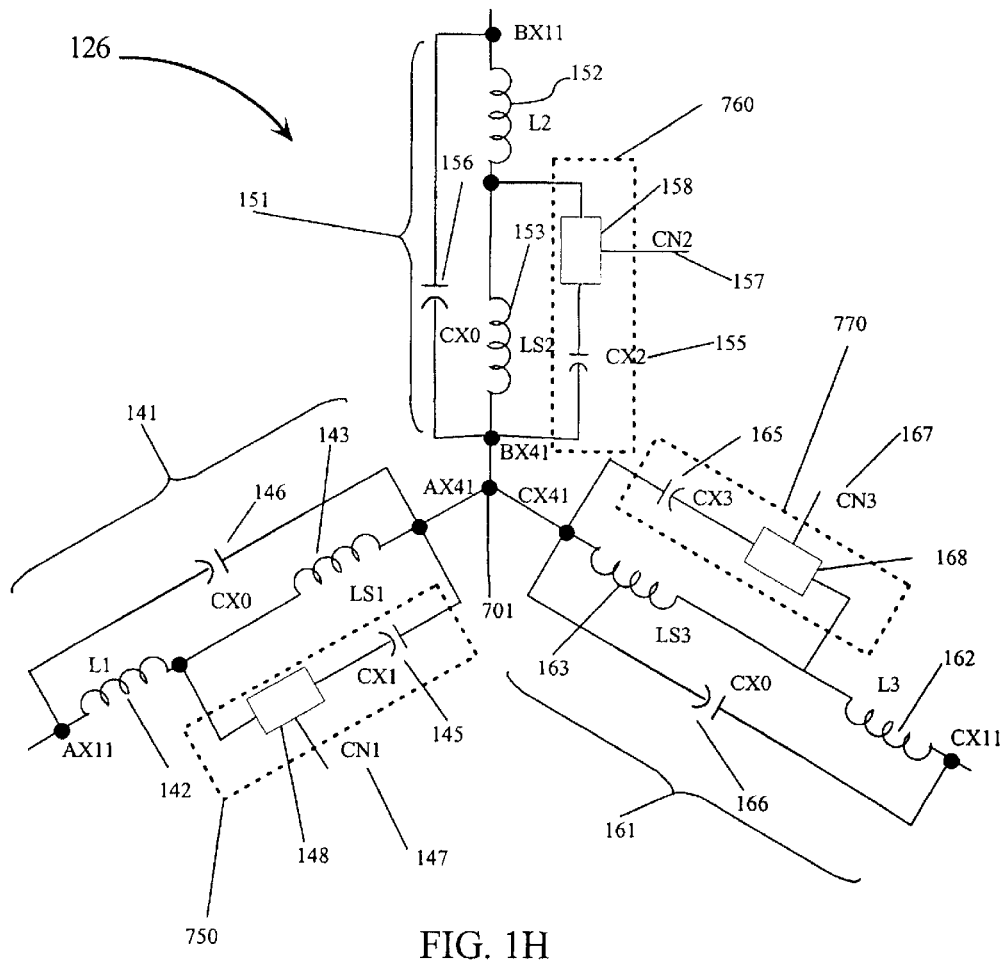
FIG. 1H is a circuit diagram of a Wye configured auxiliary control winding made by connecting control windings in FIGS. 1E, 1F and 1G.

FIG. 1H is a circuit diagram illustrating a three phase control winding 126 according to embodiments of the present invention made by interconnecting branch control windings 141, 151 and 161 described in FIGS. 1E, 1F, and 1G respectively. Control winding 126 is configured as a three phase Wye winding. The electronic switches SX 148, 158 and 168 along with their corresponding switched capacitors CX1 145, 155 and 165 are designated as control elements 750, 760 and 770 respectively. While the particular control elements are shown as having a bi-directional electronic switch (e.g, SX 148, 158 and 168) for connecting and disconnecting capacitors CX1 145, CX2 155 and CX3 165, a continuously electronically controllable capacitor would still be within the scope of the present invention.

Returning to FIG. 1A, induction machine 100 may be operated as a generator by coupling shaft 118 to an engine which is operable to apply torque and thus rotate the rotor 117 at a controlled speed. If the rotor 117 magnetic material has a residual magnetization or is initially magnetized by an external potential, changing flux in the rotor coils (e.g., coils 119) will cause rotor coil currents to flow by induction. The induced rotor coil current will likewise generate a magnetic field which will couple to the coils of control winding 126 and produce current flow in control winding 126 also by induction. Capacitors CX0 146, 156, and 166 will charge and store energy and later return this energy to their corresponding coils. The capacitors CX0 146, 156, and 166 are sized so that they are resonant at a desired frequency (e.g., 60 Hz) with their corresponding branch control coils. The combination of this resonant circuit and the rotational mechanical energy causes the control windings to build up a steady rotating flux field in stator 120. The induction interaction of this control winding 126 field with rotor 117 delivers energy to energy windings 122 when the rotor is rotated at a speed determined by its stator and rotor design (number of poles, teeth and rotor coils). Adding capacitors to the energy windings or to auxiliary windings creates a self-excited induction generator. However, the particular capacitors that need to be added are dependent on the magnitude and the nature of the load that the induction generator is supplying. If capacitors CX0 146, 156, and 166 were to be varied, then additional capacitance would have to be supplied in parallel. This may result in excess current through a switch if the switched capacitor was uncharged, depending on the voltage state of the un-switched capacitor. Embodiments of the present invention isolate the fixed capacitors (CX0 146, 156, and 166) and the switched capacitors (CX1 145, CX2, 155 and CX3 165) by partitioning the control winding. The inductance of the windings will prevent uncontrolled currents from flowing.

Capacitors CX0 146, 156, and 166 may be equal values for a particular induction generator 100 electrical load connected to three phase energy winding 122 (FIG. 1D). However, it has been determined that it is the actual summation of capacitances applied to the energy or auxiliary (control) windings that determine optimum operation for a given induction generator design and load condition. While it may be convenient for CX0 146, 156, and 166 to be of equal values for the embodiment described in FIGS. 1A–1L, it is not a requirement.

Capacitors CX0 146, 156, and 166 may be sized for an optimum condition when a minimum load is connected to energy winding 122. The resonant design of the branch control windings and their corresponding parallel capacitors CX0 146, 156 and 166, result in a self-excited induction generator. If the control winding has capacitors (CX0 146, 156, and 166) sized for a 60 Hz resonance, then rotating the rotor 117 at a speed (revolutions per minute (RPM)) will produce a 60 Hz self-excited induction generator. If the energy winding 122 is coupled to a variable load, then as the load varies, the interaction of the load current with the induced currents in the control windings results in a non-optimum operation. If the capacitors (CX0 146, 156, and 166) could also be varied in response to a varying load, then the optimum operation of the induction generator 100 could be maintained.

Control winding 126 is used in embodiments of the present invention to switch in capacitances (CX1 145, CX2 155 and CX3 165) in response to the changing parameters of the load voltage and load current of a variable load coupled to energy winding 122. By using unequal values for capacitors CX1 145, CX2 155 and CX3 165, the total capacitance on control winding 126 may be made to vary in discrete steps.

In one embodiment of the present invention, all the branch control windings BAX160, BBX170 and BCX180 and their partitions are equal and the capacitors CX0 146, CX0 156, and CX0 166 are likewise equal. However, the capacitors CX1 145, CX2 155 and CX3 165 may not be equal but have a summation equal to a capacitance required for a maximum load condition. One possible configuration for capacitors CX1 145, CX2 155 and CX3 165 has the capacitor values related by a factor of two; CX2 155 is equal to twice CX1 145, and CX3 165 is equal to twice CX2 155. By appropriate gating of the switch elements SX 148, SX 158 and SX 168, eight different capacitor values may be realized for control winding 126. In this manner, a minimum to maximum load variation may be optimized with a particular capacitor value of one part in eight. Embodiments of the present invention have demonstrated that the capacitance of the control winding 126 need not have the same capacitance on each branch winding to have a desired result, rather, only the magnitude of the capacitance on the entire auxiliary winding need be controlled. In this manner, a dynamic load may be monitored by sensing parameters of the load voltage and current to determine which combination of capacitance to switch into the control winding 126 as the load varies over a minimum to maximum range. By partitioning the control winding 126 into a portion (e.g., LS1 143 with a switched capacitor (e.g., CX1 145) and one without a switched capacitor (e.g., L1 142), the transient currents through the switched capacitors may be minimized during switching. In one embodiment of the present invention, the voltage across the branch control winding inductance (e.g., LS1 143) is monitored so that capacitor CX1 145 is switched in only when its terminals are at or near a zero voltage condition. Embodiments of the present invention that use a monitored voltage as the control parameter to switch the capacitors may use hysteresis when switching in the discrete capacitors to prevent a "hunting" condition where the capacitance is not the required exact value for a given load condition. Other embodiments may use a load current value to determine how much capacitance to switch into the control winding 126. In this embodiment, a switched in value of capacitance would remain connected as long as the load current was above a prescribed limit. Using current may not require the same level of hysteresis as when using voltage. Other embodiments of the present invention use more complex algorithms where combinations of load voltage and currents are used to determine how much capacitance to switch into a control winding 126. For example, along with load voltage and current amplitude, the phase angle between the load voltage and current may also be used to determine an optimum control winding 126 capacitance.

Figure 1I:
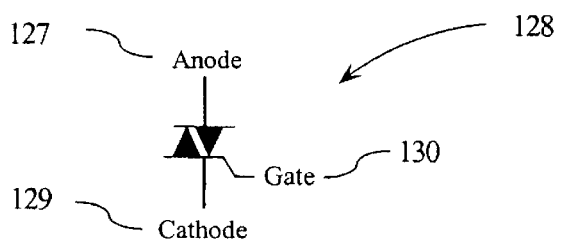
FIG. 1I is a circuit diagram of an electronic AC switch useable in embodiments of the present invention.

FIG. 1I is a circuit diagram of a triac 128 which may be used as the AC electronic switch 148, 158, 168 according to embodiments of the present invention. Triac 128 has an anode 127 and a cathode 129 and a control gate 130. By applying an appropriate gate voltage to gate 130, the triac 128 may be made to conduct in either direction until the current goes through a zero value at which time it is gated on again and current will resume in the other direction. Modern triacs 128 may be supplied from the manufacturer with additional circuitry that may determine a zero voltage condition before supplying a gate signal to control gate 130. While parameters of a load coupled to induction generator 100 may be used to signal that a capacitor value is needed, the actual timing of the signal applied to an electronic switch (triac 128) may be modified by the circuitry supplied from a manufacturer of the triac 128.

Figure 1J:
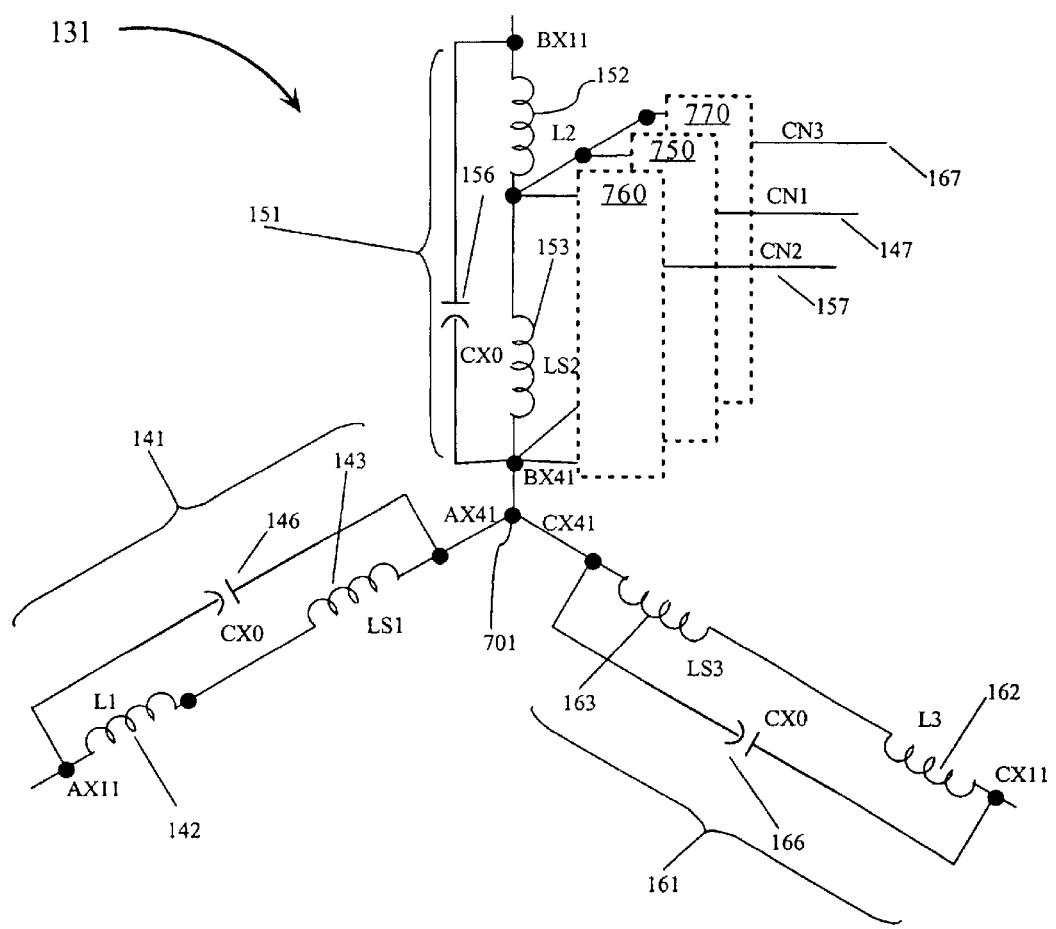
FIG. 1J is a circuit diagram of another embodiment of the present invention with a different connection of control elements.

FIG. 1J is a circuit diagram of control winding 131 where control elements 750, 760 and 770 are place across a branch control inductance LS2 153. The control winding 131, in this example, is shown to have the same branch elements as control winding 126 (see FIG. 1H). In this manner, control elements 750, 760 and 770 may have the same internal component values as when used for control winding 126. Therefore, control winding 131 can be used in the same manner as control winding 126. However, since the capacitors (CX1 145, CX2 155 and CX3 165 in control elements 750, 760 and 770 in FIG. 1H) are added with no inductive isolation, more care would have to be taken to guarantee that the capacitor terminal voltages are very near a zero value to eliminate excessive transient currents. While this embodiment has a more stringent switching requirement, switching the capacitors within control winding 131 across only one inductive element (LS2 152) works and is within the scope of the present invention.

Figures 1K, 1L:
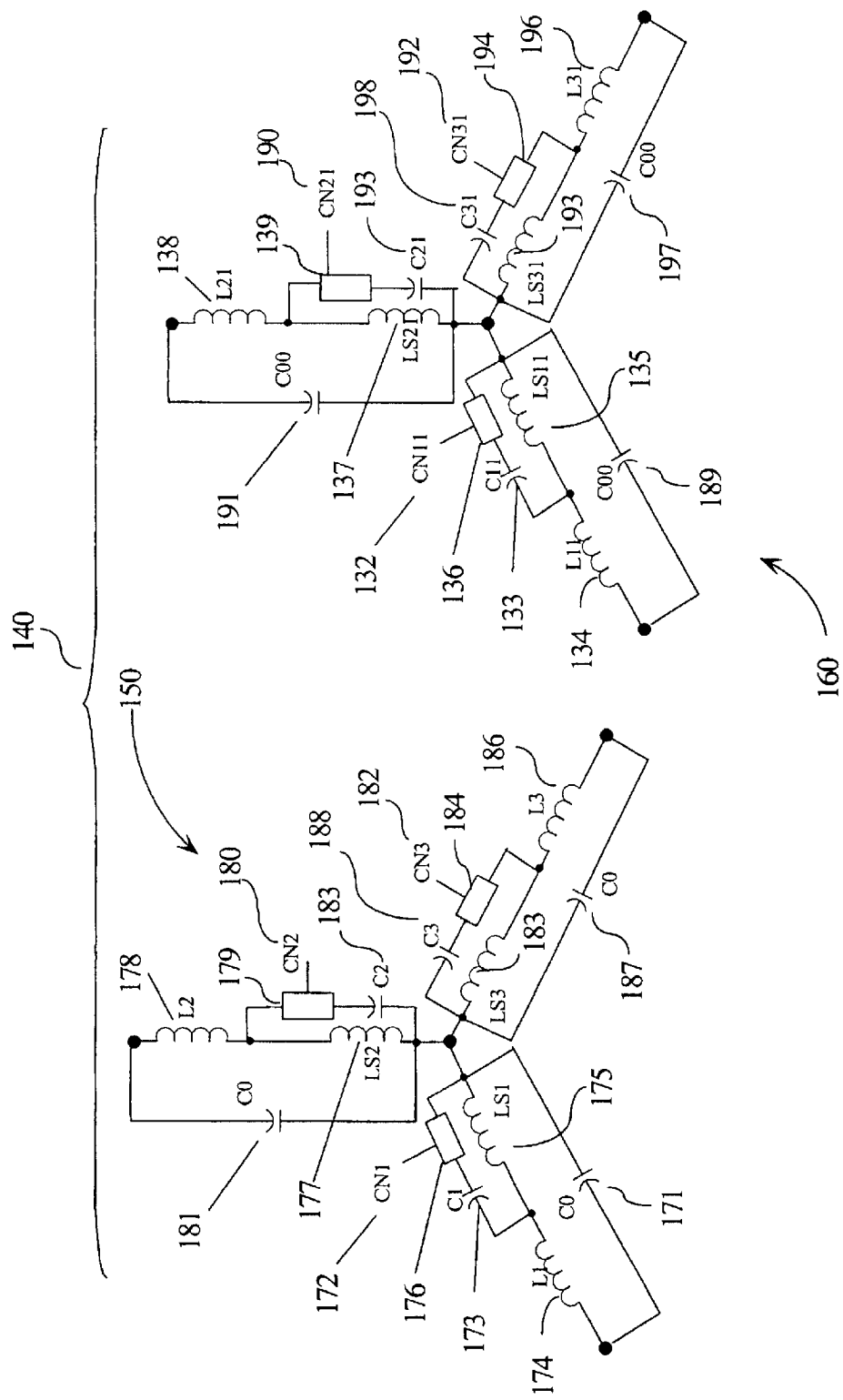
FIGS. 1K and 1L are circuit diagrams of multiple magnetically coupled control windings according to the topology of FIG. 1H used in embodiments of the present invention to provide higher resolution of control.

FIGS. 1K and 1L are circuit diagrams of another embodiment of the present invention. In this embodiment, a control winding 140 is partitioned into two control windings 150 and 160. Control windings 150 and 160 may be wound according to the topology for control winding 126. Control winding 140 can be used in a same manner as control winding 126 or 131. For example, branch winding element L2 178 would be wound on the same stator teeth in the same way as L21 138, however their respective electrical terminals would be kept isolated creating two electrically independent but magnetically coupled elements. In the same manner, branch winding elements LS2 177 and LS21 137 would be on the same stator teeth again keeping their respective electrical terminals isolated. Repeating this for all three of the three phase branch control windings enables two magnetically coupled control windings that are electrically isolated. Branch windings may be designed so that the operation of a branch comprising L2 178 and LS2 177 and corresponding capacitor C0 181 and a magnetically coupled branch L21 138, LS21 137 and capacitor C00 191 is the same as corresponding branch comprising L2 152, LS2 153 and CX0 156 of control windings 126 (FIG. 1H) and 131 (FIG. 1J). If the partitioned control winding 140 is made to be equivalent to control winding 126 or control winding 131 in this manner on all three branches, an extra level of control is possible allowing for a finer control of added capacitance of a load range.

Control winding 140 would represent one level of control. Non-switched capacitors C0 171, C0 181 and C0 187 would operate with branch windings L1 174, LS1 175, L2 178, LS2 177, L3 186 and LS3 183 to set a first circuit state for control winding 150, and switching in capacitors C1 173, C2 183 and C3 188 enables seven additional circuit states for control winding 150. Switched capacitors C1 173, C2 183 and C3 188 are alternately switched into control winding 150 with switch elements 176, 179, and 184 respectively. Switch element 176, 179, and 184 have control inputs CN1 172, CN2 180 and CN3 182 respectively.

Control winding 160 would represent a second level of control. Non-switched capacitors C00 189, C00 191 and C00 197 would operate with branch windings L11 134, L21 138, L31 196, LS11 135, LS21 137 and LS31 193 to set a first circuit state for control winding 160, and switching in capacitors C11 133, C21 193 and C31 198 sets seven additional circuit states for control winding 160. Switched capacitors C11 133, C21 193 and C31 198 are alternately switched into control winding 160 with switch elements 136, 139, and 194 respectively. Switch elements 136, 139, and 194 have control inputs CN11 132, CN21 190 and CN31 192 respectively.

Auxiliary windings 150 and 160 are magnetically coupled in this embodiment of the present invention, and the state of control winding 160, when no switch elements are conducting, would add to the first circuit state of control winding 150. The first circuit state of control windings 150 and 160 along with the seven additional circuit states of control winding 150 generate eight circuit states. By switching capacitors 160, an additional seven circuit states allow the combination of control windings 150 and 160 to generate a total of 56 circuit states. Since control windings 150 and 160 magnetically work together, a finer resolution of control is achieved. This method of partitioning a control winding for an induction generator, according to embodiments of the present invention, may be extended to more than two partitions. Additional partitions are determined only by physical winding limitations and the packaging of the individual capacitors and switching elements.

Figure 2A:
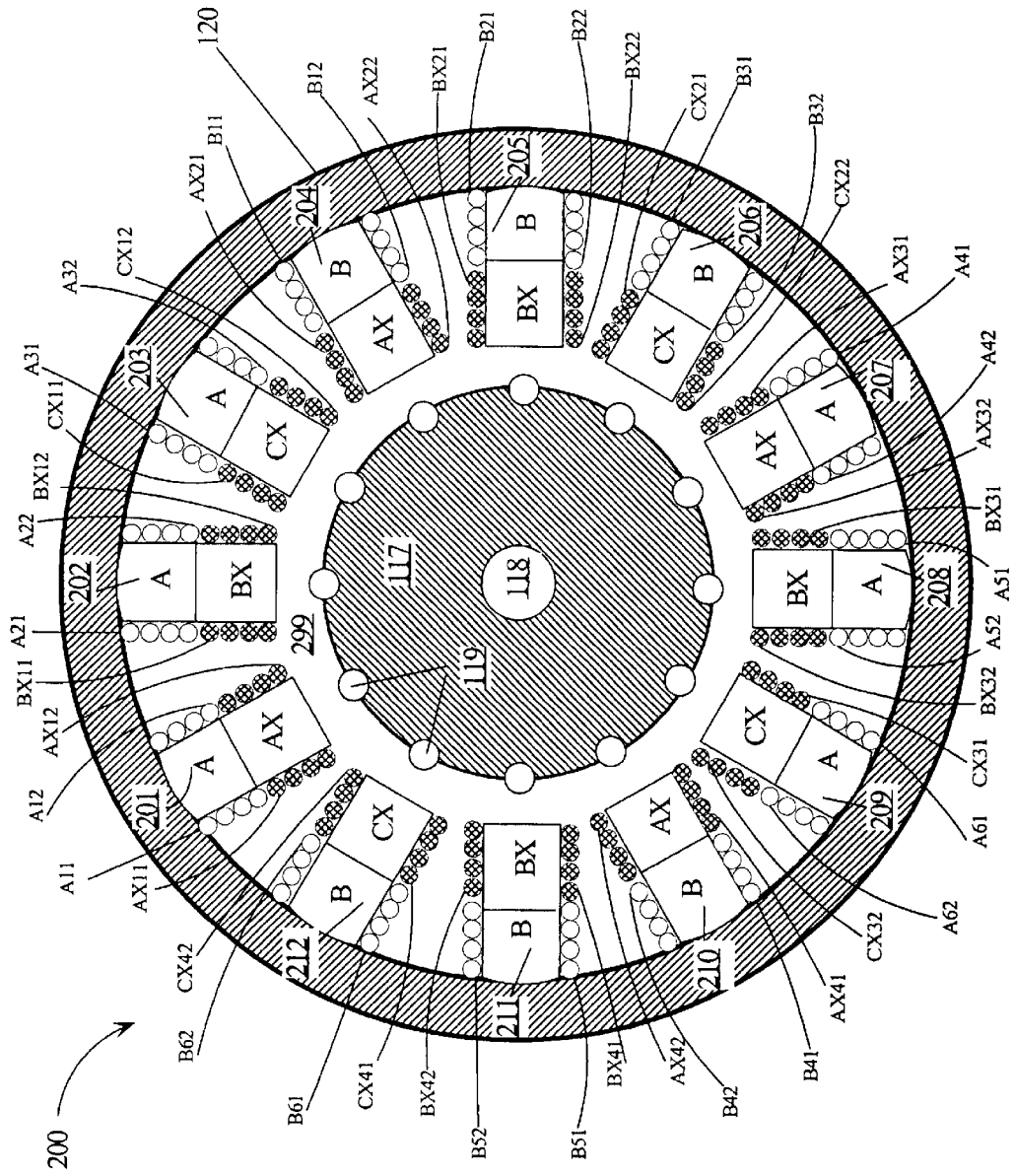
FIG. 2A illustrates a cross-section of an induction machine with auxiliary and energy coils wound enabling a two single phase two pole energy windings and a three-phase auxiliary winding structure where the auxiliary winding is magnetically coupled to both the energy windings and electrically isolated from both the energy windings.

FIG. 2A is a cross-section of another induction machine 200 according to embodiments of the present invention. The stator 120, rotor 117 and rotor windings 119 are given the same designators as in FIG. 1A. Since the teeth of the stator are wound differently in this embodiment, the teeth are give different designators. Induction machine 200 is wound as having two single phase windings (A and B) and one three phase (AX, BX and CX) auxiliary winding. Induction machine 200 has stator teeth 201–212. Coils A201, A202, A203, A207, A208, and A209 are wound on teeth 201, 202, 203, 207, 208 and 209 to produce two magnetic poles (North and a South). Likewise, coils B204, B205, B206, B210, B211, and B212 are wound on teeth 204, 205, 206, 210, 211, 212 respectively to create two magnetic poles (North and a South). Auxiliary coils AX201, AX204, AX207, and AX210 are wound on teeth 201, 204, 207 and 210, auxiliary coils BX203, BX205, BX208, BX211 are wound on teeth 203, 205, 208 and 211, and auxiliary coils CX202, CX206, CX209, CX212 are wound on teeth 202, 206, 209, and 212 to each create 4 magnetic poles (two North and two South). The electrical terminal designations follow the same convention as described in FIG. 1A.

Figure 2B:
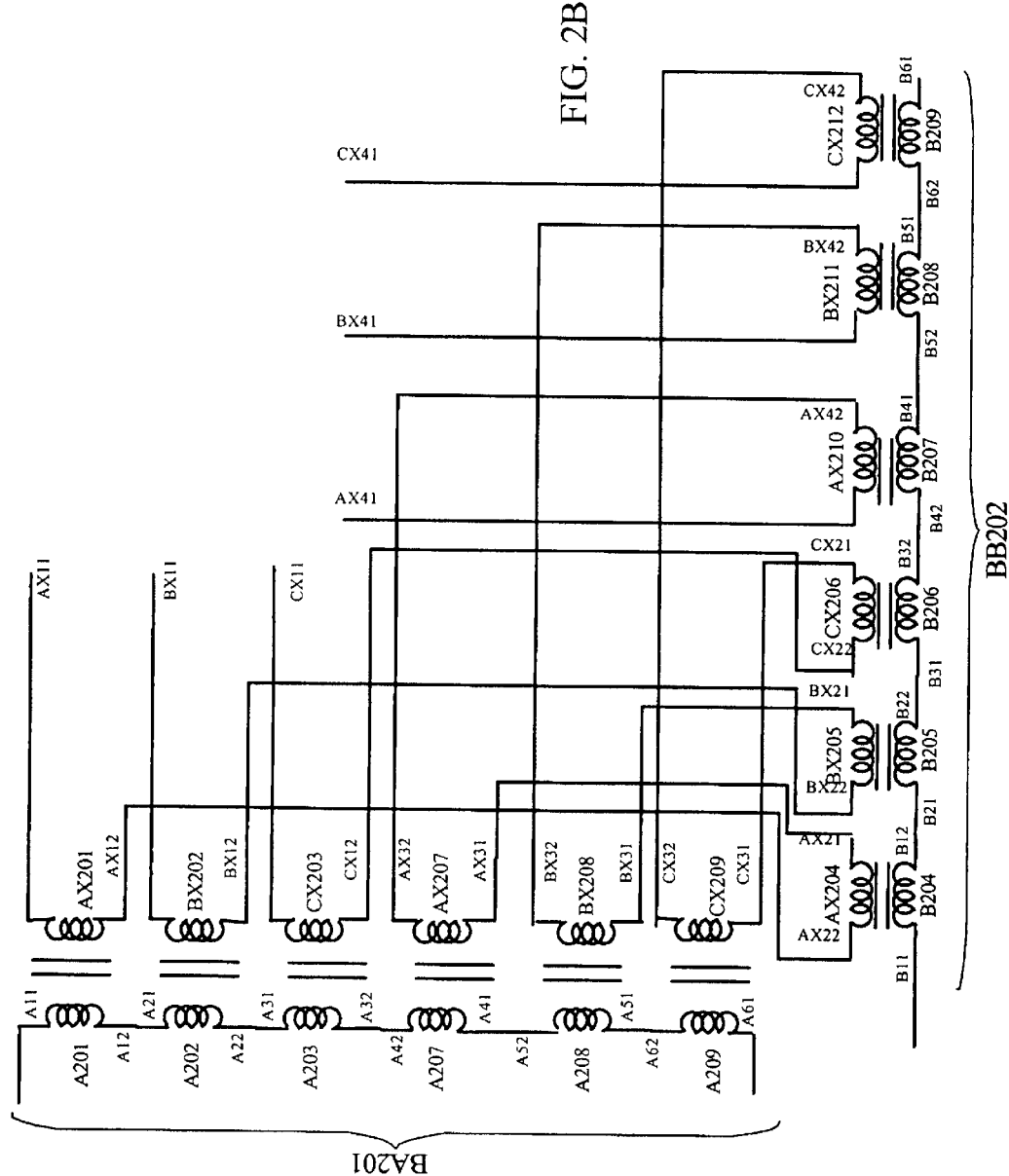
FIG. 2B is a circuit diagram illustrating a connection of the coils in FIG. 2A according to embodiments of the present invention.

FIG. 2B is a circuit diagram illustrating how the individual coils are connected and the magnetic couplings for the induction machine 200. The coils A201, A202, A203, A207, A208, and A209 are connected in their electrical terminal sequence shown in FIG. 2B to create a two pole single phase energy winding BA201. Likewise, a second two pole single phase energy winding BB202 is created by connecting the electrical terminals of the energy coils B201, B202, B203, B207, B208, and B209 in the sequence shown. Auxiliary coils AX201, BX202, CX203, AX207, BX208, and CX209 are magnetically coupled (wound on the same stator tooth) to energy coils A201, A202, A203, A207, A208, and A209. The auxiliary coils AX204, BX205, CX206, AX210, BX211, and CX212 are magnetically coupled to corresponding energy coils B201, B202, B203, B207, B208, and B209. Auxiliary coils AX201, BX202, CX203, AX207, BX208, CX209 AX204, BX205, CX206, AX210, BX211, and CX212 are connected with the electrical terminal sequence shown to create a three branch auxiliary windings with electrical terminals AX11, BX11, CX11, AX41, BX41, and CX41.

Figure 2C:
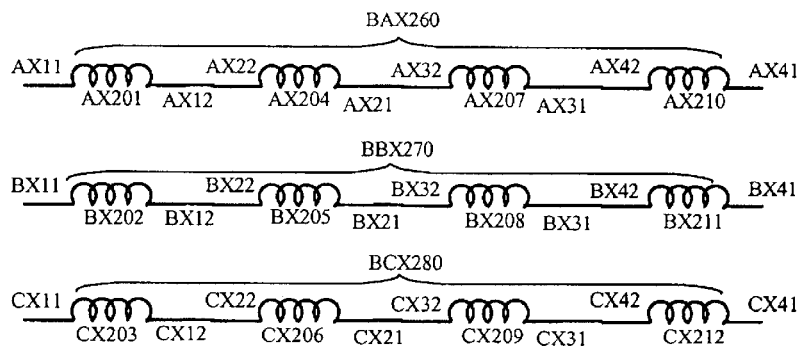
FIG. 2C is a circuit diagram of branch auxiliary windings according to the embodiment of FIG. 2B.

FIG. 2C is a circuit diagram of the branch windings of the auxiliary coils shown in FIG. 2B. Auxiliary coils AX201, AX204, AX207 and AX210 form auxiliary branch winding BAX260. Auxiliary coils BX202, BX205, BX208 and BX211 form auxiliary branch winding BBX270. Auxiliary coils CX203, CX206, CX209 and CX212 form auxiliary branch winding BCX280.

Figure 2D:
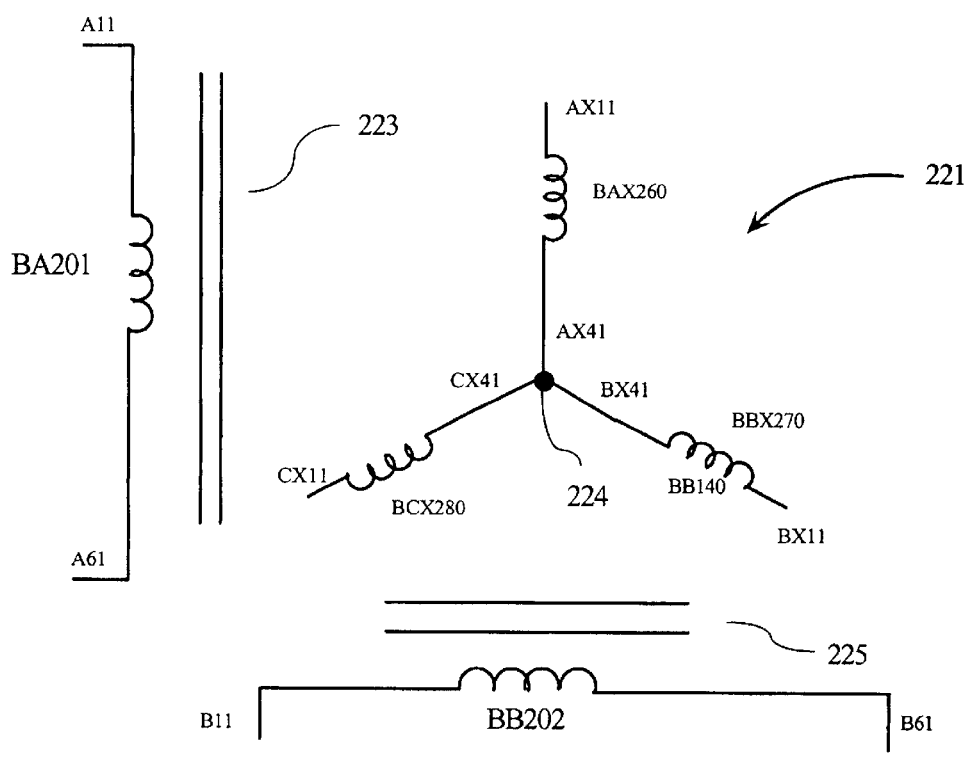
FIG. 2D is a circuit diagram of the two single phase energy windings and a three-phase Wye configured auxiliary winding according to the embodiment of FIGS. 2B and 2C.

FIG. 2D is a circuit diagram illustrating the structure of the energy windings and the auxiliary windings according to the embodiment in FIGS. 2A–2K. Single phase energy winding BA201 has output terminals A11 and A61 and is magnetically coupled (illustrated by lines 223) to three phase Wye configured auxiliary winding 221. Auxiliary winding 221 is created by connecting branch auxiliary windings BAX260, BBX270 and BCX280 with their respective electrical terminals AX41, BX41 and CX41 creating circuit node 224. Three phase auxiliary winding 221 is also magnetically coupled (illustrated by lines 225) to a second single phase energy winding BB202 with electrical terminals B11 and B61.

Figure 2E:
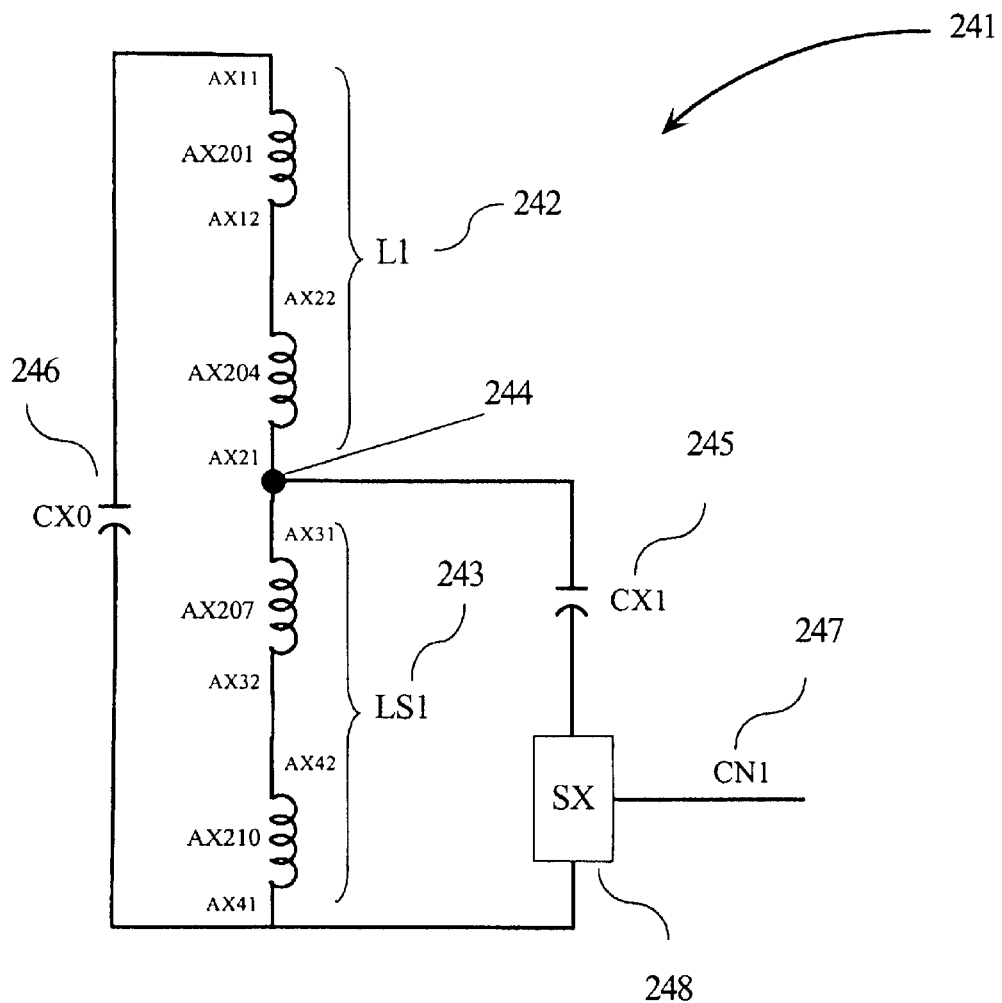
FIGS. 2E, 2F, and 2G are circuit diagrams of individual branch windings from FIGS. 2B and 2C wired to control elements to make branch control windings according to one embodiment of the present invention.

FIG. 2E is a circuit diagram of the inductance elements (coils) AX201, AX204, AX207, and AX210 which make up auxiliary branch winding BAX260, as described in FIG. 2C, wired to form control branch winding 241 according to embodiments of the present invention. Coils AX201 and AX204 form a series inductance L1 242, and coils AX207 and AX210 form a series inductance LS1 243. This is the partitioning of an auxiliary winding discussed previously herein. The connection of inductances L1 242 and LS1 243 creates a circuit node 244. A series circuit connection of capacitor CX1 245 and electronic AC switch SX 248 is connected from node 244 to electrical terminal AX41 on coil AX210. A second capacitor CX0 246 is connected from electrical terminal AX11 on coil AX201 to AX41 on coil AX210. Electronic AC switch SX 248 has a control input CN1 247 which is used in embodiments of the present invention to switch capacitor CX1 245 into and out of branch control winding 241.

Figure 2F:
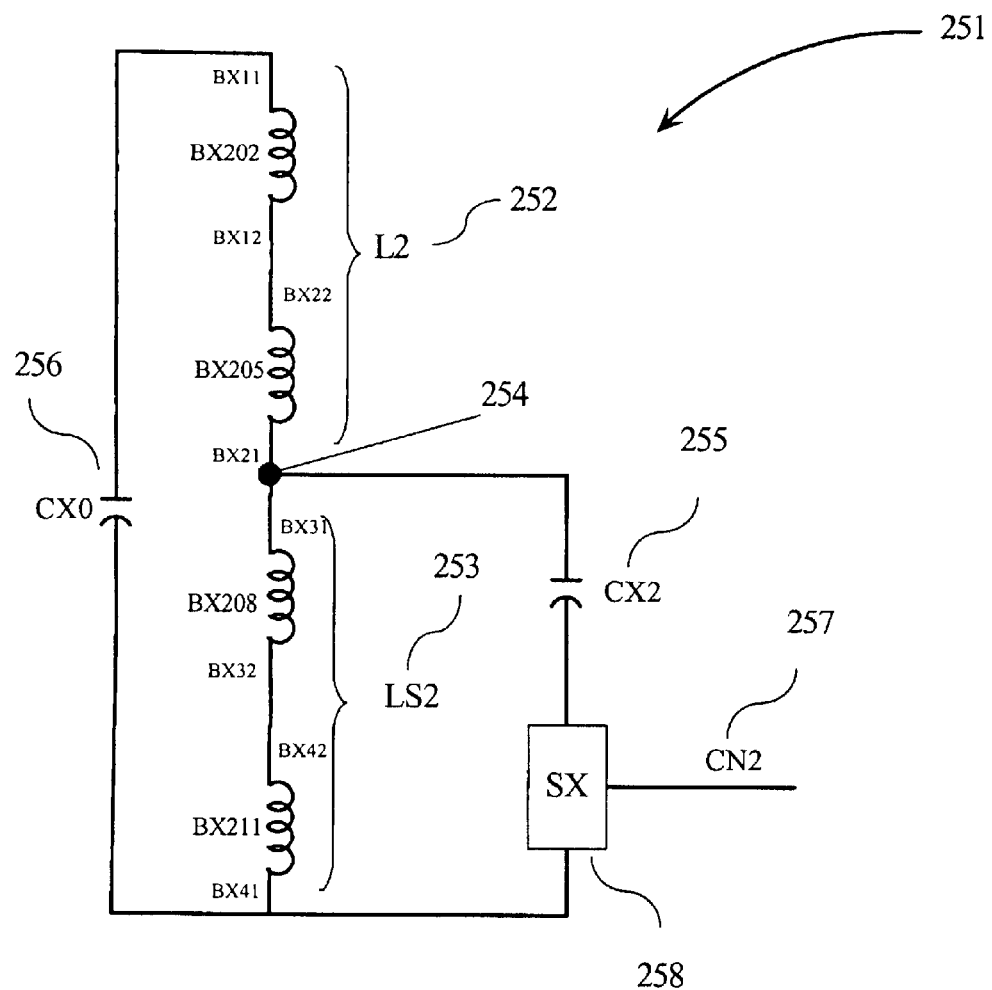

FIG. 2F is a circuit diagram of the inductance elements (coils) BX202, BX205, BX208, and BX211 which make up auxiliary branch winding BBX270, as described in FIG. 2C, wired to form control branch winding 251 according to embodiments of the present invention. Coils BX202 and BX205 form a series inductance L2 252, and coils BX208 and BX211 form a series inductance LS2 253. This is the partitioning of an auxiliary winding discussed previously herein. The connection of inductances L2 252 and LS2 253 creates a circuit node 254. A series circuit connection of capacitor CX2 255 and electronic AC switch SX 258 is connected from node 254 to electrical terminal BX41 on coil BX211. A second capacitor CX0 256 is connected from electrical terminal BX11 on coil BX202 to BX41 on coil BX211. Electronic AC switch SX 258 has a control input CN2 257 which is used in embodiments of the present invention to switch capacitor CX2 255 into and out of control branch winding 251.

Figure 2G:
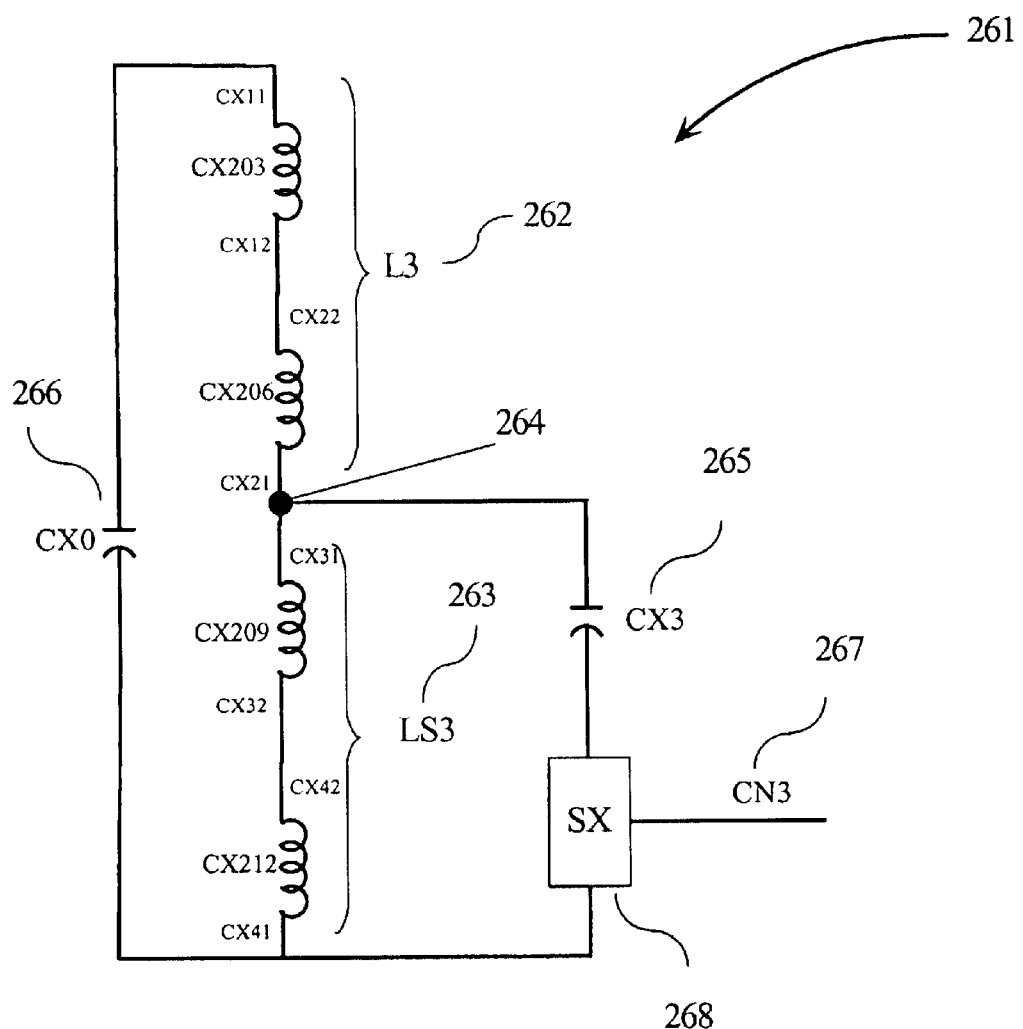

FIG. 2G is a circuit diagram of the inductance elements (coils) CX203, CX206, CX209, and CX212 which make up auxiliary branch winding BCX280, as described in FIG. 2C, wired to form control branch winding 261 according to embodiments of the present invention. Coils CX203 and CX206 form a series inductance L2 262, and coils CX209 and CX212 form a series inductance LS2 263. This is the partitioning of an auxiliary winding discussed previously. The connection of inductances L2 262 and LS2 263 creates a circuit node 264. A series circuit connection of capacitor CX2 265 and electronic AC switch SX 268 is connected from node 264 to electrical terminal CX41 on coil CX212. A second capacitor CX0 266 is connected from electrical terminal CX11 on coil CX203 to CX41 on coil CX212 Electronic AC switch SX 268 has a control input CN3 267 which is used in embodiments of the present invention to switch capacitor CX3 265 into and out of control branch winding 261.

Figure 2H:
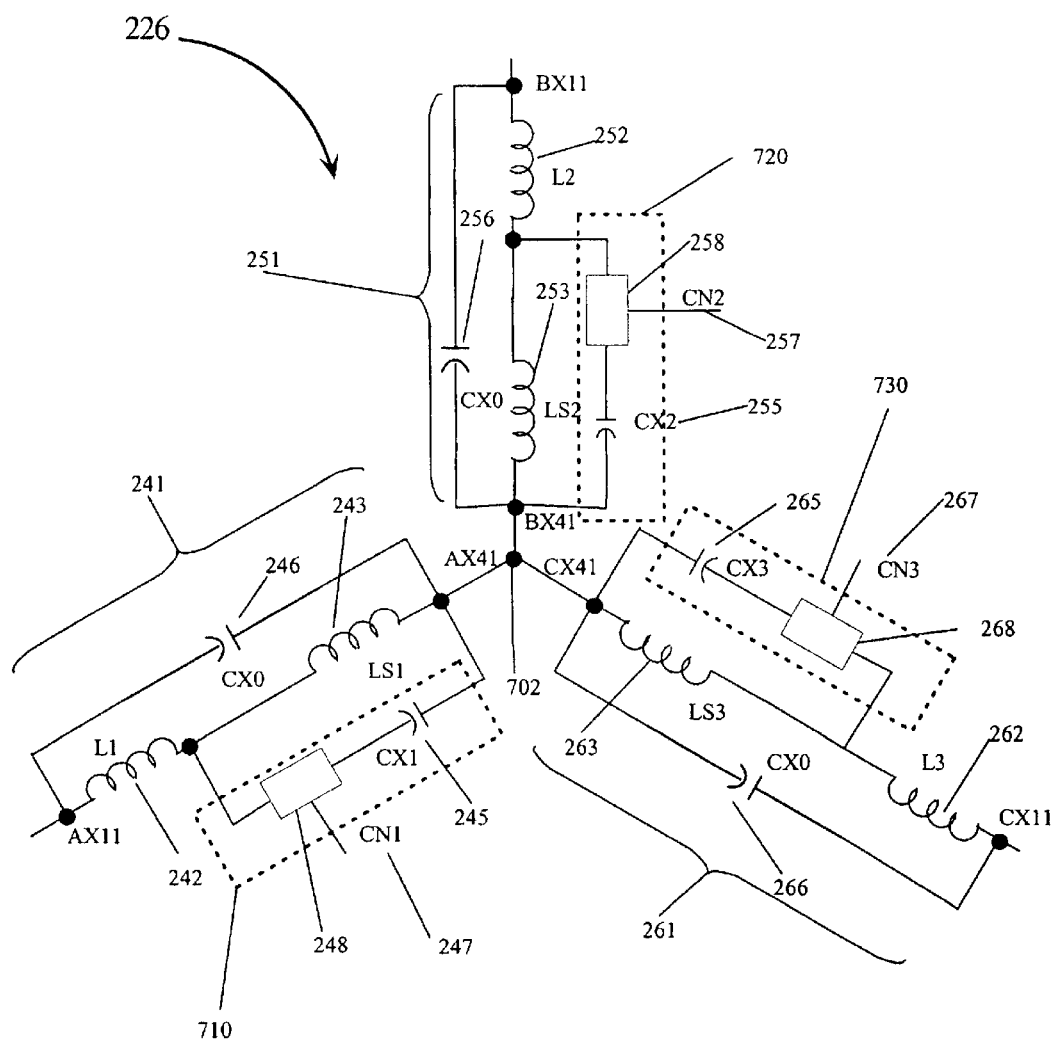
FIG. 2H is a circuit diagram of a Wye configured auxiliary control winding made by connecting control windings in FIGS. 2E, 2F, and 2G.

FIG. 2H is a circuit diagram illustrating a three phase control winding 226 according to embodiments of the present invention made by interconnecting branch control windings 241, 251 and 261 described in FIGS. 2E, 2F, and 2G respectively. Control winding 226 is configured as a three phase Wye configured winding. The electronic switches SX 248, 258 and 268 along with their corresponding switched capacitors CX1 245, CX2 255 and CX3 265 are designated as control elements 710, 720 and 730 respectively. While the particular control elements are shown as having a bi-directional electronic switch (e.g, SX 248, 258 and 268) for connecting and disconnecting capacitors CX1 245, CX2 255 and CX3 265, a continuously electronically controllable capacitor would still be within the scope of the present invention.

Figure 2I:
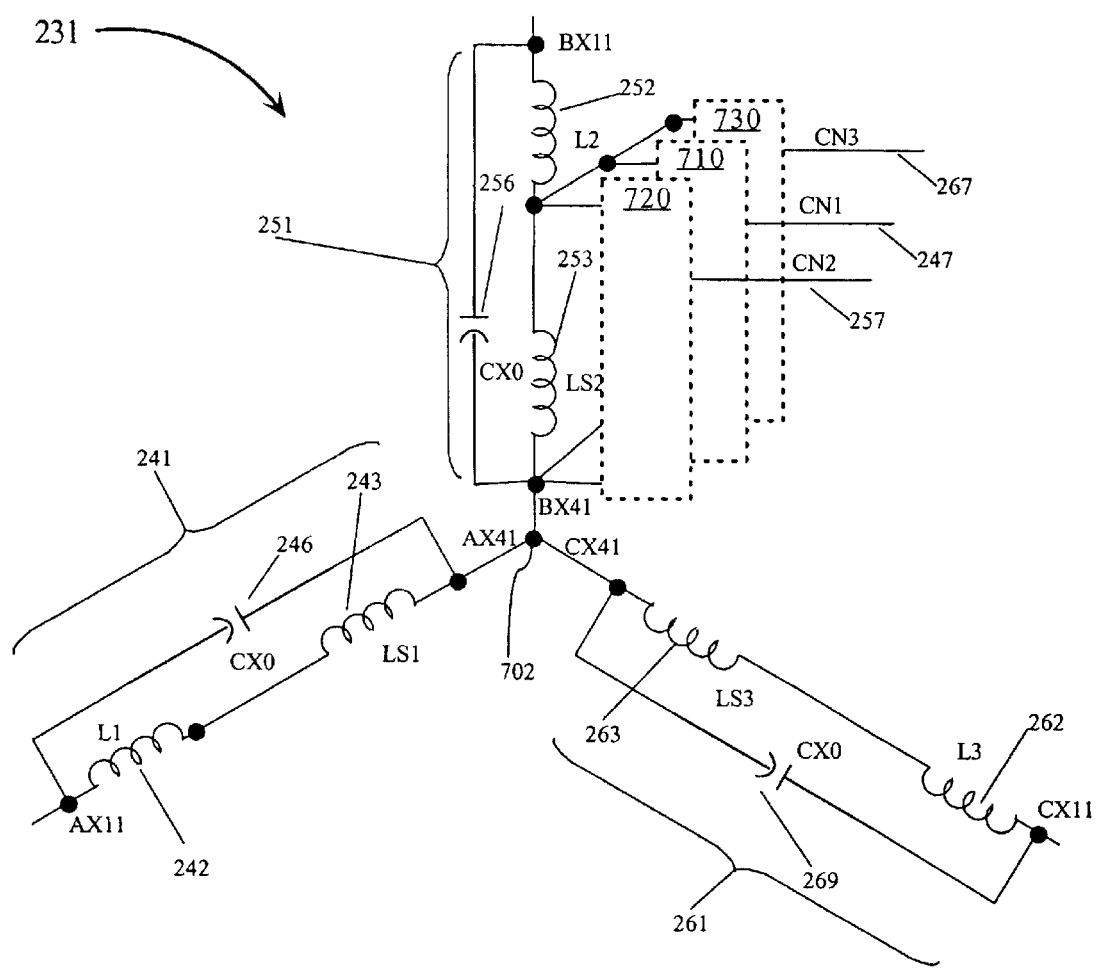
FIG. 2I is a circuit diagram of another embodiment of the present invention with a different connection of control elements.

FIG. 2I is a circuit diagram of control winding 231 where control elements 750, 760 and 770 are placed across a branch control inductance LS2 252. The control winding 231, in this example, is shown to have the same branch elements as control winding 226. In this manner, control elements 710, 720 and 730 may have the same values as when used for control winding 226. Therefore, control winding 231 can be used in a same manner as control winding 226. However, since the capacitors (CX1 245, CX2 255 and CX3 265) are added with no inductive isolation, more care would have to be taken to guarantee that the capacitor terminal voltages are very near a zero value to eliminate excessive transient currents. While this embodiment has a more stringent switching requirement, switching the capacitors within control winding 231 across only one inductive element (LS2 252) works and is within the scope of the present invention.

Figures 2J, 2K:
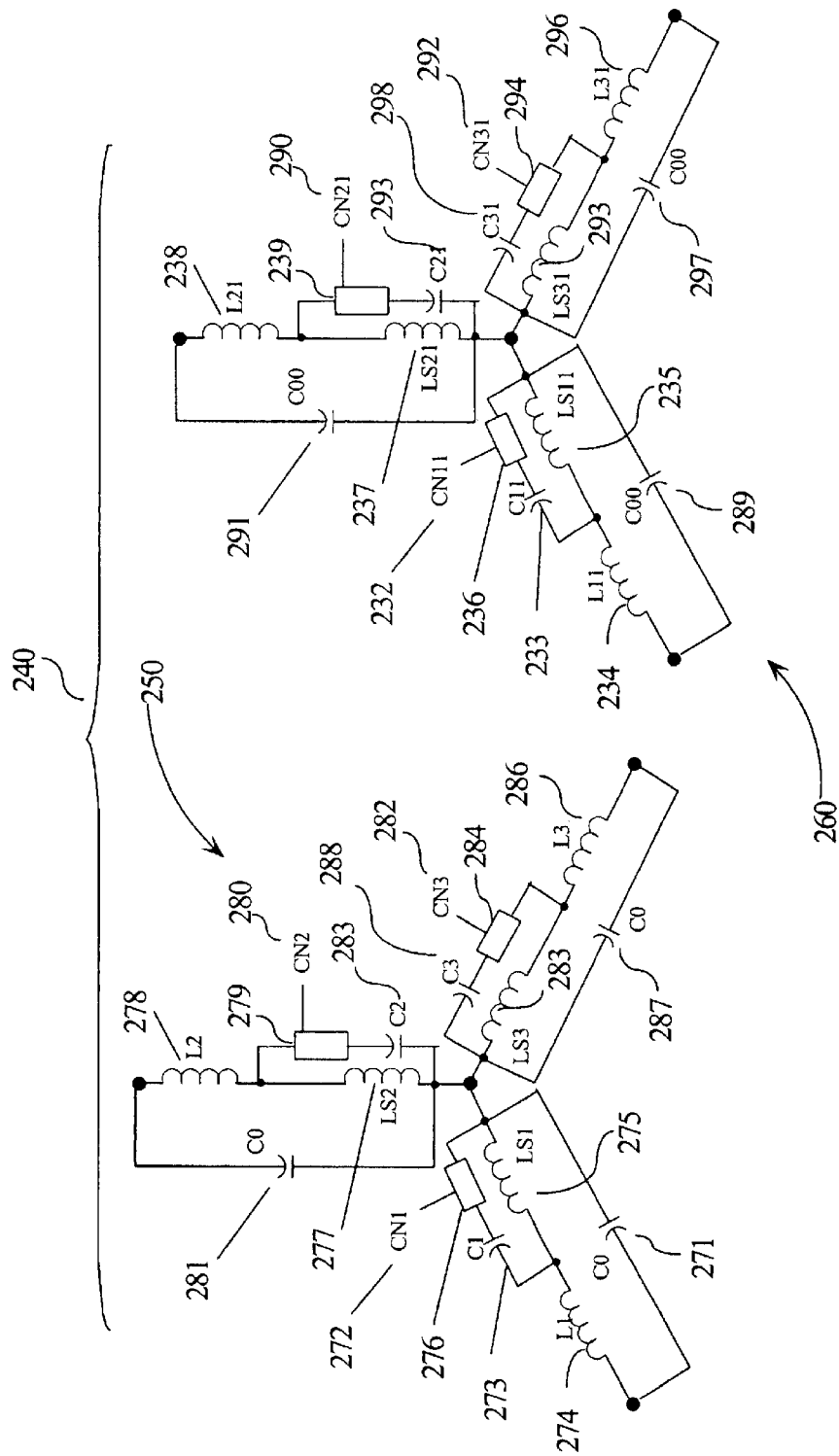
FIGS. 2J and 2K are circuit diagrams of multiple magnetically coupled control windings according to the topology of FIG. 2H used in embodiments of the present invention to provide higher resolution of control.

FIGS. 2J and 2K are circuit diagrams of another embodiment of the present invention. In this embodiment, a control winding 240 is partitioned into two control windings 250 and 260. Control winding 240 can be used in a same manner as control winding 226 or 231. Control windings 250 and 260 may be wound according to the topology for control winding 226. For example branch winding element L2 278 would be wound on the same stator teeth in the same way as L21 238, however their respective electrical terminals would be kept isolated creating two electrically independent but magnetically coupled elements. In the same manner, branch winding element LS2 277 and LS21 237 would be wound on the same stator teeth again keeping their respective electrical terminals isolated. Repeating this for all three of the three phase branch control windings enables two magnetically coupled control windings that are electrically isolated. Branch windings may be designed so that the operation of a branch comprising L2 278 and LS2 277 and corresponding capacitor C0 281 and a magnetically coupled branch L21 238, LS21 237 and capacitor C00 291 is the same as corresponding branch comprising L2 252, LS2 253 and CX0 256 of control windings 226 (FIG. 2H) and 231 (FIG. 2I). If the partitioned control winding 240 is made to be equivalent to control winding 226 or control winding 231 in this manner on all three branches, an extra level of control is possible allowing for a finer control of added capacitance of a load range.

The embodiments of the present invention explained using FIGS. 2A–2K illustrate using a three phase control winding to control the outputs of two single phase energy windings. Using a three phase control winding according to embodiments of the present invention to control single phase outputs of a self-excited induction generator is important in the generation of power in the home market where single phase power is the primary power.

Figure 2M:
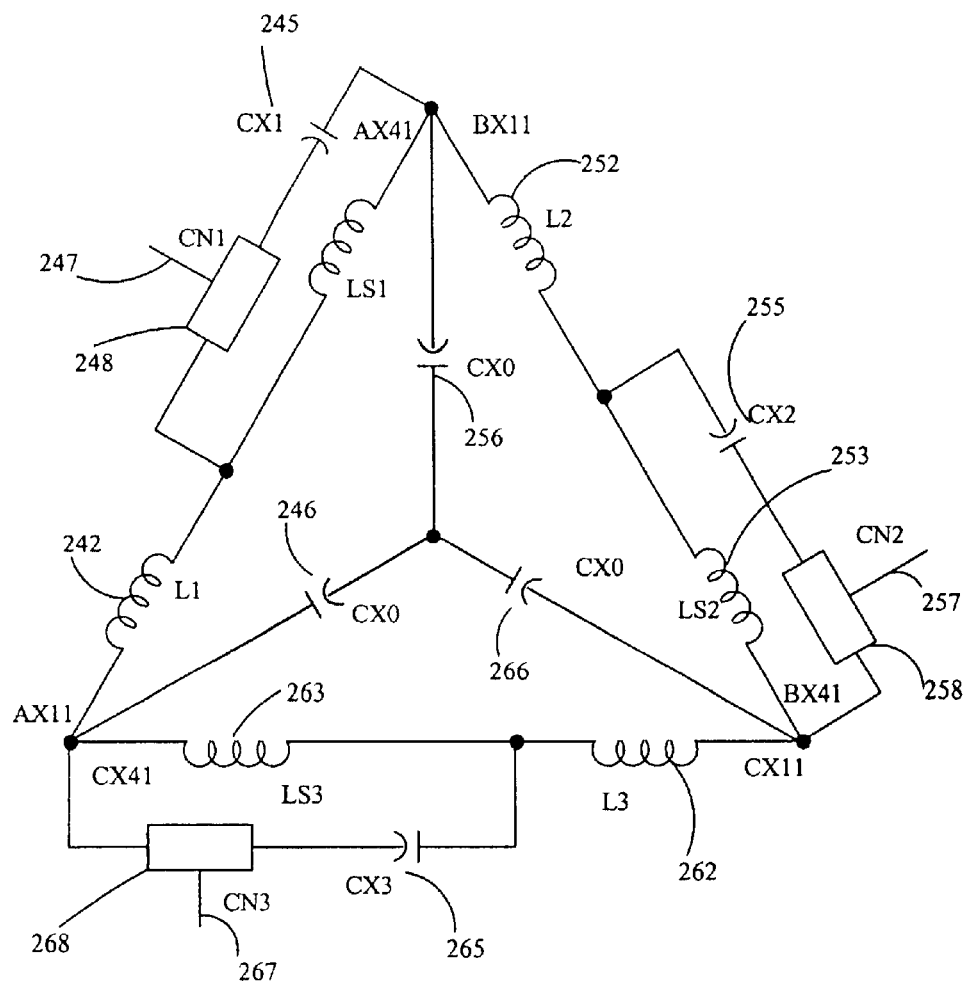
FIG. 2M is an alternate circuit configuration of the control winding 226 in FIG. 2H with inductances in a Delta configuration and un-switched capacitors in a Wye configuration.

FIG. 2M is a circuit diagram illustrating an alternate circuit configuration of the auxiliary control windings 226. In FIG. 2M, the un-switched capacitors CX0 246, CX0 256, and CX0 266 are arranged in a Wye configuration. The basic control operation of the circuit in FIG. 2M is the same as the description of the configuration in FIG. 2H. The only difference may be in the actual values of the capacitors CX0 246, CX0 256, and CX0 266 for a particular set of branch windings comprising L1 242 and LS1 243, L2 252 and LS2 253, and L3 262 and LS3 263.

Figure 2N:
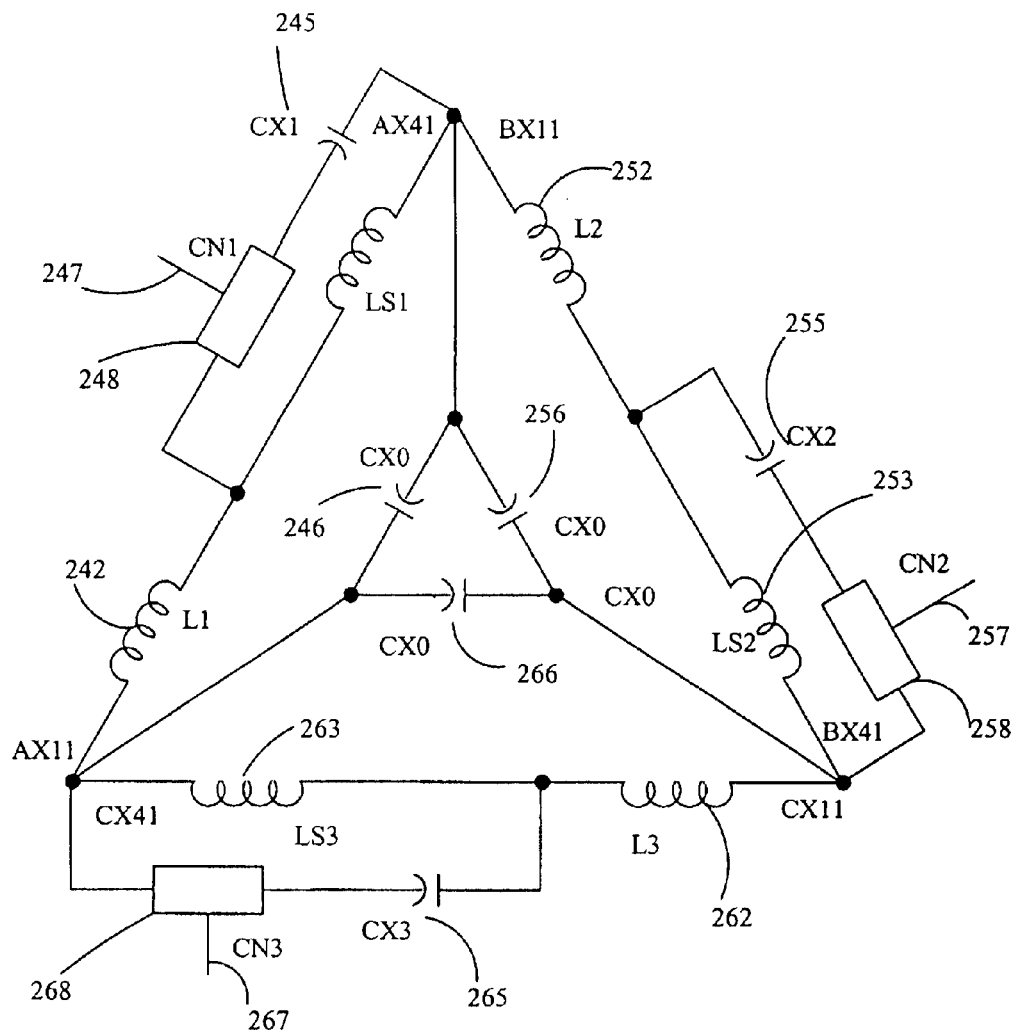
FIG. 2N is another alternate circuit configuration of the control winding 226 in FIG. 2H with inductances in a Delta configuration and un-switched capacitors in a Delta configuration.

FIG. 2N is a circuit diagram illustrating another alternate circuit configuration of the auxiliary control windings 226. In FIG. 2N the un-switched capacitors CX0 246, CX0 256, and CX0 266 are arranged in a Delta configuration and the branch auxiliary windings comprising L1 242 and LS1 243, L2 252 and LS2 253, and L3 262 and LS3 263 are also in a Delta configuration. The basic control operation of the circuit in FIG. 2N is the same as the description of the configuration in FIG. 2H.

Figure 2P:
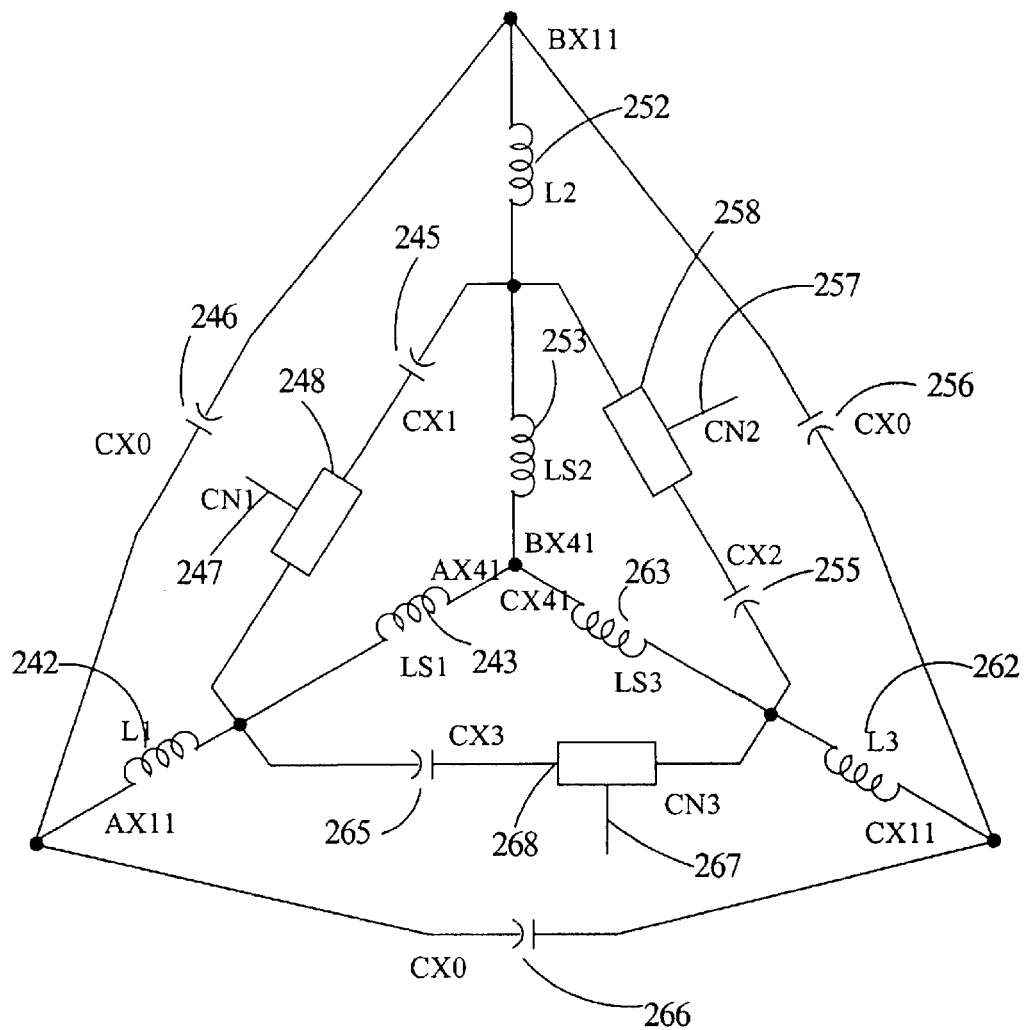
FIG. 2P is another alternate circuit configuration of the control winding 226 in FIG. 2H with inductances in a Wye configuration and un-switched capacitors in a Delta configuration.

FIG. 2P is a circuit diagram illustrating yet another alternate circuit configuration of the auxiliary control windings 226. In FIG. 2P the un-switched capacitors CX0 246, CX0 256, and CX0 266 are arranged in a Delta configuration and the branch auxiliary windings comprising L1 242 and LS1 243, L2 252 and LS2 253, and L3 262 and LS3 263 are in a Wye configuration. The basic control operation of the circuit in FIG. 2P is the same as the description of the configuration in FIG. 2H. The only difference may be in the actual values of the capacitors CX0 246, CX0 256, and CX0 266 for a particular set of branch windings comprising L1 242 and LS1 243, L2 252 and LS2 253, and L3 262 and LS3 263.

The alternate circuit configurations FIG. 2M, FIG. 2N and FIG. 2P for the auxiliary windings of FIG. 2H are included to illustrate the varied ways that auxiliary control windings may be configured and still be within the scope of embodiments of the present invention. All the auxiliary control windings in FIGS. 1A–1L, FIGS. 2A–2K, FIGS. 3A–3K, FIGS. 4A–4K, and FIGS. 6A–6K, may be configured alternatively as was done in FIG. 2M, FIG. 2N and FIG. 2P for the auxiliary control winding 226 in FIG. 2H as additional embodiments of the present invention.

Figure 3A:
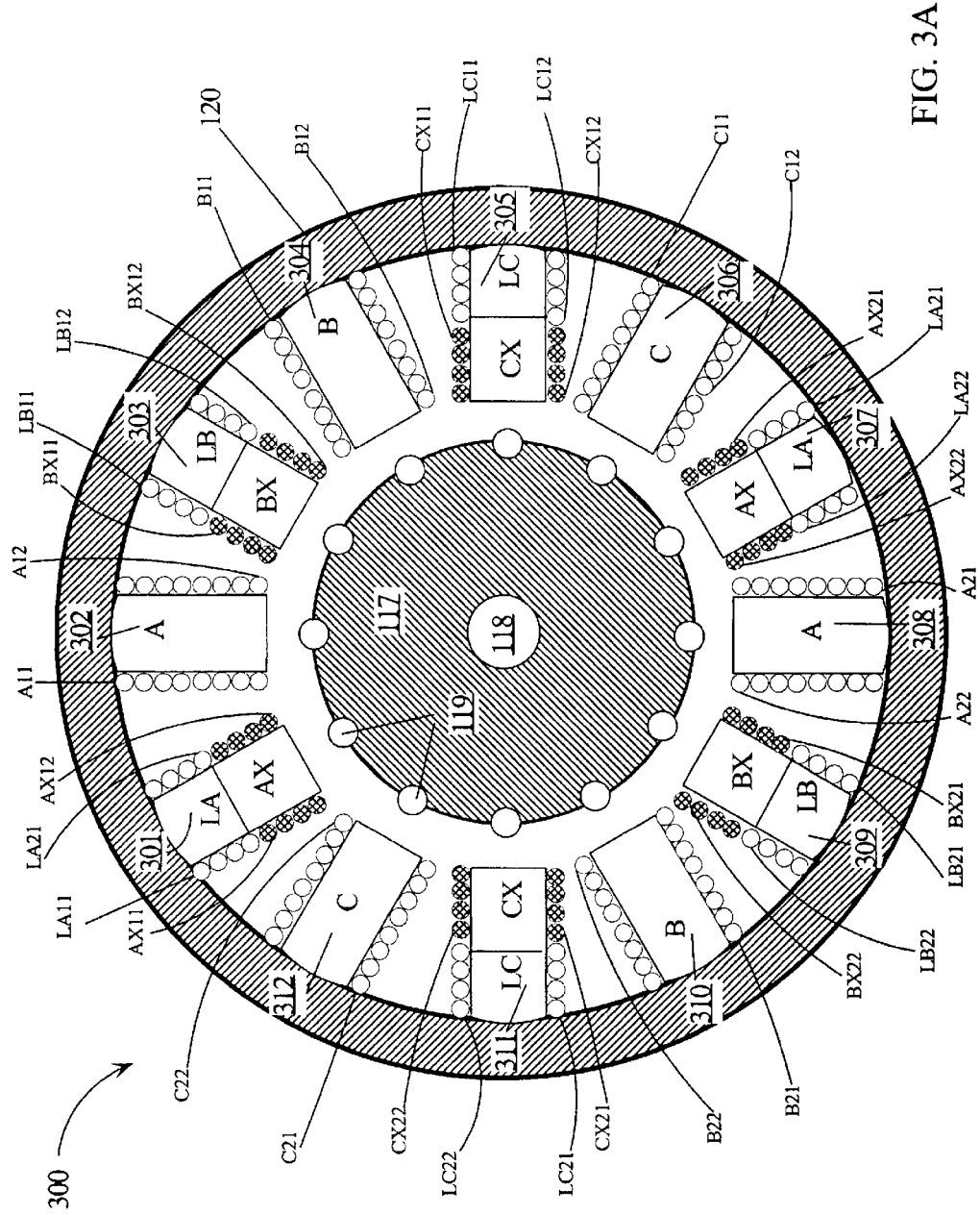
FIG. 3A illustrates a cross-section of an induction machine configured to enable two three phase two pole energy windings and a three phase two pole auxiliary winding structure used in embodiments of the present invention where the auxiliary winding is magnetically coupled to one energy winding and electrically isolated from both energy windings.

FIG. 3A is a cross-section of another induction machine 300 according to embodiments of the present invention. The stator 120, rotor 117 and rotor windings 119 are given the same designators as in FIGS. 1A and 2A. Since the teeth of the stator are wound differently in this embodiment the teeth are given different designators. Induction machine 300 has stator teeth 301–312. The embodiment illustrated in FIG. 3A is configured to be wired with two, two phase 2 pole energy windings (A, B, C) and (LA, LB, LC) and one three phase auxiliary winding (AX, BX and CX). Energy coils A302 and A308 are wound on stator teeth 302 and 308 respectively. Energy coils B304 and B310 are wound on stator teeth 304 and 310. Likewise, energy coils C306 and C312 are wound on stator teeth 306 and 312. Energy coils LA 301 and LA 307 are magnetically coupled (wound on the same teeth) to auxiliary coils AX 301 and AX307 respectively. Energy coils LB 303 and LB 309 are magnetically coupled (wound on the same teeth) to auxiliary coils BX 303 and BX309 respectively. Likewise, energy coils LC 305 and LC 311 are magnetically coupled (wound on the same teeth) to auxiliary coils CX 305 and CX 311 respectively. The electrical terminals have the same convention as used in FIGS. 1A and 2A.

Figure 3B:
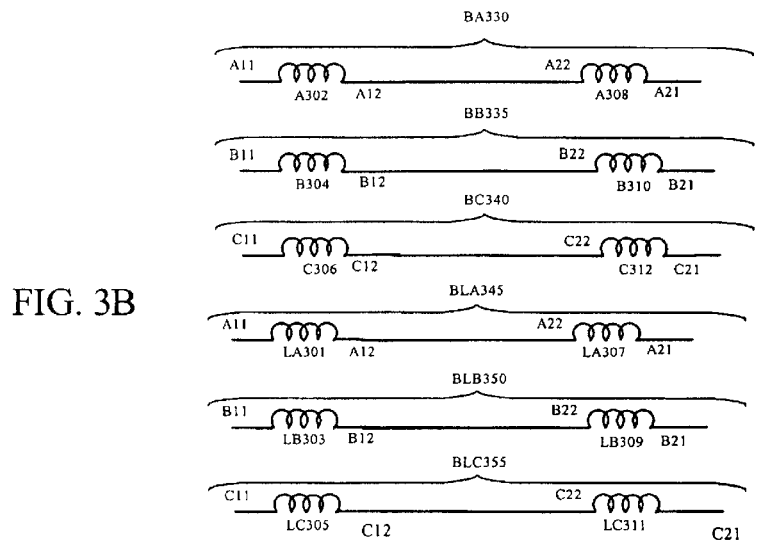
FIGS. 3B and 3C are circuit diagrams illustrating connections of individual coils for branch energy and auxiliary windings used in an embodiment of the present invention in FIG. 3A.
Figure 3C:
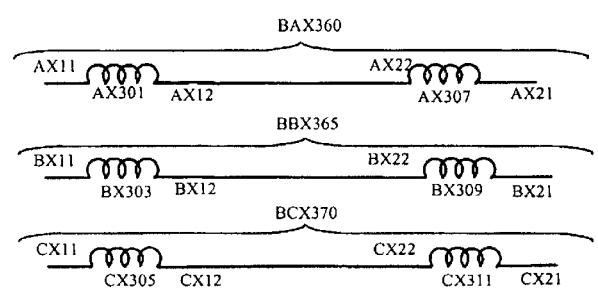

FIG. 3B is a circuit diagram illustrating the connection of the electrical terminals to create the branch windings for induction generator 300. Energy coils A302 and A308 are coupled with the electrical terminals sequence to create branch energy winding BA330 and 2 magnetic poles in teeth 302 and 308. Energy coils B304 and B310 are coupled with the electrical terminals sequence to create branch energy winding BB335, and energy coils C306 and C312 are coupled with the electrical terminal sequence to create branch energy winding BB340. A second set of branch energy windings, BLA345, BLB350 and BLC355 are created by coupling energy coils LA301 and LA 307, LB303 and LB307, and LC305 and LC311, respectively, with the shown electrical terminal sequences. Referring to FIG. 3C, auxiliary branch winding BAX360 is created by coupling auxiliary coils AX301 and AX307 with the electrical terminal sequence shown. Auxiliary branch winding BBX365 is created by coupling auxiliary coils BX303 and BX309 with the electrical terminal sequence shown. Likewise, branch auxiliary winding BCX370 is created by coupling auxiliary coils CX305 and CX311 with the electrical terminal sequence shown.

Figure 3D:
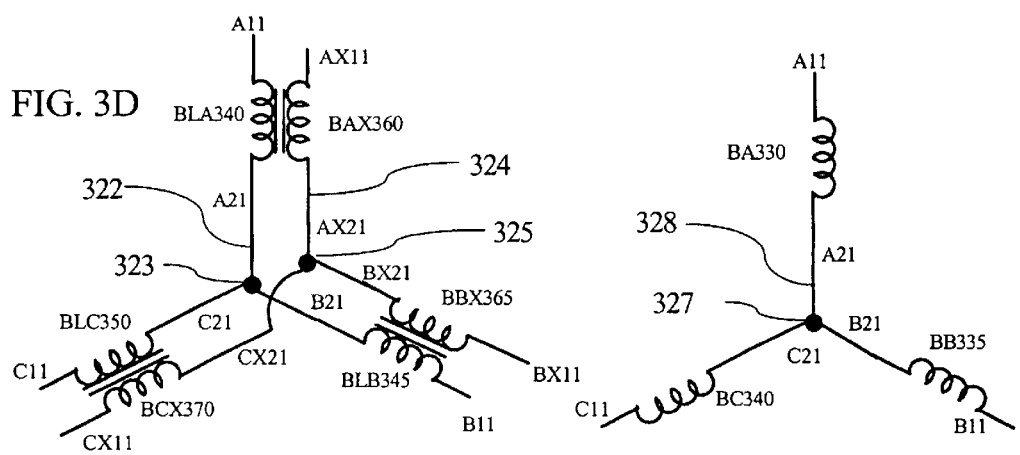
FIG. 3D is a circuit diagram illustrating two three phase Wye configured energy windings and a single three phase Wye configured auxiliary winding magnetically coupled to an energy winding.

FIG. 3D is a circuit diagram illustrating an isolated three phase Wye configured energy winding 328 of induction machine 300 created by coupling branch energy winding BA330, BB335 and BC340 with electrical terminals A21, B21 and C21 creating circuit node 327 and having electrical input or output terminals A11, B11 and C11. Second three phase Wye configured energy winding 322 is created by coupling branch energy windings BLA340, BLB345, and BLC350 with their respective terminals A21, B21 and C21 creating circuit node 323. Auxiliary three phase Wye configured winding 324 is magnetically coupled to energy winding 322 and is created by connecting electrical terminals AX21, BX21 and CX21 of auxiliary branch windings BAX360, BBX365 and BCX370 respectively.

Figure 3E:
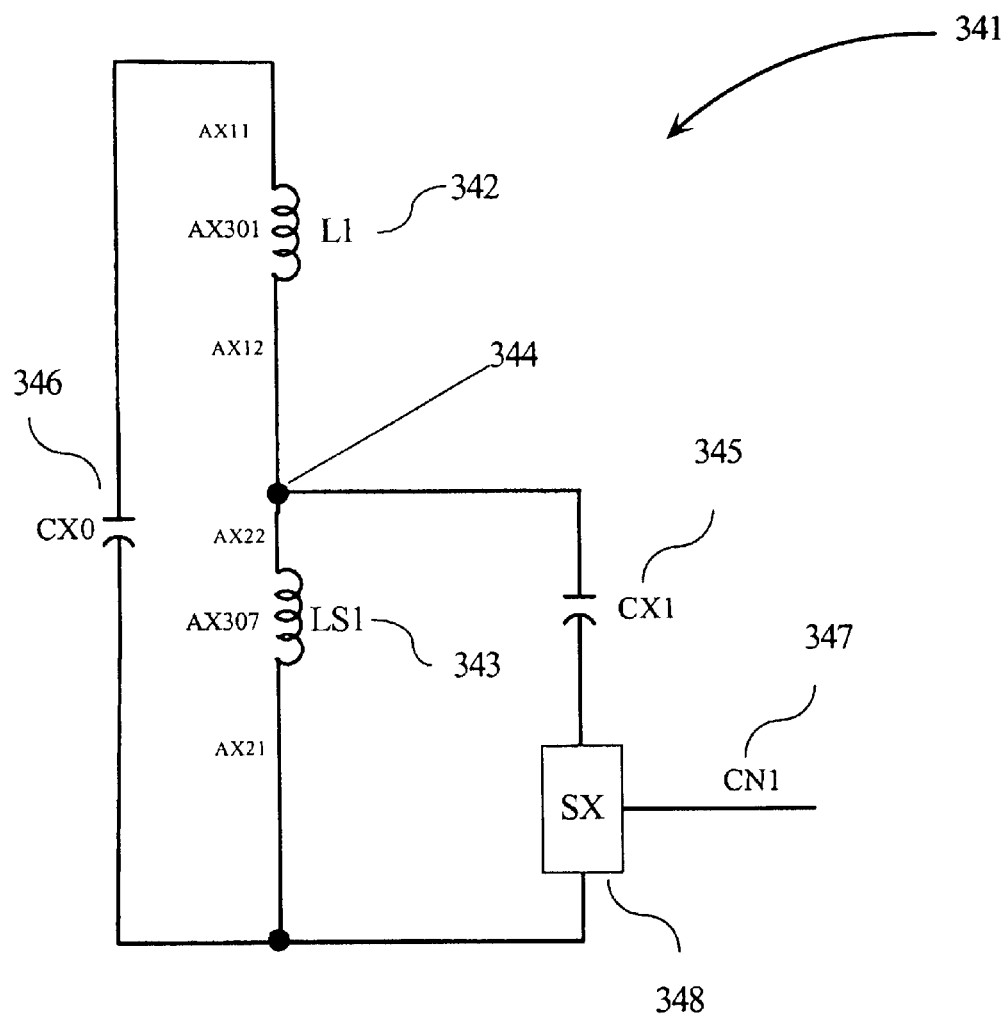
FIGS. 3E, 3F, and 3G are circuit diagrams of individual branch windings from FIGS. 3B and 3C wired to control elements to make branch control windings according to one embodiment of the present invention.

FIG. 3E is a circuit diagram of the inductance elements (coils) AX301 and AX307 which make up auxiliary branch winding BAX360, as described in FIG. 3C, wired to form control branch winding 341 according to embodiments of the present invention. Coil AX301 forms an inductance L1 342 and coil AX307 forms an inductance LS1 343. This is a partitioning of an auxiliary winding discussed previously. The connection of L1 342 and LS1 343 creates a circuit node 344. A series circuit connection of capacitor CX1 345 and electronic AC switch SX 348 is connected from node 344 to electrical terminal AX21 on coil AX307. A second capacitor CX0 346 is connected from electrical terminal AX11 on coil AX301 to terminal AX21 on coil AX307. Electronic AC switch SX 348 has a control input CN1 347 which is used in embodiments of the present invention to switch capacitor CX1 345 into and out of control branch winding 341.

Figure 3F:
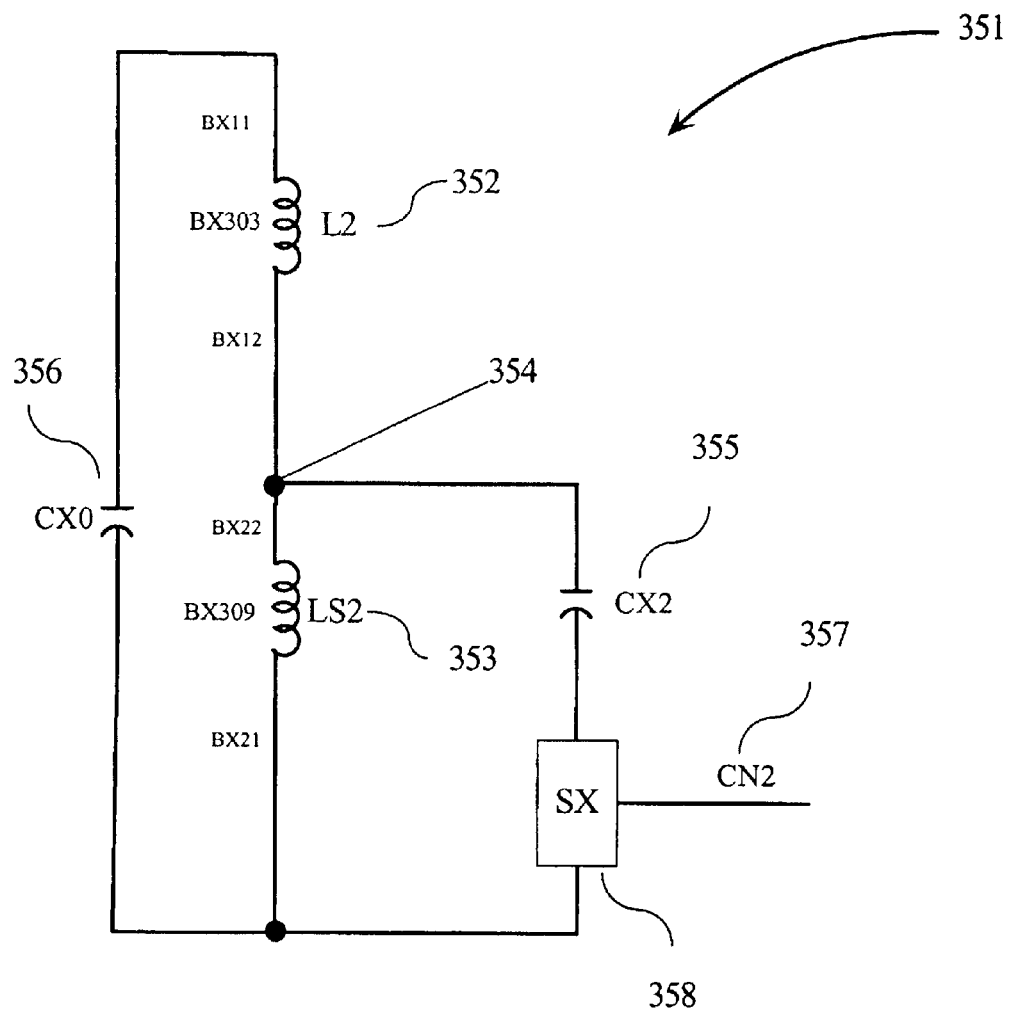

FIG. 3F is a circuit diagram of the inductance elements (coils) BX303 and BX309 which make up auxiliary branch winding BBX365, as described in FIG. 3C, wired to form control branch winding 351 according to embodiments of the present invention. Coil BX303 forms an inductance L2 352 and coil BX309 forms an inductance LS2 353. This is the partitioning of an auxiliary winding discussed previously. The connection of L2 352 and LS2 353 creates a circuit node 354. A series circuit connection of capacitor CX2 355 and electronic AC switch SX 358 is connected from node 354 to electrical terminal BX21 on coil BX309. A second capacitor CX0 356 is connected from electrical terminal BX11 on coil BX303 to terminal BX21 on coil BX309. Electronic AC switch SX 358 has a control input CN2 357 which is used in embodiments of the present invention to switch capacitor CX2 355 into and out of control branch winding 351.

Figure 3G:
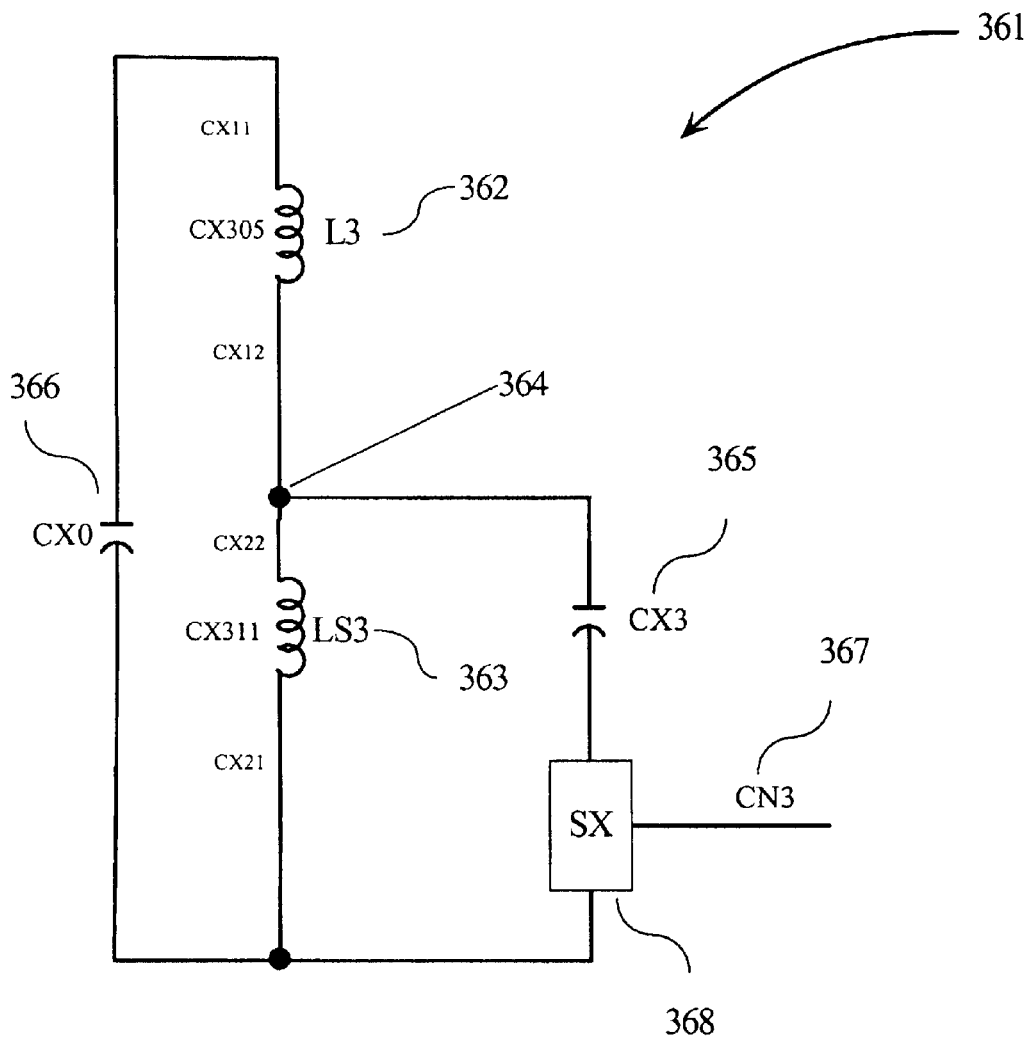

FIG. 3G is a circuit diagram of the inductance elements (coils) CX305 and CX311 which make up auxiliary branch winding BCX365, as described in FIG. 3C, wired to form control branch winding 361 according to embodiments of the present invention. Coil CX305 forms an inductance L3 362 and coil CX311 forms an inductance LS3 363. This is the partitioning of an auxiliary winding discussed previously. The connection of inductances L3 362 and LS3 363 creates a circuit node 364. A series circuit connection of a capacitor CX3 365 and an electronic AC switch SX 368 are connected from node 364 to electrical terminal CX21 on coil CX311. A second capacitor CX0 366 is connected from electrical terminal CX11 on coil CX305 to terminal CX21 on coil CX311. Electronic AC switch SX 368 has a control input CN3 367 which is used in embodiments of the present invention to switch capacitor CX3 365 into and out of control branch winding 361.

Figure 3H:
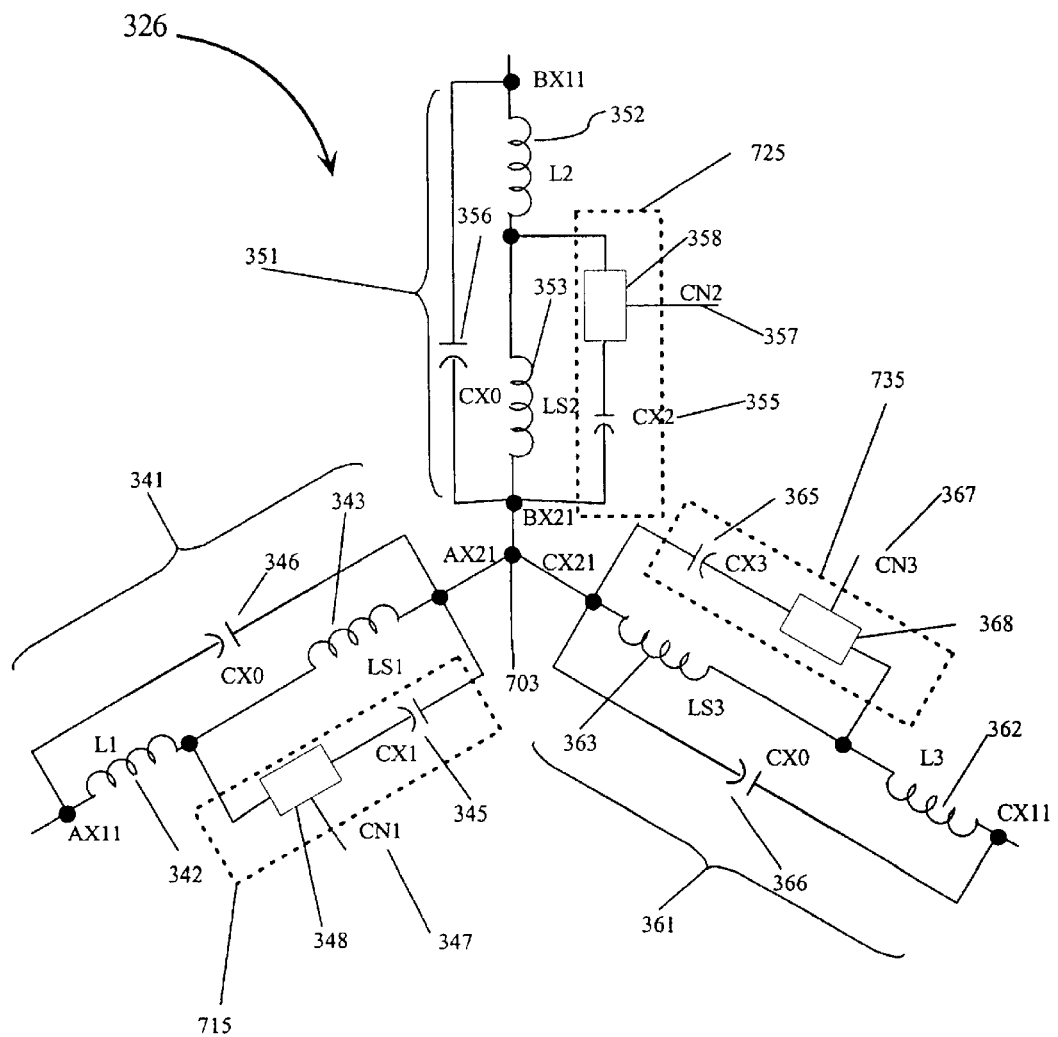
FIG. 3H is a circuit diagram of a Wye configured auxiliary control winding made by connecting control windings in FIGS. 3E, 3F, and 3G.

FIG. 3H is a circuit diagram illustrating a three phase control winding 326 according to embodiments of the present invention made by interconnecting branch control windings 341, 351 and 361 described in FIGS. 3E, 3F, and 3G respectively. Control winding 326 is configured as a three phase We winding. The electronic switches SX 348, 358 and 368 along with their corresponding switched capacitors CX1 345, CX2 355 and CX3 365 are designated as control elements 715, 725 and 735 respectively. While the particular control elements are shown as having a bi-directional electronic switch (e.g., SX 348, 358 and 368) for connecting and disconnecting capacitors CX1 345, CX2 355 and CX3 365 respectively, a continuously electronically controllable capacitor would still be within the scope of the present invention.

Figure 3I:
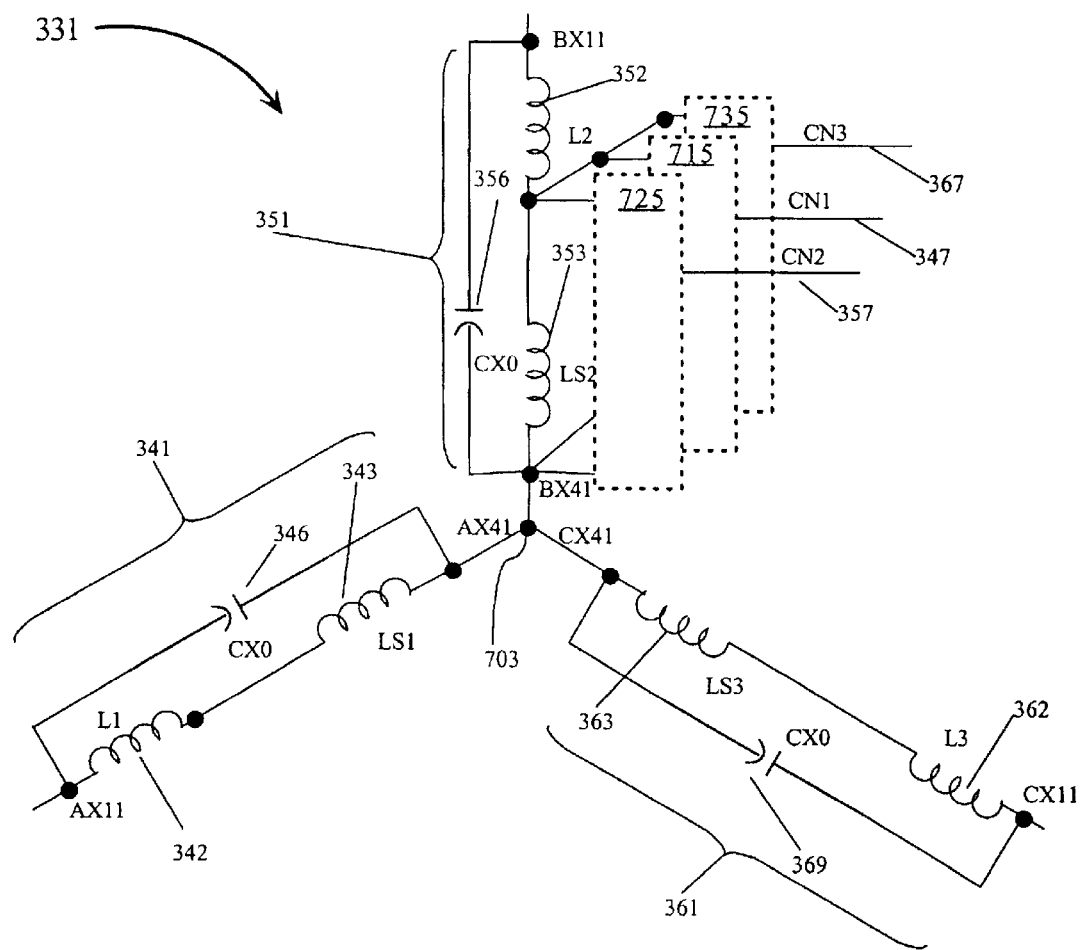
FIG. 3I is a circuit diagram of another embodiment of the present invention with a different connection of control elements.

FIG. 3I is a circuit diagram of control winding 331 where control elements 715, 725 and 735 are placed across a branch control inductance LS2 353. The control winding 331, in this example, is shown to have the same branch elements as control winding 326. In this manner, control elements 715, 725 and 735 may have the same values as when used for control winding 326. Therefore, control winding 331 can be used in a same manner as control winding 326. However, since the capacitors (CX1 345, CX2 355 and CX3 365 in control elements 715, 725 and 735 respectively) are added with no inductive isolation, more care would have to be taken to guarantee that the capacitor terminal voltages are very near a zero value to eliminate excessive transient currents. While this embodiment has a more stringent switching requirement, switching the capacitors within control winding 331 across only one inductive element (LS2 353) works and is within the scope of the present invention.

Figures 3J, 3K:
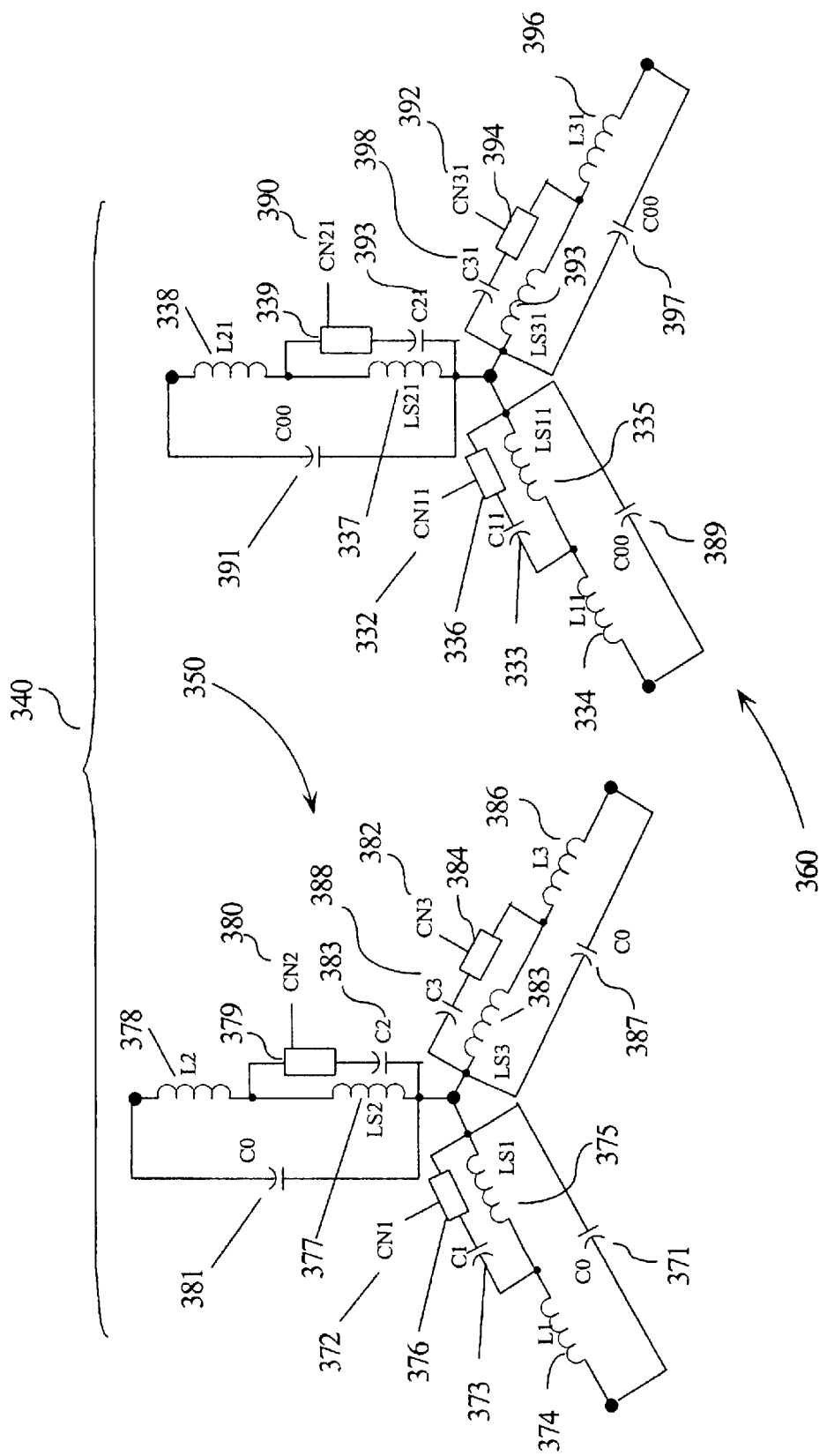
FIGS. 3J and 3K are circuit diagrams of multiple magnetically coupled control windings according to the topology of FIG. 3H used in embodiments of the present invention to provide higher resolution of control.

FIGS. 3J and 3K are circuit diagrams of another embodiment of the present invention. In this embodiment, a control winding 340 is partitioned into two control windings 350 and 360. Control winding 340 can be used in a same manner as control windings 326 or 331. Control windings 350 and 360 may be wound according to the topology for control winding 326. For example, branch winding element L2 378 would be wound on the same stator teeth in the same way as L21 338, however their respective electrical terminals would be kept isolated creating two electrically independent but magnetically coupled elements. In the same manner, branch winding elements LS2 377 and LS21 337 would be would on the same stator teeth again keeping their respective electrical terminals isolated. Repeating this for all three of the three phase branch control windings enables two magnetically coupled control windings that are electrically isolated. Branch windings may be designed so that the operation of a branch comprising L2 378 and LS2 377 and corresponding capacitor C0 381 and a magnetically coupled branch L21 338, LS21 337 and capacitor C00 391 is the same as a corresponding branch comprising L2 352, LS2 353 and CX0 356 of control winding 331 (FIG. 3I) and control winding 326 (FIG. 3H). If the partitioned control winding 340 is made to be equivalent to control windings 326 or 331 in this manner on all three branches, an extra level of control is possible allowing for a finer control of added capacitance of a load range.

Figure 4A:
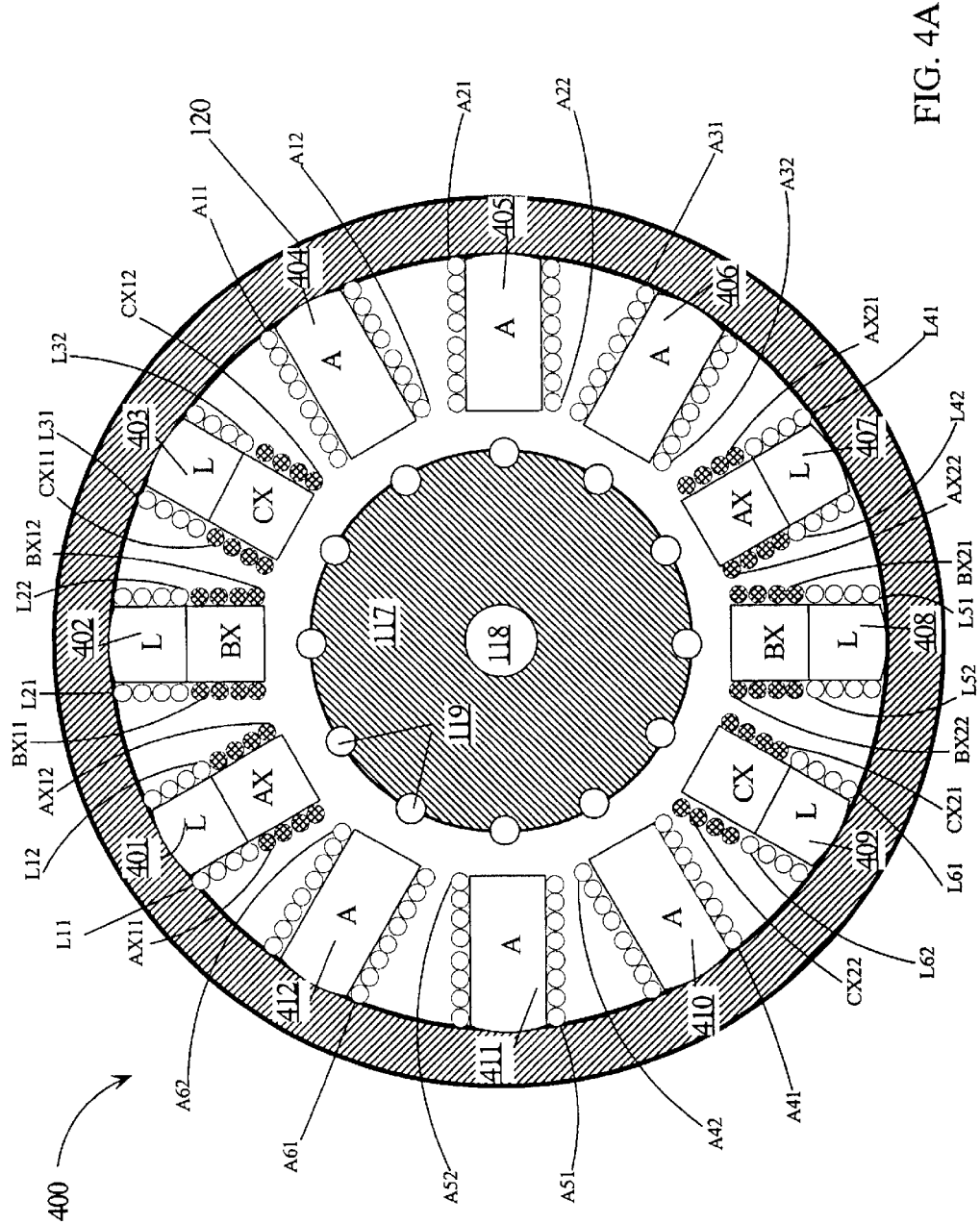
FIG. 4A illustrates a cross-section of an induction machine configured to enable two single phase two pole energy windings and a three phase auxiliary winding structure used in embodiments of the present invention where the auxiliary winding is magnetically coupled to one of the energy windings and electrically isolated from both the energy windings.

FIG. 4A is a cross-section of another induction machine 400 according to embodiments of the present invention. The stator 120, rotor 117 and rotor windings 119 are given the same designators. Since the teeth of the stator are wound differently in this embodiment, the teeth are given different designators. Induction machine 400 is wound as having two single phase windings (L and A) and one three phase (AX, BX and CX) auxiliary winding. Induction machine 400 has stator teeth 401–412. Coils L401, L402, L403, L407, L408, and L409 are wound on teeth 401, 402, 403, 407, 408 and 409 respectively to produce two magnetic poles (North and a South). Likewise, coils A404, A405, A406, A410, A411, and A412 are wound on teeth 404, 405, 406, 410, 411, and 412 respectively to create two magnetic poles (North and a South). Auxiliary coils AX401 and AX407 are wound on teeth 401 and 407, auxiliary coils BX402 and BX408 are wound on teeth 402 and 408, and auxiliary coils CX403 and CX409 are wound on teeth 403 and 409 to each create 2 magnetic poles (North and South). The electrical terminal designations follow the same convention as described in FIG. 2A.

Figure 4B:
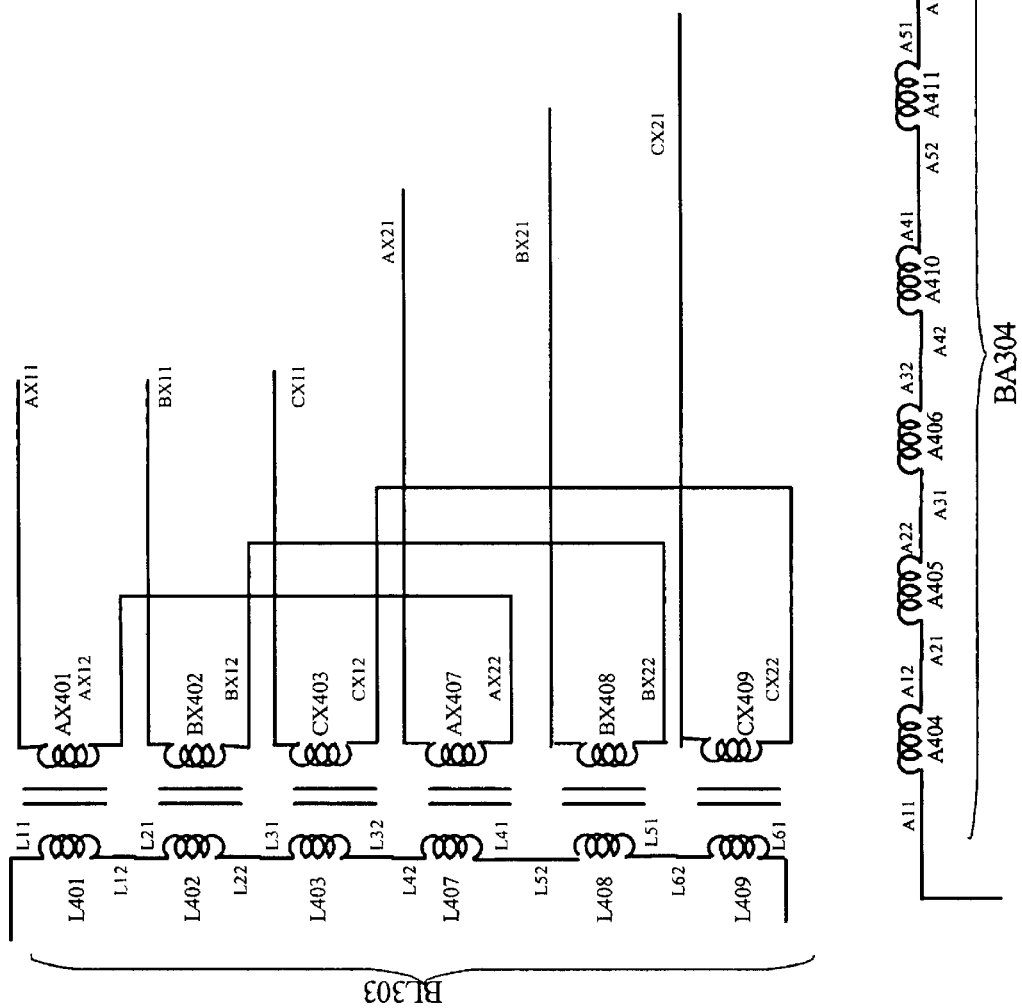
FIG. 4B is a circuit diagram illustrating a connection of energy and auxiliary coils according to the embodiment of the present invention in FIG. 4A.

FIG. 4B is a circuit diagram illustrating how the individual coils are connected and the magnetic couplings for the induction machine 400. The coils L401, L402, L403, L407, L408, and L409 are connected in their electrical terminal sequence shown in FIG. 4B to create a two pole single phase energy winding BL303. Likewise, a second two pole single phase energy winding BA304 is created by connecting the electrical terminals of the energy coils A404, A405, A406, A410, A411 and A412 in the sequence shown. Auxiliary coils AX401, BX402, CX403, AX407, BX408, and CX409 are magnetically coupled (wound on the same stator tooth) to energy coils L401, L402, L403, L407, L408, and L409 respectively. Auxiliary coils AX401, BX402, CX403, AX407, BX408, and CX409 are connected with the electrical terminal sequence shown to create three branch auxiliary windings with electrical terminals AX11, BX11, CX11, AX21, BX21, and CX21.

Figure 4C:
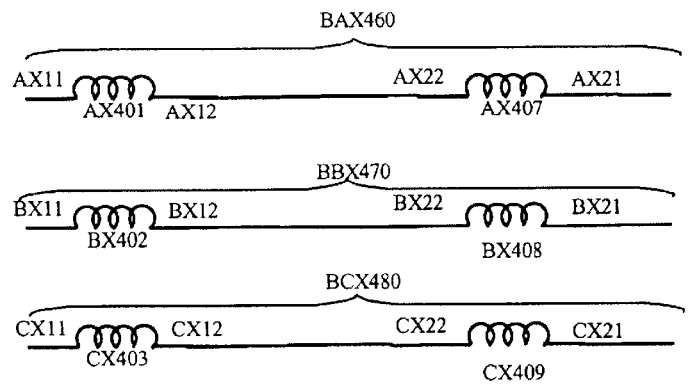
FIG. 4C is a circuit diagram illustrating connections of individual coils for branch energy and auxiliary windings used in an embodiment of the present invention in FIG. 4A.

FIG. 4C is a circuit diagram of the branch windings introduced in FIG. 4B. Auxiliary coils AX401 and AX407 are coupled to form branch auxiliary winding BAX460. Auxiliary coils BX402 and BX408 are coupled to form auxiliary branch winding BBX470. Likewise, auxiliary coils CX403 and CX409 are coupled to branch auxiliary winding BCX480.

Figure 4D:
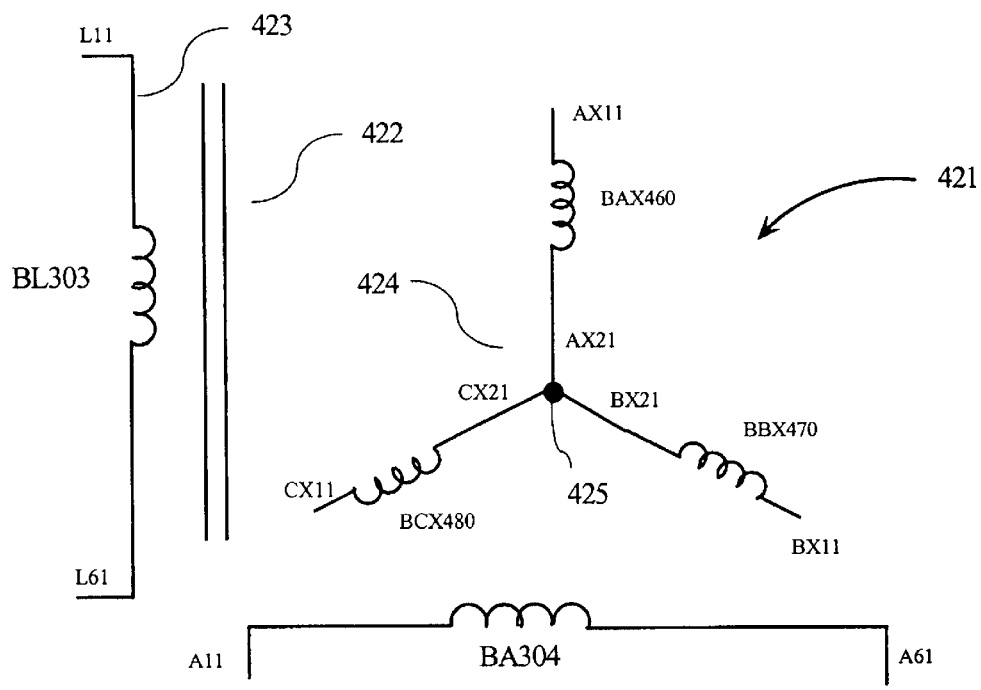
FIG. 4D is a circuit diagram illustrating a three phase Wye configured auxiliary windings and two single phase Wye configured energy winding with one of the single phase energy windings magnetically coupled to an energy winding.

FIG. 4D is a circuit diagram of single phase energy winding BA304 and single phase energy winding BL303 which is magnetically coupled (422) to three phase We configured auxiliary winding 424. Three phase auxiliary winding 424 is created by connecting electrical terminals AX21, BX21, and CX21 of branch auxiliary windings BAX460, BBX470 and BCX480, respectively, creating circuit node 425. Three phase auxiliary winding 424 has terminals AX11, BX11 and CX11. Energy winding BL303 has input or output terminals L11 and L61, while energy winding BA304 has input or output terminals A11 and A61. Note that energy windings BA304 and BL303 are magnetically and electrically isolated. Magnetic coupling of energy windings BA304 and BL303 only occurs due to their rotational interaction with rotor 117.

Figure 4E:
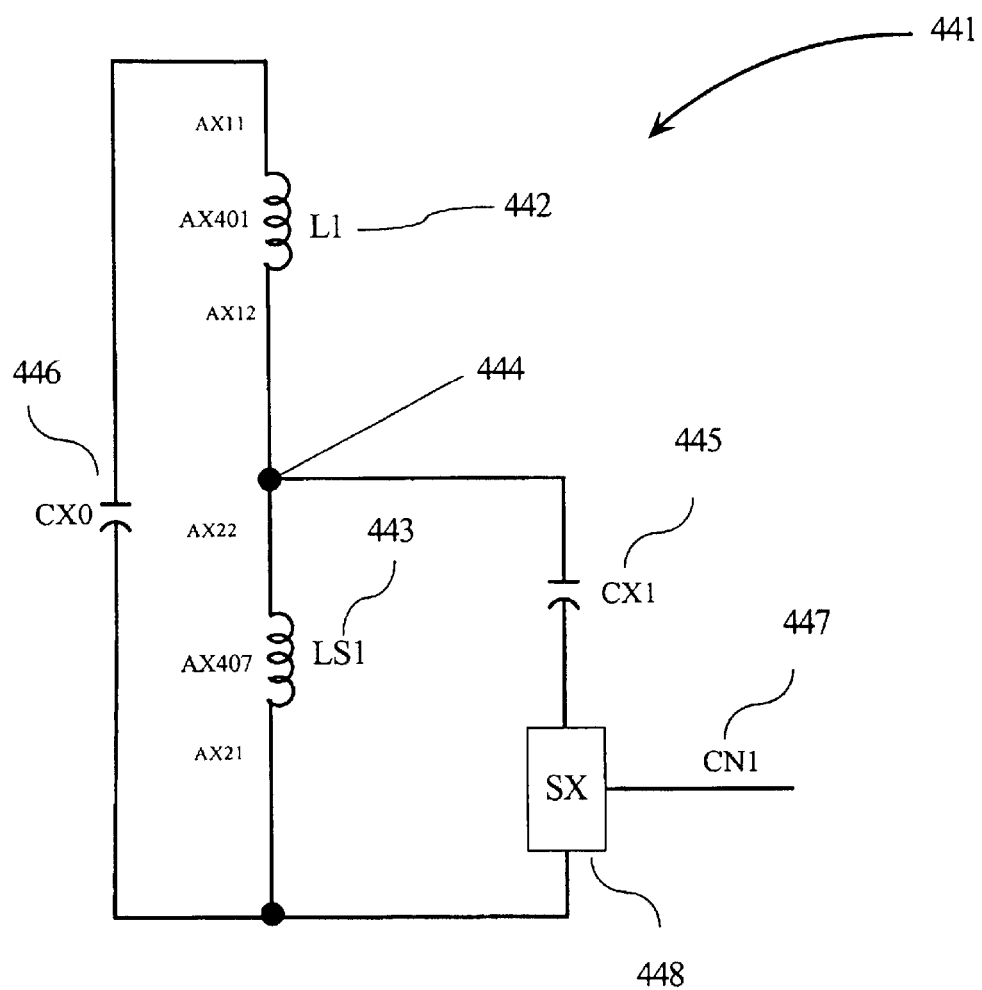
FIGS. 4E, 4F, and 4G are circuit diagrams of individual branch windings from FIG. 3C wired to control elements to make branch control windings according to one embodiment of the present invention.

FIG. 4E is a circuit diagram of the inductance elements (coils) AX401 and AX407 which make up auxiliary branch winding BAX460, as described in FIG. 4C, wired to form control branch winding 441 according to embodiments of the present invention. Coil AX401 forms an inductance L1 442 and coil AX407 forms an inductance LS1 443. This is a partitioning of an auxiliary winding discussed previously herein. The connection of inductances L1 442 and LS1 443 creates a circuit node 444. A series circuit connection of capacitor CX1 445 and electronic AC switch SX 448 is are connected from node 444 to electrical terminal AX21 on coil AX407. A second capacitor CX0 446 is connected from electrical terminal AX11 on coil AX401 to terminal AX21 on coil AX407. Electronic AC switch SX 448 has a control input CN1 447 which is used in embodiments of the present invention to switch capacitor CX1 445 into and out of control branch winding 441.

Figure 4F:
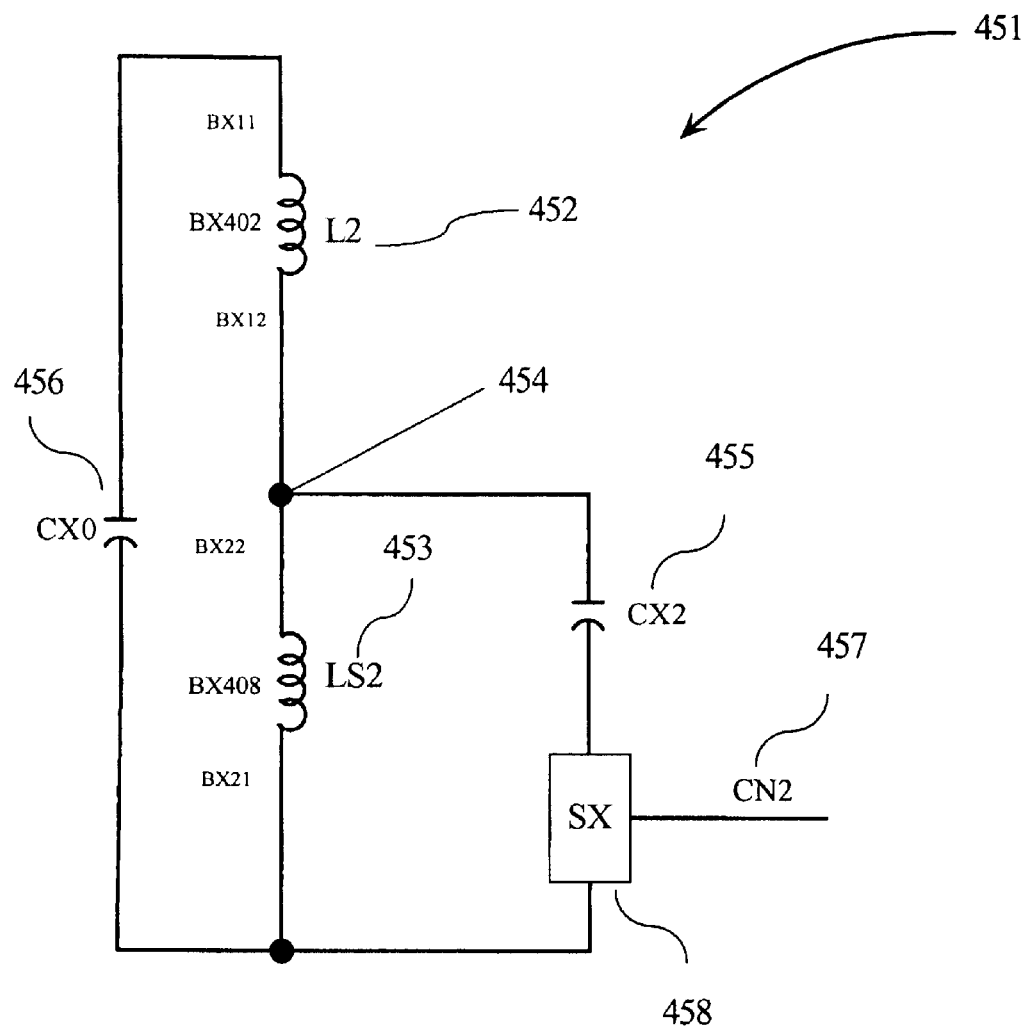

FIG. 4F is a circuit diagram of the inductance elements (coils) BX402 and BX408 which make up auxiliary branch winding BBX470, as described in FIG. 4C, wired to form control branch winding 451 according to embodiments of the present invention. Coil BX402 forms an inductance L2 452 and coil BX408 forms an inductance LS2 453. This is the partitioning of an auxiliary winding discussed previously herein. The connection of inductances L2 452 and LS2 453 creates a circuit node 454. A series circuit connection of capacitor CX2 455 and electronic AC switch SX 458 are connected from node 454 to electrical terminal BX21 on coil BX408. A second capacitor CX0 456 is connected from electrical terminal BX11 on coil BX402 to terminal BX21 on coil BX408. Electronic AC switch SX 458 has a control input CN2 457 which is used in embodiments of the present invention to switch capacitor CX2 455 into and out of control branch winding 451.

Figure 4G:
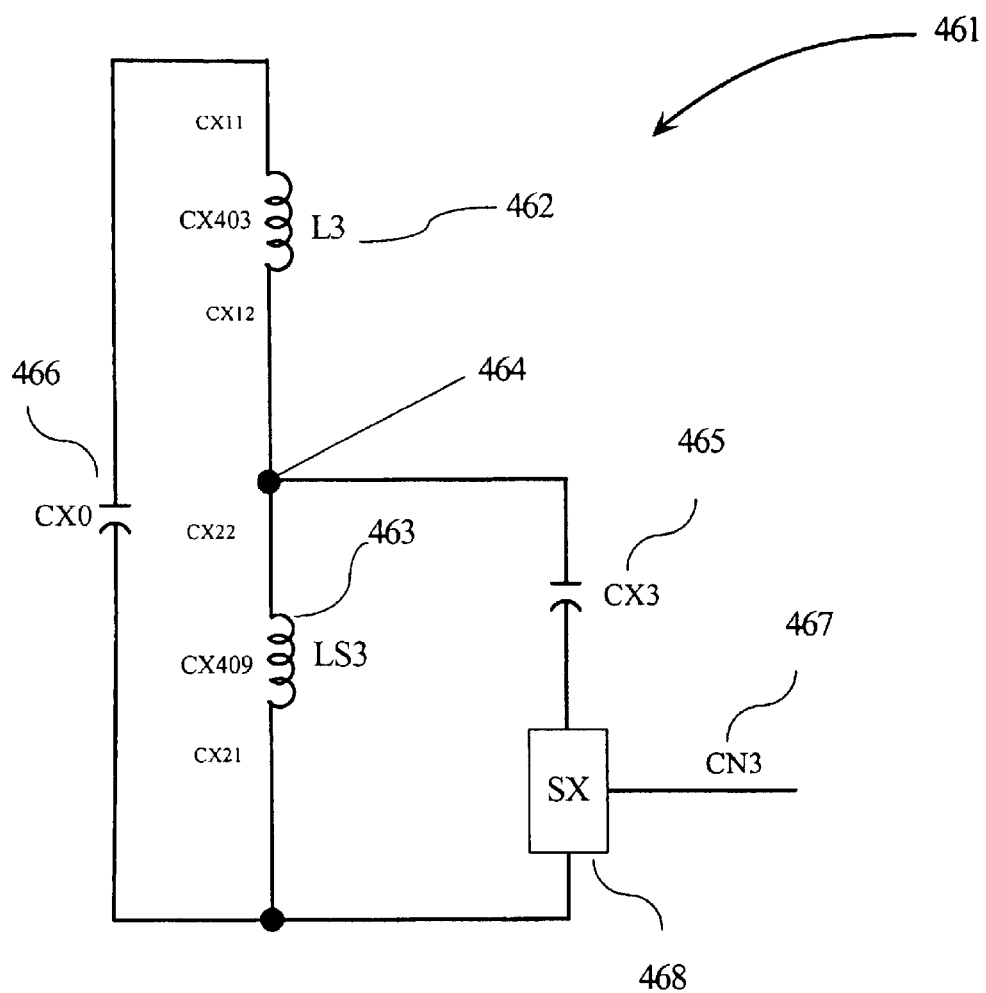

FIG. 4G is a circuit diagram of the inductance elements (coils) CX403 and CX409 which make up auxiliary branch winding BCX480, as described in FIG. 4C, wired to form control branch winding 461 according to embodiments of the present invention. Coil CX403 forms an inductance L3 462 and coil CX409 forms an inductance LS3 463. This is the partitioning of an auxiliary winding discussed previously. The connection of inductances L3 462 and LS3 463 creates a circuit node 464. A series circuit connection of capacitor CX3 465 and electronic AC switch SX 468 is connected from node 464 to electrical terminal CX21 on coil CX409. A second capacitor CX0 466 is connected from electrical terminal CX11 on coil CX403 to CX21 on coil CX409. Electronic AC switch SX 468 has a control input CN3 467 which is used in embodiments of the present invention to switch capacitor CX3 465 into and out of control branch winding 461.

Figure 4H:
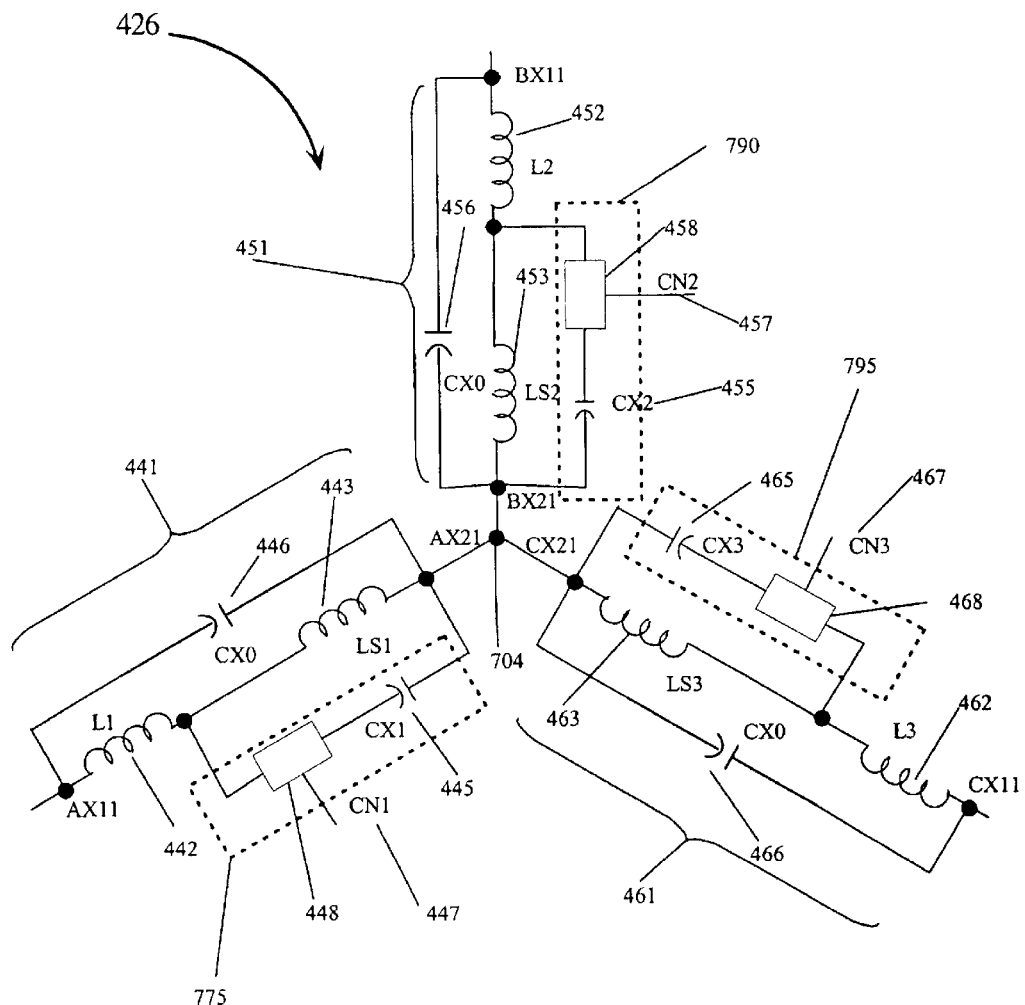
FIG. 4H is a circuit diagram of a Wye configured auxiliary control winding made by connecting control windings in FIGS. 4E, 4F, and 4G.

FIG. 4H is a circuit diagram illustrating a three phase control winding 426 according to embodiments of the present invention made by interconnecting branch control windings 441, 451 and 461 described in FIGS. 4E, 4F, and 4G respectively. Control winding 426 is configured as a three phase We winding. The electronic switches SX 448, 458 and 468 along with their corresponding switched capacitors CX1 445, CX2 455 and CX3 465 are designated as control elements 775, 790 and 795 respectively. While the particular control elements are shown as having a bi-directional electronic switch (e.g., SX 448, 458 and 468) for connecting and disconnecting capacitors CX1 445, CX2 455 and CX3 465, a continuously electronically controllable capacitor would still be within the scope of the present invention.

Figure 4I:
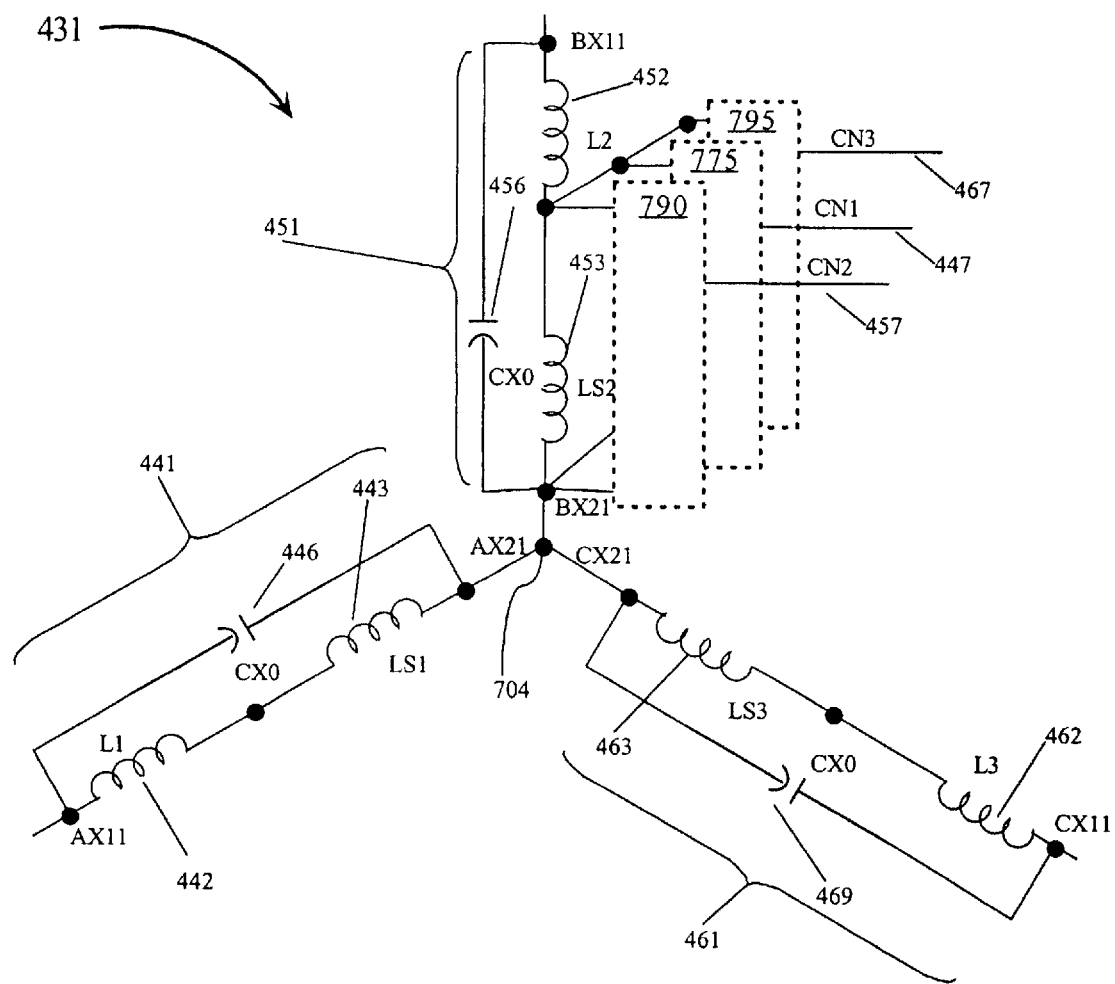
FIG. 4I is a circuit diagram of another embodiment of the present invention with a different connection of control elements.

FIG. 4I is a circuit diagram of control winding 431 where control elements 775, 790 and 795 are placed across a branch control inductance LS2 453. The control winding 431, in this example, is shown to have the same branch elements as control winding 426. Therefore, control winding 431 can be used in a same manner as control winding 426. In this manner, control elements 775, 790 and 795 may have the same values as when used for control winding 426. However, since the capacitors (CX1 445, CX2 455 and CX3 465 in control elements 775, 790 and 795 respectively) are added with no inductive isolation, more care would have to be taken to guarantee that the capacitor terminal voltages are very near a zero value to eliminate excessive transient currents. While this embodiment has a more stringent switching requirement, switching the capacitors within control winding 431 across only one inductive element (LS2 453) works and is within the scope of the present invention.

Figures 4J, 4K:
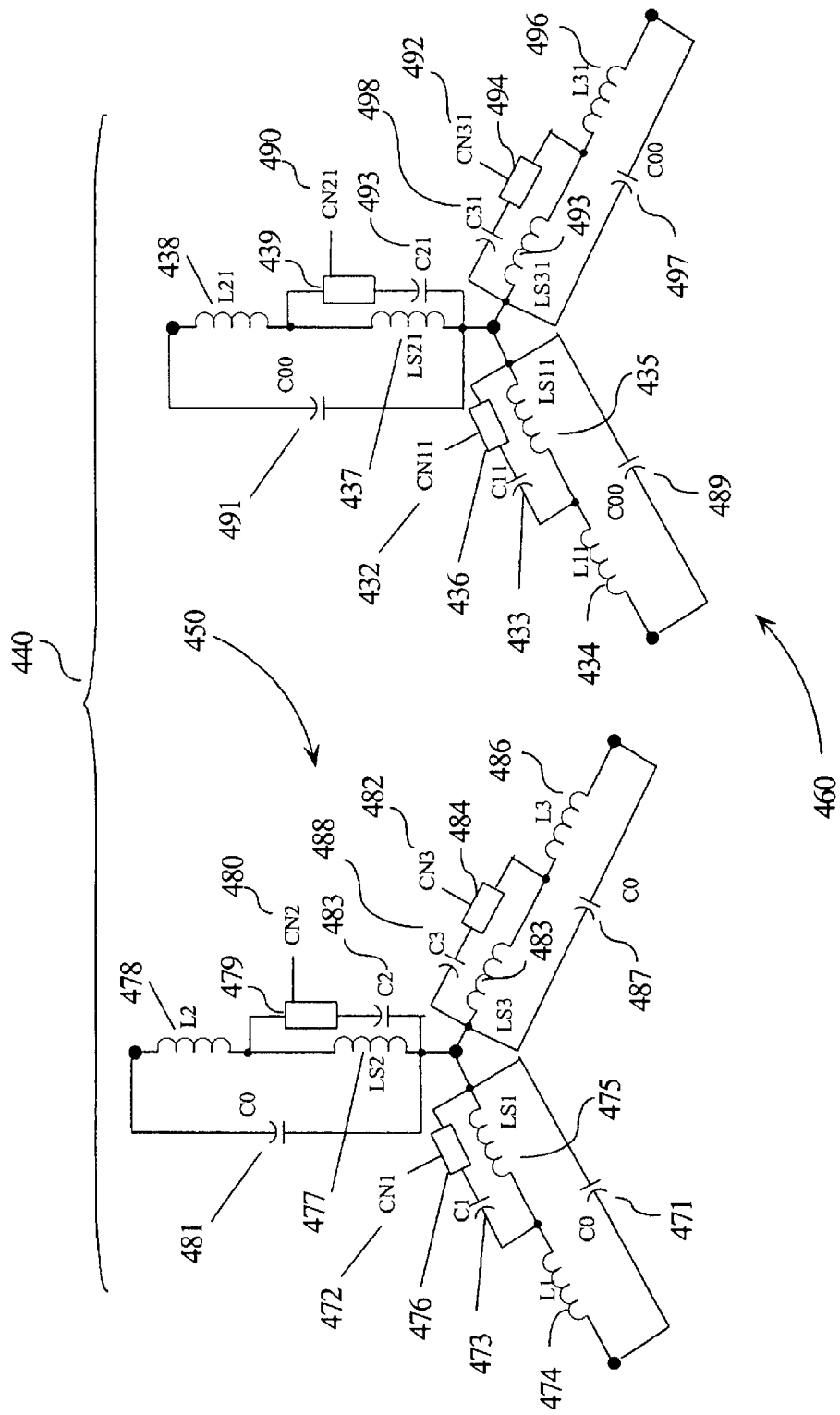
FIGS. 4J and 4K are circuit diagrams of multiple magnetically coupled control windings according to the topology of FIG. 4H used in embodiments of the present invention to provide higher resolution of control.

FIGS. 4J and 4K are circuit diagrams of another embodiment of the present invention. In this embodiment, a control winding 440 is partitioned into two control windings 450 and 460. Control winding 440 can be used in a same manner as control windings 426 or 431. Control windings 450 and 460, in this embodiment, may be wound according to the topology for control winding 426. For example branch winding element L2 478 would be wound on the same stator teeth in the same way as L21 438, however their respective electrical terminals would be kept isolated creating two electrically independent but magnetically coupled elements. In the same manner, branch winding element LS2 477 and LS21 437 would be wound on the same stator teeth again keeping their respective electrical terminals isolated. Repeating this for all three of the three phase branch control windings enables two magnetically coupled control windings that are electrically isolated. Branch windings may be designed so that the operation of a branch comprising L2 478 and LS2 477 and corresponding capacitor C0 481 and a magnetically coupled branch L21 438, LS21 437 and capacitor C00 491 is the same as the corresponding branch comprising L2 452, LS2 453 and CX0 456 (see FIGS. 4H and 4I). If the partitioned control winding 440 is made to be equivalent to control winding 426 in this manner on all three branches, an extra level of control is possible allowing for a finer control of added capacitance of a load range.

Figure 6A:
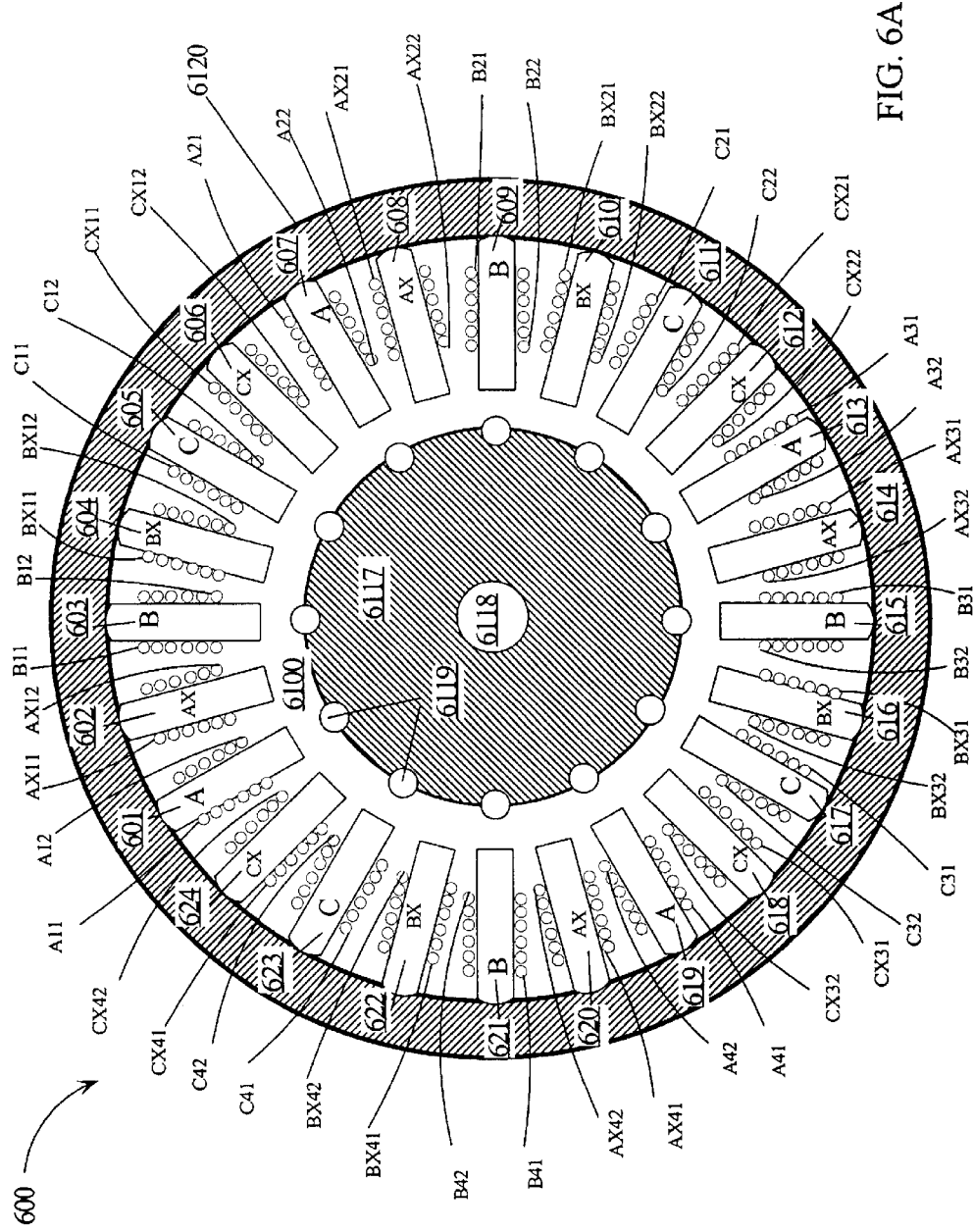
FIG. 6A illustrates a cross-section of an induction machine with a three phase four pole energy and auxiliary winding structure used in embodiments of the present invention where the auxiliary winding is magnetically and electrically isolated from the energy winding.

FIG. 6A is a cross-section of an induction machine 600. Induction machine 600 has a stator 6120 with "teeth" 601–624 on which corresponding energy coils, A601, A607, A613, A619, B603, B609, B615, B621, C605, C611, C617, C623 and auxiliary coils AX602, AX608, AX614, AX620, BX604, BX610, BX616, BX622, CX606, CX612, CX618, CX624 are wound. Rotor 6117 is rotatable disposed within and on the center axis of the stator 6120 and rotates on shaft 6118. Rotor 6117 has coils (e.g., 6119) wound in slots on its outer surface. Magnetic flux lines (e.g., like 501) couple to the rotor 6117 and thus to rotor coils through the circumferential air gap 6100 between the rotor 6117 and stator 6120. Rotor coils, like exemplary coils 6119, are typically shorted loops which create a "squirrel cage" rotor design. Induction machine 600 is configured so that the energy and auxiliary coils may be wound to form a 4 pole three phase energy winding and a 4 pole three phase auxiliary winding where the energy winding and the auxiliary winding are magnetically and electrically isolated.

Figure 6B:
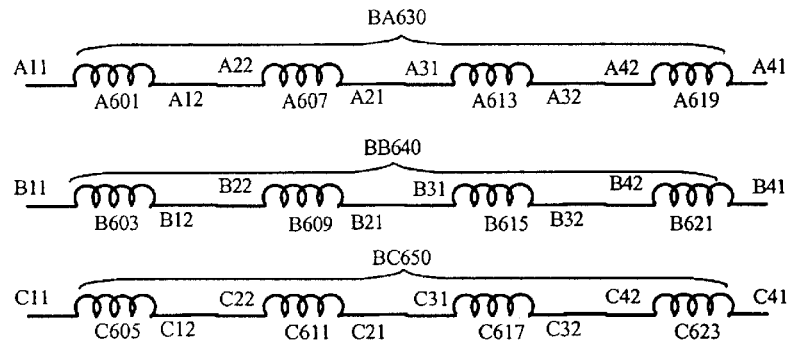
FIGS. 6B and 6C are circuit diagrams illustrating connections of individual coils for branch energy and auxiliary windings used in an embodiment of the present invention in FIG. 6A.

FIG. 6B is a circuit diagram of the connection sequence for the coils (e.g., A601, A607, A613, A619) on stator teeth 601–624. The particular electrical connection of the terminals, A12 to A22 and A21 to A31 and A32 to A42, for coils A601, A607, A613, A619, creates a North magnetic pole at teeth 601 and 619 and a South magnetic pole at teeth 607 and 613 for a current flow into terminal A11 and out of terminal A41. The connection of coils A601, A607, A613, A619 creates a branch energy winding BA630. A same connection sequence for coils B603, B609, B615, B621 (B12 to B22 and B21 to B31 and B32 to B42) creates branch energy winding BB640. For a current flow into terminal B11 and out of terminal B41, branch winding BB640 creates a North magnetic pole at teeth 603 and 621 and a South magnetic pole at teeth 609 and 615. Likewise, a same connection sequence for coils C605, C611, C617, C623 (C12 to C22 and C21 to C31 and C32 to C42) creates branch energy winding BC650. For a current flow into terminal C11 and out of terminal C41, branch energy winding BC650 creates a North magnetic pole at teeth 605 and 623 and a South magnetic pole at teeth 611 and 617.

Figure 6C:
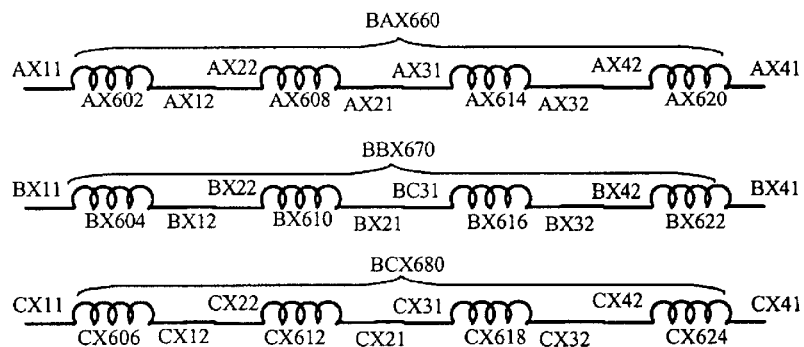

FIG. 6C is a circuit diagram of the connection sequence for the auxiliary coils AX602, AX608, AX614, AX620 to create auxiliary branch winding BAX660, auxiliary coils BX604, BX610, BX616, BX622 to create auxiliary branch winding BBX670, and auxiliary coils CX606, CX612, CX618, CX624 to create auxiliary branch winding BCX680. The circuit diagrams in FIG. 6B and FIG. 6C illustrate the symmetrical wiring employed in winding induction machines used in embodiments of the present invention. It should be noted that the branch windings (BAX660, BBX670 and BCX680) are a series connection of individual inductances whose interconnection points may form intermediate nodes that may be wired to additional circuit elements. For example, the connection node of exemplary terminals A12 and A22 may have their connection wired so that additional external components may be used. Embodiments of the present invention use the partitioning of the auxiliary branch windings BAX660, BBX670 and BCX680 to create a control winding for induction generator configurations.

Figure 6D:
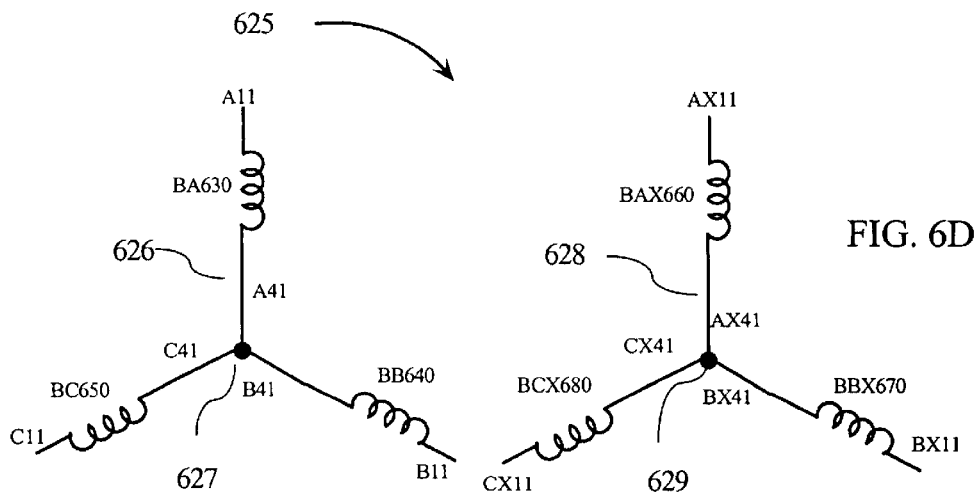
FIG. 6D is a circuit diagram of a three phase Wye configured energy and auxiliary winding made by connecting circuit elements of FIGS. 6B and 6C.

FIG. 6D is a circuit diagram that illustrates the magnetic and electrical structure created when branch energy windings BA630, BB640 and BC650 are configured as a We three phase energy winding 626 by connecting terminals A41, B41 and C41 creating a node 627, and branch auxiliary windings BAX660, BBX670 and BCX680 are configured as a We three phase winding 628 by connecting terminals AX41, BX41 and CX41 creating node 629. Nodes 627 and 629 are electrically neutral potential points with respect to the three phase windings 626 and 628, respectively, and may be used in embodiments of the present invention as a ground or reference point. Electrical terminals A11, C11 and B11 and node 627 may be wired to external inputs or outputs (not shown). Likewise, electrical terminals AX11, CX11 and BX11 and node 629 may be wired to external circuits to create a control winding according to embodiments of the present invention.

Figure 6E:
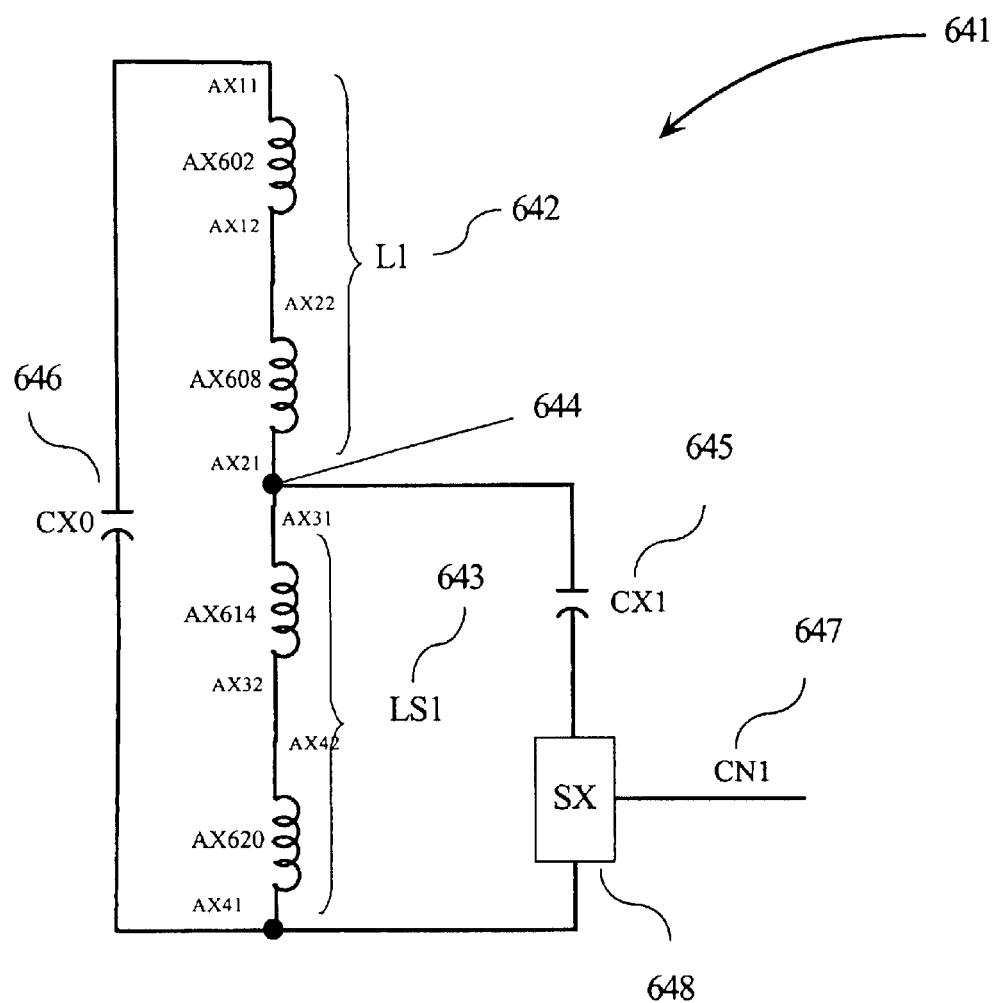
FIGS. 6E, 6F, and 6G are circuit diagrams of individual branch windings from FIGS. 6B and 6C wired to control elements to make branch control windings according to one embodiment of the present invention.

FIG. 6E is a circuit diagram of the inductance elements (coils) AX602, AX608, AX614, and AX620 which make up auxiliary branch winding BAX660, as described in FIG. 6C, wired to form control branch winding 641 according to embodiments of the present invention. Coils AX602 and AX608 form a series inductance L1 642, and coils AX614 and AX620 form a series inductance LS1 643. This is the partitioning of an auxiliary winding discussed previously herein. The connection of inductances L1 642, and LS1 643 creates a circuit node 644. A series circuit connection of capacitor CX1 645 and electronic AC switch SX 648 is connected from node 644 to electrical terminal AX41 on coil AX620. A second capacitor CX0 646 is connected from electrical terminal AX11 on coil AX602 to AX41 on coil AX620. Electronic AC switch SX 648 has a control input CN1 647 which is used in embodiments of the present invention to switch capacitor CX1 645 into and out of control branch winding 641.

Figure 6F:
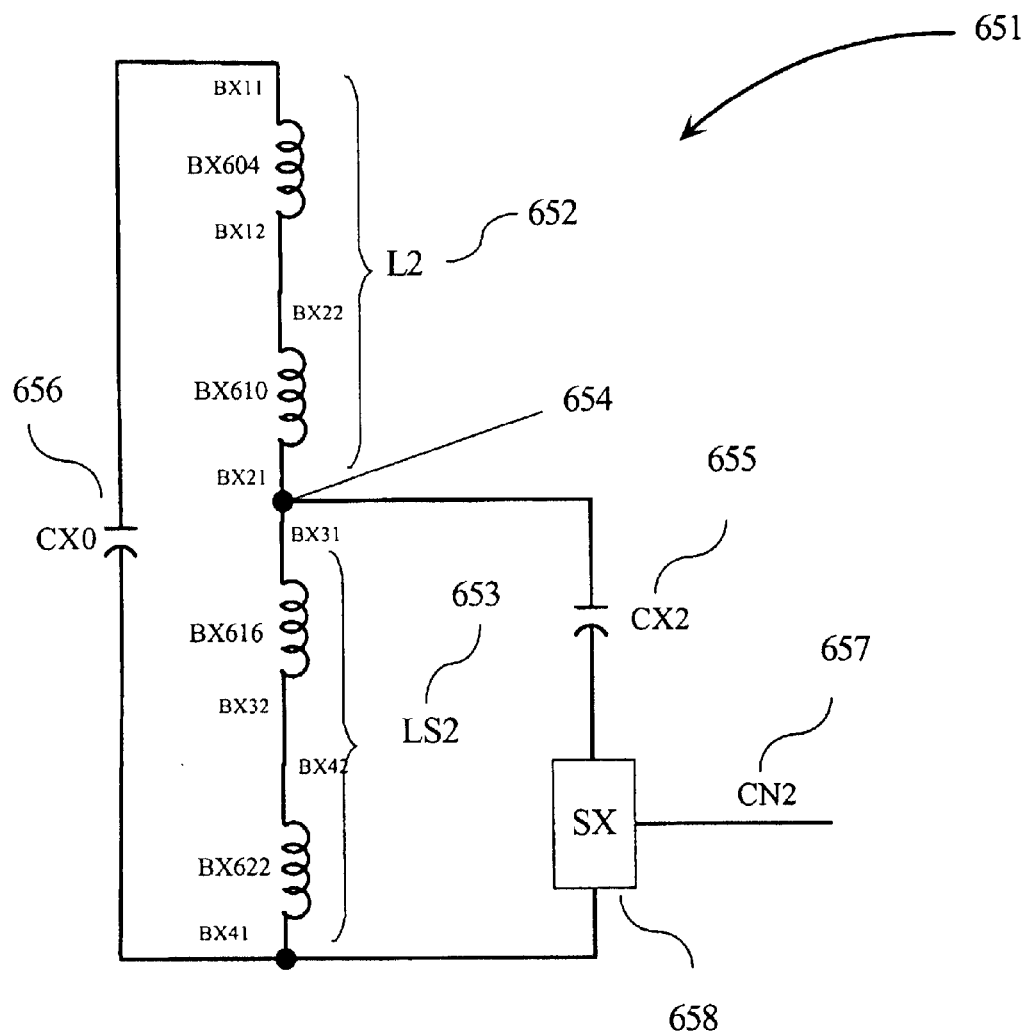

FIG. 6F is a circuit diagram of the inductance elements (coils) BX604, BX610, BX616, and BX622 which make up auxiliary branch winding BBX670, as described in FIG. 6C, wired to form control branch winding 651 according to embodiments of the present invention. Coils BX604 and BX610 form a series inductance L2 652, and coils BX616 and BX622 form a series inductance LS2 653. This is the partitioning of an auxiliary winding discussed previously. The connection of inductances L2 652 and LS2 653 creates a circuit node 654. A series circuit connection of capacitor CX2 655 and electronic AC switch SX 658 is connected from node 654 to electrical terminal BX41 on coil BX622. A second capacitor CX0 656 is connected from electrical terminal BX11 on coil BX604 to BX41 on coil BX622. Electronic AC switch SX 658 has a control input CN2 657 which is used in embodiments of the present invention to switch capacitor CX2 655 into and out of control branch winding 651.

Figure 6G:
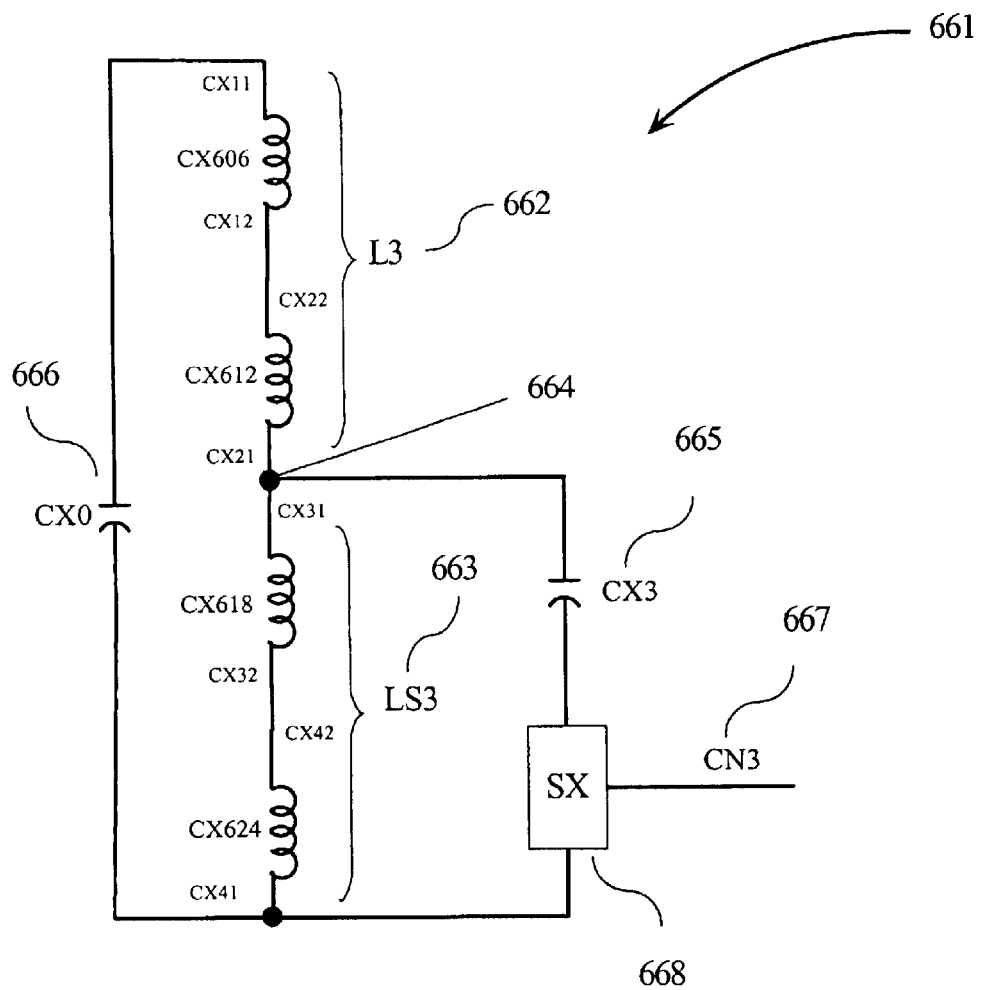

FIG. 6G is a circuit diagram of the inductance elements (coils) CX606, CX612, CX618, and CX624 which make up auxiliary branch winding BCX680, as described in FIG. 6C, wired to form control branch winding 661 according to embodiments of the present invention. Coils CX606 and CX612 form a series inductance L3 662, and coils CX618 and CX624 form a series inductance LS2 663. This is the partitioning of an auxiliary winding discussed previously. The connection of inductances L3 662 and LS3 663 creates a circuit node 664. A series circuit connection of capacitor CX3 665 and electronic AC switch SX 668 is connected from node 664 to electrical terminal CX41 on coil CX624. A second capacitor CX0 666 is connected from electrical terminal CX11 on coil CX606 to CX41 on coil CX624. Electronic AC switch SX 668 has a control input CN3 667 which is used in embodiments of the present invention to switch capacitor CX3 665 into and out of control branch winding 661.

Figure 6H:
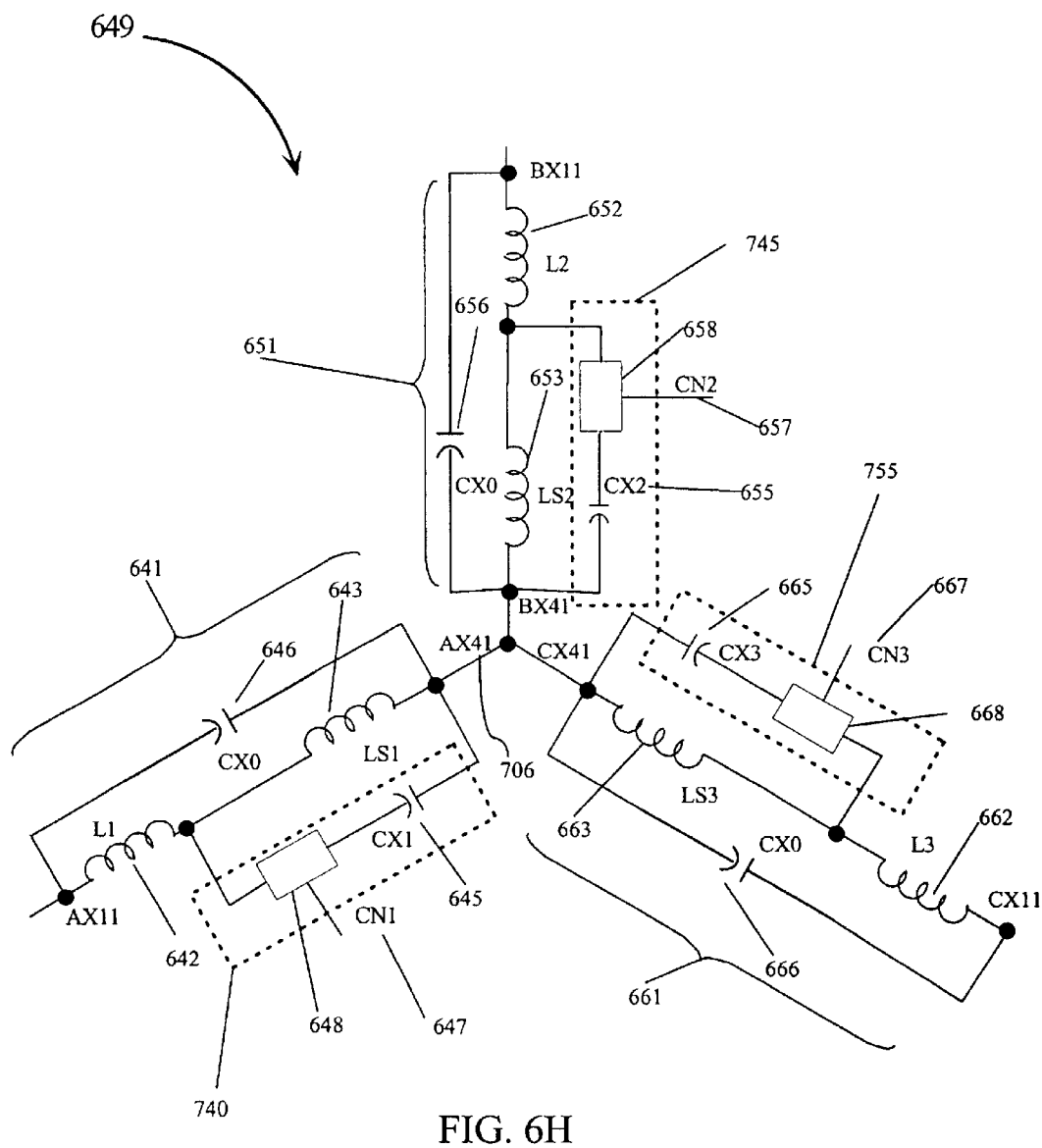
FIG. 6H is a circuit diagram of a Wye configured auxiliary control winding made by connecting control windings in FIGS. 6E, 6F, and 6G.

FIG. 6H is a circuit diagram illustrating a three phase control winding 649 according to embodiments of the present invention made by interconnecting branch control windings 641, 651 and 661 described in FIGS. 6E, 6F, and 6G respectively. Control winding 649 is configured as a three phase We winding. The electronic switches SX 648, 658 and 668 along with their corresponding switched capacitors CX1 645, CX2 655 and CX3 665 are designated as control elements 740, 745 and 755 respectively. While the particular control elements are shown as having a bi-directional electronic switch (SX 648, 658 and 668) for connecting and disconnecting capacitors CX1 645, CX2, 655 and CX3 665 a continuously electronically controllable capacitor would still be within the scope of the present invention.

Figure 6I:
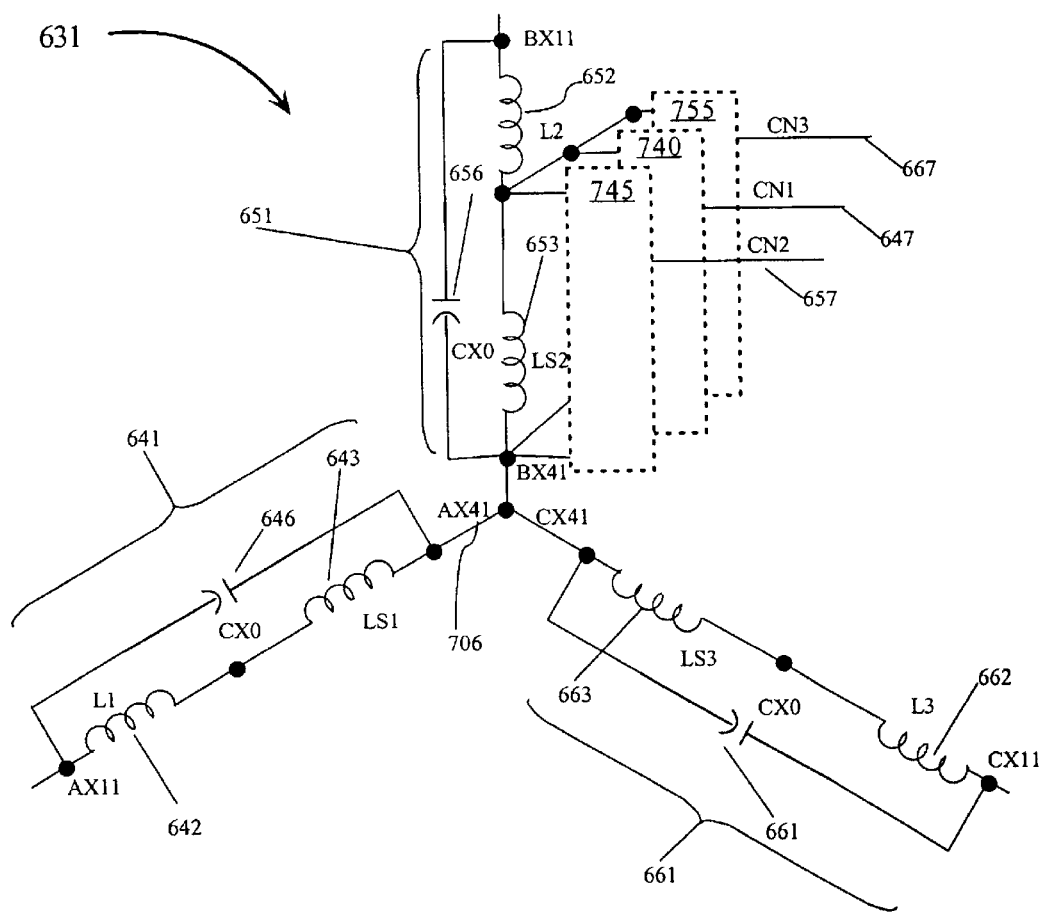
FIG. 6I is a circuit diagram of another embodiment of the present invention with a different connection of control elements.

FIG. 6I is a circuit diagram of a control winding 631 where control elements 740, 745 and 755 are placed across a branch control inductance LS2 653. The control winding 631, in this example, is shown to have the same branch elements as control winding 649. Therefore, control winding 631 can be used in a same manner as control winding 649. In this manner control elements 740, 745 and 755 may have the same component values as when used for control winding 649. However, since the capacitors CX1 645, CX2 655 and CX3 665 are added with no inductive isolation, more care would have to be taken to guarantee that the capacitor terminal voltages were very near a zero value to eliminate excessive transient currents. While this embodiment has a more stringent switching requirement, switching the capacitors within control winding 631 across only one inductive element (LS2 653) works and is within the scope of the present invention.

Figures 6J, 6K:
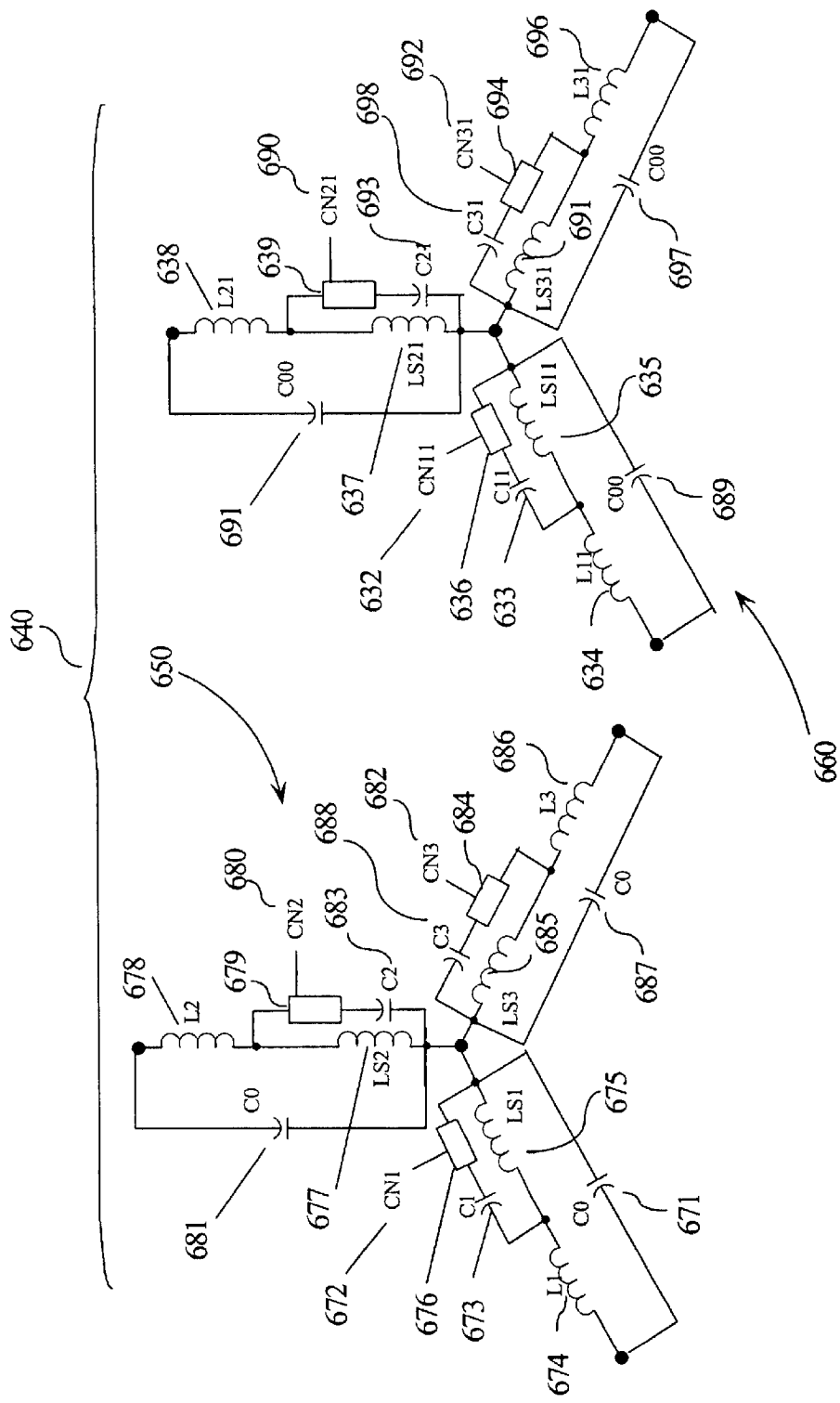
FIGS. 6J and 6K are circuit diagrams of multiple magnetically coupled control windings according to the topology of FIG. 6H used in embodiments of the present invention to provide higher resolution of control.

FIGS. 6J and 6K are circuit diagrams of another embodiment of the present invention. In this embodiment, a control winding 640 is partitioned into two control windings 650 and 660. Control winding 640 can be used in a same manner as control windings 649 or 631. Control windings 650 and 660 may be wound according to the topology for control winding 649. For example, branch winding element L2 678 would be wound on the same stator teeth in the same way as L21 638, however their respective electrical terminals would be kept isolated creating two electrically independent but magnetically coupled elements. In the same manner, branch winding element LS2 677 and LS21 637 would be wound on the same stator teeth again keeping their respective electrical terminals isolated. Repeating this for all three of the three phase branch control windings enables two magnetically coupled control windings that are electrically isolated.

Branch windings may be designed so that the operation of a branch comprising L2 678 and LS2 677 and corresponding capacitor C0 681 and a magnetically coupled branch L21 638, LS21 637 and capacitor C00 691 is the same as a corresponding branch comprising L2 652, LS2 653 and CX0 656 in branch control winding 649 of FIG. 6H. If the partitioned control winding 640 is made to be equivalent to control winding 649 in this manner on all three branches, an extra level of control is possible allowing for a finer control of added capacitance of a load range.

Figure 7A:
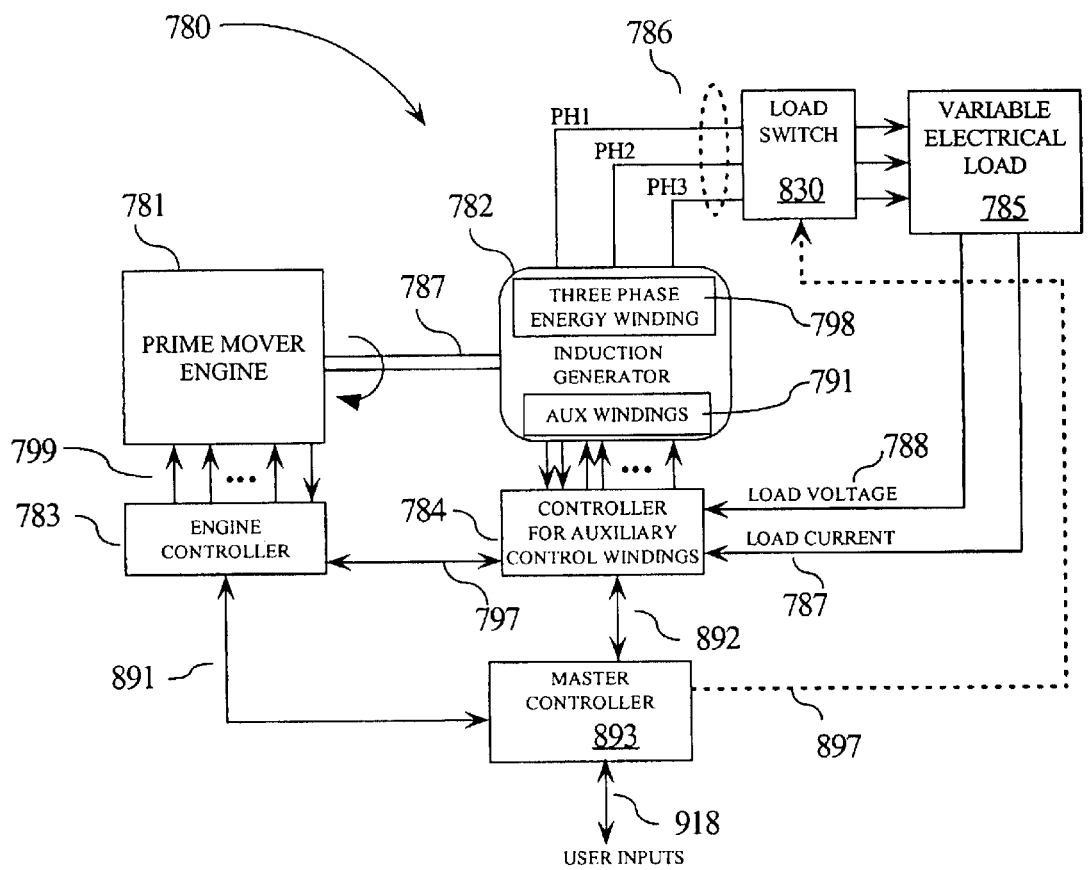
FIG. 7A is a block diagram of a system operating as a stand-alone self-excited induction generator supplying a variable load according to embodiments of the present invention.

FIG. 7A is a block diagram of an induction generating system 780 employing a stand-alone self-excited induction generator 782, according to embodiments of the present invention, driving a variable electrical load 785. Self-excited induction generator 782 may employ any of the compatible auxiliary control windings and energy windings described in the embodiments of FIGS. 1A–1L, 2A–2K, 2M–2N, 2P, 3A–3K, 4A–4K and 6A–6K for auxiliary (AUX) windings 791 and three phase energy windings 798. The particular embodiment for energy windings 798 would depend on whether single phase or three phase energy windings were desired.

Load switch 830 may engage to connect load 785 in response to conditions of outputs 786 or in response to an optional signal 897 from master controller 893. In FIG. 7A and in the other systems illustrated in FIGS. 7B, 8, 9, 10, and 11, master controller 893 and the signals (892 and 897) coupled to it from an engine controller (e.g., 783), a generator controller (e.g., 784) and a load switch (e.g., 830) may have the same designators for simplicity of the figures.

Master controller 893 sends and receives user signals 918 from a user interface (not shown). The signals establish the mode of operation for a system 780. Master controller 893 also receives engine status from signals 799 via engine controller 783, engine control and status signals 891, and induction generator 782 status from generator controller 784 via signals 892. Generator controller 784 also receives signals, load voltage 788 and load current 787, from load 785. Parameters of load voltage 788 and load current 787 (may include amplitude, phase, rate of change of voltage, rate of change of current, etc.). Master controller 893 may send signals to engine controller 783 indicating a desired engine speed, revolutions per minute (RPM) and engine controller 783 may exercise algorithms along with control signals 799 to cause ignition and throttle electrical and electro-mechanical devices to start and accelerate engine 781. Generator controller 784 would receive load voltage 788 and load current 787 signals and determine the capacitance needed in auxiliary windings 791 according to embodiments of the present invention and generate control signals that switch in appropriate capacitor (e.g., CX1 245, CX2 255 and CX3 265) combinations using control elements (e.g., 750, 760, and 770) to optimize auxiliary windings 791 for induction generator 782.

A prime mover engine 781 is used to supply rotational mechanical energy to induction generator 782 via a shaft 789. The induction generator 782 has three phase outputs 786, however other combinations of phase outputs (1 or 2 phase) are possible without departing from the scope of the present invention. Induction generator 782 employs a single energy winding that may be configured either as a three phase Wye or Delta circuit. Likewise, induction generator 782 may employ one or more auxiliary control windings as described in the embodiments of FIGS. 1A–1L, 2A–2K, 2M–2N, 2P, 3A–3K, 4A–4K, 6A–6K. Feedback signals load voltage 786 and load current 787 represent the currents and voltages of phases 786 driving variable electrical load 785. Signals 787 and 788 are coupled to controller 784. Controller 784 couples signals to switch elements (e.g., 248, 258 and 268) via control inputs (e.g., CN1 247, CN2 257 and CN3 267) to control the auxiliary windings of induction generator 782 in response to changes that occur in variable load 785. Since controller 784 is electrical, it may operate on each electrical cycle of phase outputs 786. The engine control 783 is electro-mechanical and is slower to respond to changes in the voltage and current outputs (e.g., frequency, amplitude, phase, etc.) of induction generator 782. Depending on the characteristics of the variable electrical load 785, there are theoretical optimum capacitance values coupled to the auxiliary windings of induction generator 782 and control settings for engine 781. Induction generator 782 may be configured as described in FIGS. 1A–1L, 3A–3K, and 6A–6K. Each of these configurations has a three phase energy winding and a three phase auxiliary winding.

A typical operation of the embodiment in FIG. 7A may be as follows:

Engine 781 is coupled to induction generator 782 with shaft 789. If the rotor of induction generator 782 has some residual magnetism, then simply starting engine 781 and bringing it up to speed will start the process of establishing flux by induction in auxiliary windings 791. Embodiments of the present invention may use circuits in controller 784 to "pulse" the auxiliary windings with energy to start the excitation of auxiliary winding 791 if the voltages on auxiliary winding 791 do not establish once induction generator 782 rotation has commenced. For a particular design of induction generator 782, there will be a rotation speed for engine 781 necessary to determine the correct and desired frequency of the output on energy windings 786. Load switch 830 may keep the variable load 785 disconnected until induction generator 782 is brought up to an initial speed. Engine 781 may be started in a no load condition where variable load 785 is disconnected via load switch 830. Controller 784 may be designed to only begin controlling after the engine speed is within a range of its steady state value using an engine speed sense signal in signals 797. After the engine speed has stabilized, controller 784 would sense the current supplied to the load 785 and continually adjust the amount of auxiliary winding capacitance as a function of the load current 787 and load voltage 788. If one did not have a control winding corresponding to embodiments of the present invention, the induction generator may have to be sized so that the output voltage could be maintained strictly by controlling the speed of the engine 784 and a user may have to accept poor quality outputs 786 without optimization of auxiliary windings 791. Changing the capacitance on the auxiliary winding 791, according to embodiments of the present invention, optimizes the capacitance for a load 785 as it varies and thus the engine 781 is required to maintain a condition proportional to an optimized generator. Since the controller 784 electronically switches the capacitance quickly as the load changes, it optimizes the auxiliary (field) windings 791 so the engine 781 only has to change its speed based on a power requirement for a higher efficiency generator. The generator control loop, from outputs 786 through controller 784 (signals 788 and 787) and auxiliary windings 791 is a fast control loop, and the engine control loop from engine controller 783 to engine 781 is a slower control loop. The rotational inertia of the mechanical system ensures that the fast control loop can respond to a change in current and optimize the generator 782 for a changing load 785 before the engine 781 either has to speed up or slow down to maintain the voltage for the changed load power requirement. The engine controller 783 would receive a new RPM set point, in one embodiment of the present invention, based on changing conditions of the load 785 determined by analyzing load voltage 788 and load current 787 via generator controller 784 and master controller 893. This is further described with respect to FIGS. 15 and 16. Generator 782 may also have a single phase output (single phase output 786) without departing from the scope of the system embodiment in FIG. 7A.

As described previously, embodiments of the present invention use electronic AC switches (e.g., triac 128) to switch discrete capacitors in and out of portions of auxiliary windings 791. In these embodiments, capacitance is added or removed in discrete amounts and controller 784 would comprise a combination of digital and analog circuitry. The analog circuits would comprise circuits used to sense parameters of the load voltage 788 and load current 787. The digital circuits would process digitized versions of these analog signals to generate control signals (e.g., CN1 147, CN2 157, and CN3 167 in FIG. 1H) for control elements (e.g., control elements 750, 760 and 770 in FIG. 1H) of auxiliary control windings 791. A desired set point speed engine 781 would be calculated based on parameters of signals 788 and 787 and passed to engine controller 783 via signals 892 and 891 via master controller 893 or directly via signal 797.

Figure 7B:
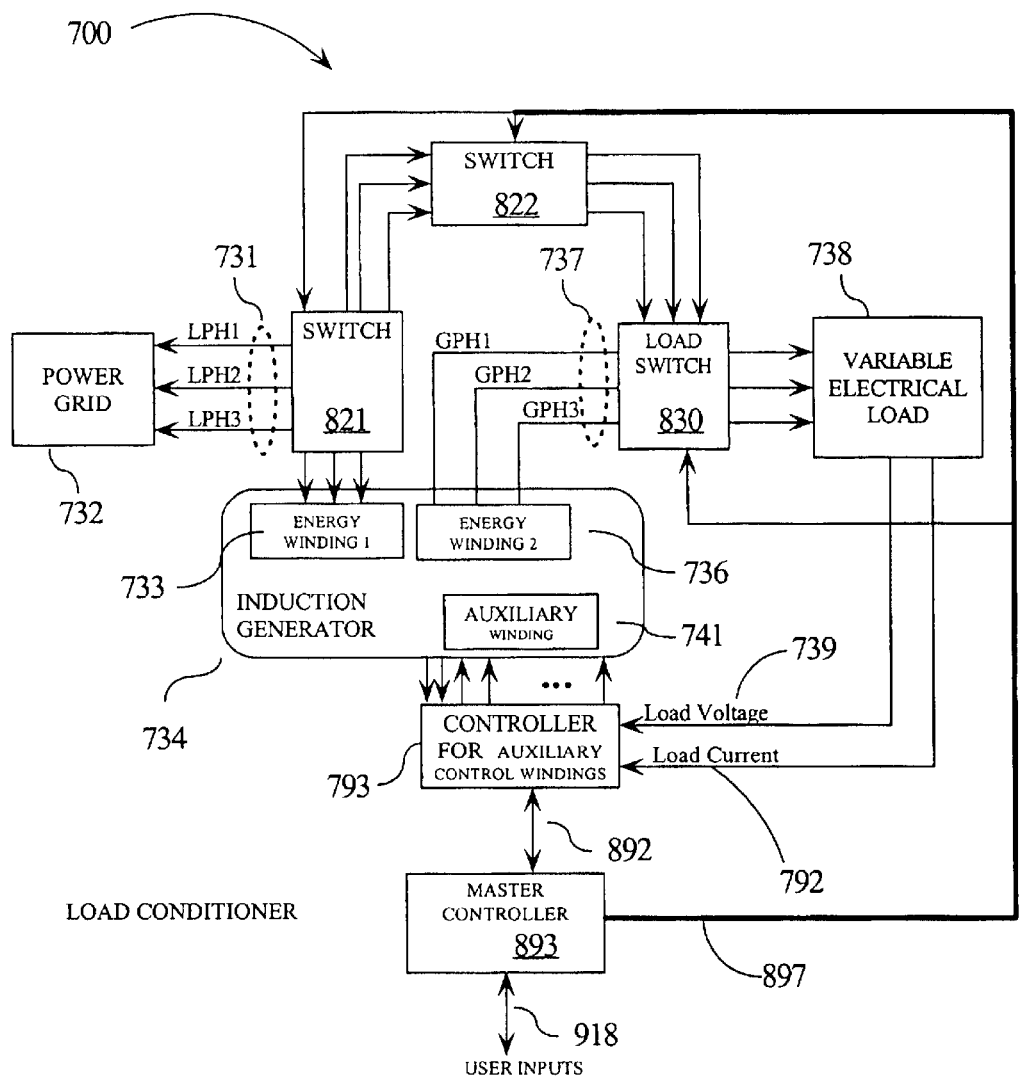
FIG. 7B is a block diagram of a system operating where multiple energy windings and an auxiliary winding are used to implement a motor/generator combination supplying a variable load according to embodiments of the present invention.

FIG. 7B is a block diagram of another induction system 700 employing an induction generator 734 according to embodiments of the present invention. A power grid 732 supplies three phase lines 731 to energy windings 733 (configured as a three phase Wye or Delta circuit) in induction generator 734. The three phase rotating magnetic field produced by energy windings 733 cause the rotor of induction generator 734 to rotate (by induction) as an induction motor. Energy stored in the rotor windings of induction generator 734 are transferred to second energy winding 736 coupled with three phase outputs 737 to variable electrical load 738. The configuration in FIG. 7B operates as a power conditioner where the power grid 732 sets the frequency of the outputs 737, and the induction generator 734 and associated controls would determine the output voltage quality. Feedback signals, parameters of load voltage 739 and load current 792, are used to control auxiliary windings 741 via a controller 793 according to embodiments of the present invention. Controller 793 would generate signals used as control inputs (e.g., CN1 502, CN2 510 and CN3 512) to auxiliary windings 741 to optimize the outputs 737 in response to changes in the characteristics of variable electrical load 738. In this embodiment, a function of the auxiliary winding 741 and the controller 793 is to monitor and control the power factor of the energy delivered to variable electrical load 738 via outputs 737. Master controller 893 sends mode information to controller 793 and may send a control signals 897 to switches 830, 821 and 822 which determine the power flow within induction system 700. In one mode, switch 821 connects the power grid 732 to energy winding 733 and load switch 830 disconnects energy winding from the load 738. Switch 822 connects the power grid to the load 738. Induction generator 734 is powered by power grid 732 and begins to rotate. Controller 793 monitors the output voltage and determines the speed of induction generator 734. When induction generator 734 is at the proper speed switch 822 is opened and load switch 830 connects the output of induction generator 734 to load 738. Controller 793 monitors the parameters of the load voltage 739 and current 792 and switches capacitance within auxiliary windings 741 to control the voltage levels and power factor at load 738. The output of induction generator 734 is frequency locked to power grid 732, however the load power is isolated and conditioned by induction generator 734 by the action of the control to auxiliary windings 741 according to embodiments of the present invention.

Figure 7C:
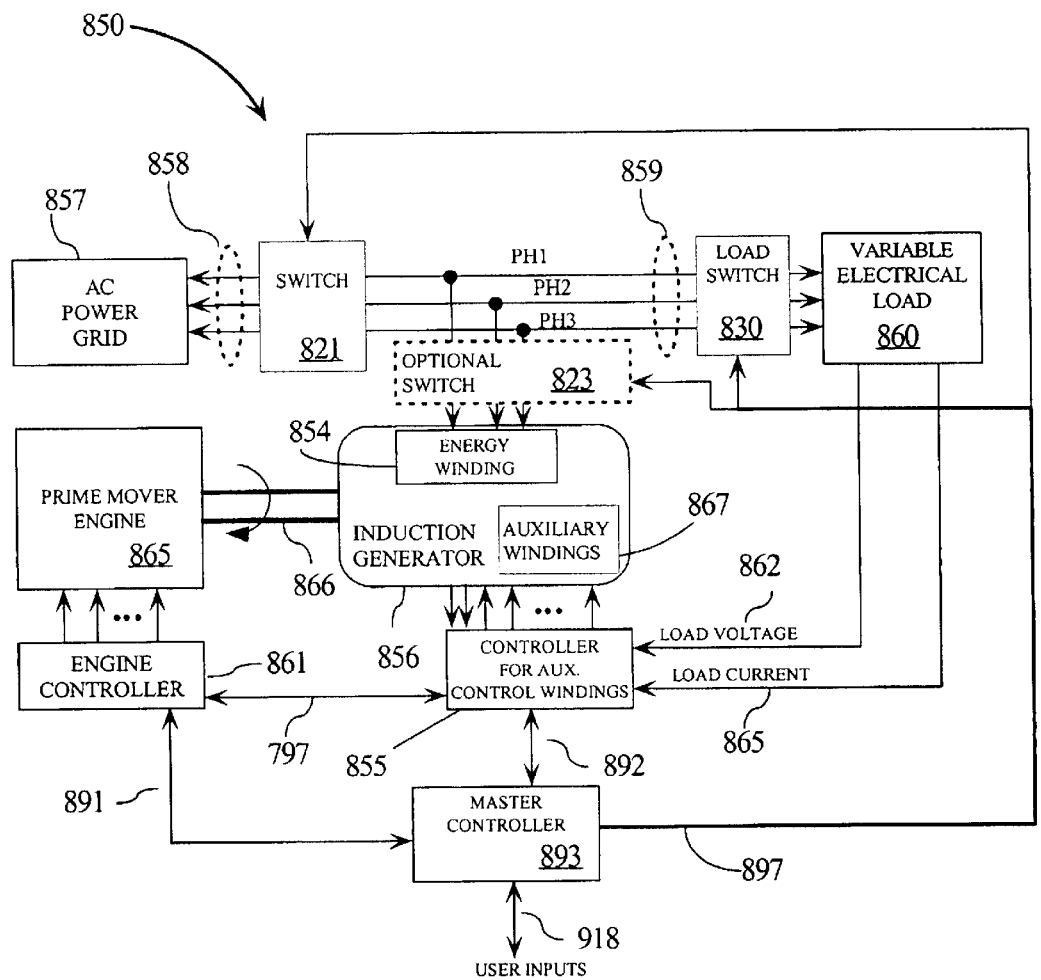
FIG. 7C is a block diagram of another system according to embodiments of the present invention.

FIG. 7C is a block diagram of another system embodiment of the present invention. In this embodiment, AC power grid 857 is coupled via lines 858 and switch 871 (either inputs or outputs) via an optional switch 823 to a single energy winding 854 in induction generator 856 and to a variable electrical load 860 via load switch 830. (Note, throughout the various embodiments of the present invention, such load switches may operate in an automatic fashion dependent only upon the level of signals on the load lines. Switch 821 is used to disconnect the AC power grid 857 in case of a failure. Control signal 863 may be generated by circuitry in controller 855 by determining a failure (loss of voltage or excessive load current) of AC power grid 857.

In one mode of this embodiment, auxiliary windings 867 and controller 855 are used to control the power factor of the variable electrical load 860 as induction generator 856 is operated over its range of a net receiver of power to a net deliverer of power (to the AC power grid 857 and the load 860). In this embodiment, the AC power grid 857 provides the excitation for the field of induction generator 856. Depending on the speed of engine 865 coupled to induction generator 856 with shaft 866, induction generator 856 may provide energy to both load 860 and back to AC power grid 857. Master controller 893 may determine the requirement for the generator 856 to supply energy to AC power grid 857 and send corresponding speed requirements to engine controller 861 via signals 891. Signals 891 would also feed back to master controller 893 parameters of engine 865 (e.g., engine speed). Master controller 893 would also couple signals 892 to controller 855. Controller 855 would control the capacitance on auxiliary windings 867 based on parameters of load voltage 862 and load current 865 and signals from master controller 893. Load switch 830 may simply monitor the inputs 859 and determine when to connect load 860 or master controller 893 may control load switch 830 with control lines 897.

In a second mode of operation for system 850, AC power grid 857 may be disconnected from energy winding 854 by switch 821 by control signals 897. In this embodiment, controller 855 would control the capacitance auxiliary windings 867 to provide a self-excited induction generator 856. The amount of capacitance in auxiliary winding would be selected in response to parameters of load voltage 862 and load current 865 signals. Master controller 893 receives user inputs 918 and sets speed set points to engine controller 861 via signals 891. Engine controller 861 controls the speed of engine 865 based set points received from master controller 918 which determines the required engine 865 speed in response to load conditions determined from signals load voltage 862 and load current 865. In the system 850 illustrated in FIG. 7C, the generator 856 may alternate from a line excited generator with the auxiliary winding 867 and controller 855 controlling load power factor and the quality of outputs 859 to a self-excited induction generator where the auxiliary windings 867 and controller 855 controls the auxiliary capacitance to optimize generator as load 860 varies in response to parameters of signals load voltage 862 and load current 865.

If induction system 850 has optional switch 823, then additional modes are possible. In the first mode, switch 823 is OFF and switches 821 and 830 are ON and the power grid 857 drives load 860 directly. Engine 865 may then be started by conventional means and controller 855 determines when induction generator 856 is up to a desired speed. Switch 823 may be then switch ON and the energy flow is determined by the operational speed of Engine 865. In another mode, switch 823 is ON and power grid 857 causes induction generator 856 to rotate which in turn rotates Engine 865 to enable it to start. Upon Engine 865 starting, switch 823 is turned OFF by control signals 897 until induction generator 856 achieves a desired speed.

In a second mode switch 821 is OFF and Engine 865 drives induction generator 856 via shaft 866. Switches 823 and 830 are ON and energy winding 854 supplies load 860. Controller 855 monitors load voltage 862 and load current 865 and adjust the capacitors on auxiliary windings 867 to control the output voltage and power factor of the energy delivered to load 860. Engine controller 861 receives signals 797 to control Engine 865 to a desired speed dependent on user inputs 918 and variations in the load 860.

In a third mode, switches 821, 823 and 830 are all ON and control of Engine 865 determines the net flow of energy from induction generator 856. Induction generator 856 either supplies energy to the power grid 857 and load 860 or operates as a load conditioner. In either case, controller 855 controls the capacitors on auxiliary windings 867 to control voltage and power factor on load 860 according to embodiments of the present invention.

Figure 7D:
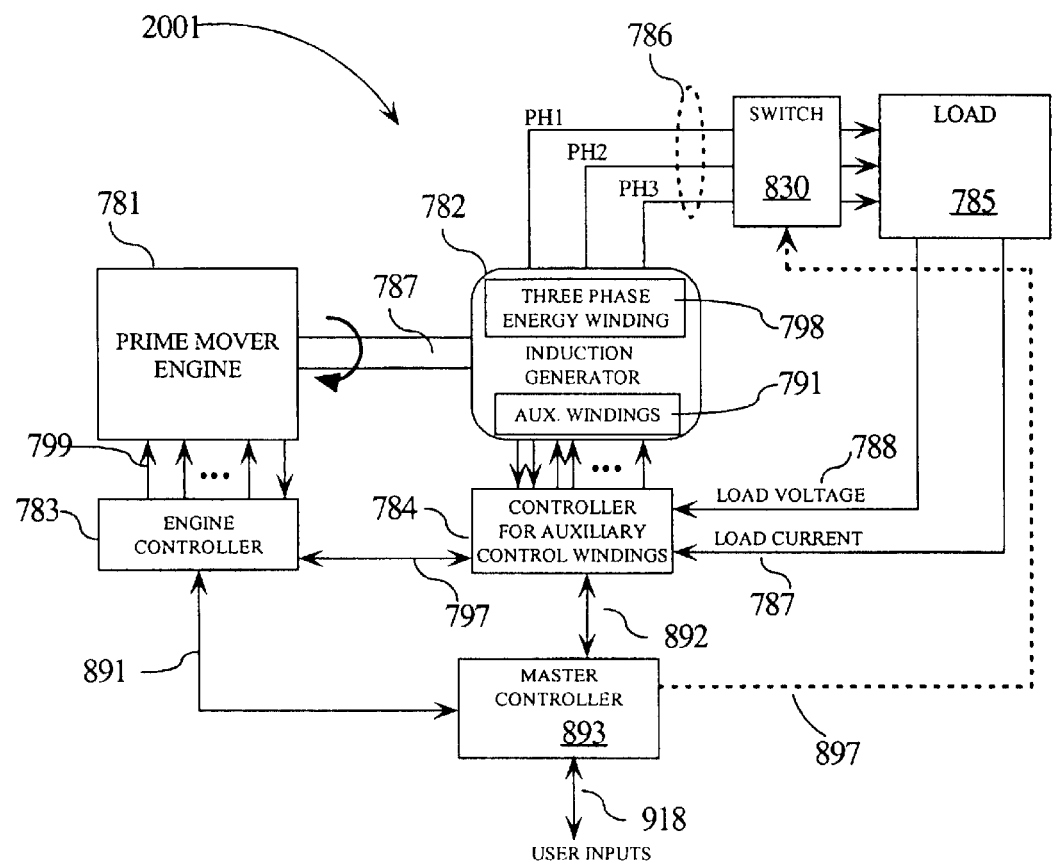
FIG. 7D is an embodiment of the present invention illustrating the use of combination energy/control windings.

FIG. 7D is a block diagram of an induction system 2001 which is the similar to the induction system 780 in FIG. 7A. Induction generator 2002 has three phase energy/control windings 2000 and no auxiliary control windings like auxiliary control windings 791 within induction generator 782 of system 780. In this embodiment of the present invention, the energy/control windings 2000 provide the field excitation the same way as auxiliary windings 791 for induction generator 782 in system 780. The operation and control of system 2001 are very similar to system 780, the primary difference is that the combination energy/control windings 2000 may be a design compromise over the separate energy windings 798 and auxiliary windings 791 of system 780. In the system 2001 the energy/control windings 2001 have to be designed for the load they are required to drive and this may require the capacitors to have a higher voltage rating and also to have larger capacitance values. The embodiment of the present invention in FIG. 7D has the same control methodology as the embodiment in FIG. 7A. Any of the systems in FIGS. 7B, 7C, 8, and 9 may be correspondingly modified like system 2001 in FIG. 7D to allow operation with combination energy/control windings and still be within the scope of embodiments of the present invention.

Figure 8:
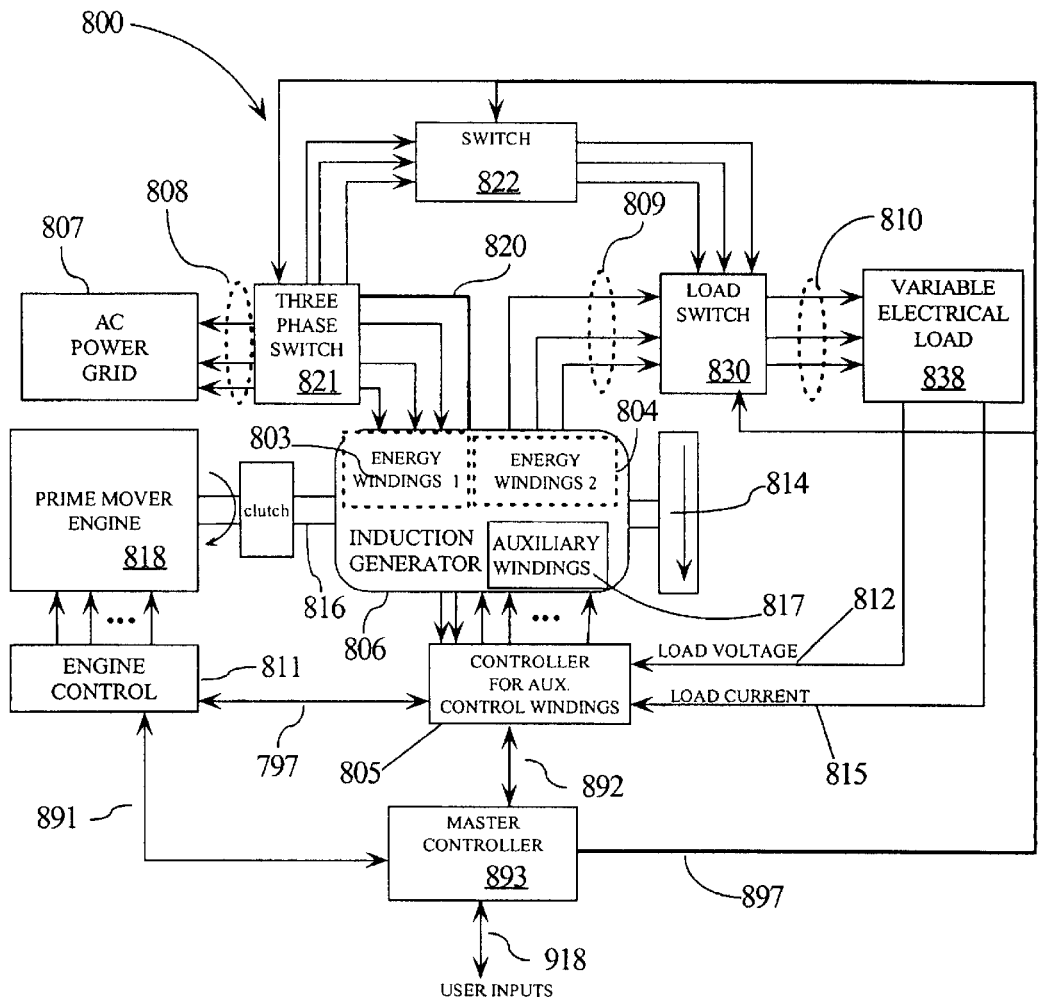
FIG. 8 is a block diagram of a combination system of an induction machine, according to the embodiment of the present invention, operating as a stand-alone self-excited induction generator, a driven generator feeding multiple loads or a blink-less generator system supplying a variable load.

FIG. 8 is another induction system 800 employing an induction generator 806 according to embodiments of the present invention. AC power grid 807 has three phase lines 808 (either inputs or outputs) coupled to energy windings 803 via switch 821. Induction generator 806 is coupled to a variable electrical load 810 via load switch 830 with three phase energy windings 804 which generate outputs 809. Induction generator 800 also has auxiliary windings 817 configured according to embodiments of the present invention and controlled by controller 805. Controller 805 receives feedback signals load voltage 812 and load current 815 from variable electrical load 810. An engine 818 is coupled to induction generator 806 via a shaft 816 and is operable to supply rotational mechanical energy. Engine 818 is controlled by engine controller 811 which is coupled to master controller 893 with signals 891. Master controller 893 sends mode information and receives signals from controller 805 via signals 892. Master controller 893 also receives user inputs 918. Induction generator 806 also has an inertial energy storage element (e.g., flywheel) 814. Engine controller 811 operates according to the description of the engine controller in FIG. 11.

The induction system 800 employs an induction generator 806 which has two electrically and magnetically isolated energy windings 803 and 804 and an auxiliary windings 817 which are electrically isolated from both energy windings 803 and 804 but may be magnetically coupled to energy winding 804. The possible generator 806 embodiments are explained in the descriptions of FIGS. 3A–3K and 6A–6K. The induction generator 806 with the two isolated energy windings 803 and 804 along with an energy storage flywheel 814 allows multiple modes of operation which may be set by user inputs 918 to master controller 893. The modes of operation that are possible with system 800 are as follows:

a) AC power grid 807 may drive induction generator 806 as a motor via energy windings 803 and conditioned power may be delivered to energy windings 804 as an induction generator with auxiliary windings 817, according to embodiments of the present invention, providing control of the quality of the outputs 809 in response to feedback signals load voltage 812 and load current 815 and generator controller 805. Generator controller 805 would switch capacitors in auxiliary winding 817 in response to processing of parameters of load voltage 812 and load current 815 by suppling control signals (e.g., CN1 147, CN2 157 and CN3 167) to control elements (e.g., 750, 760 and 770). In this mode, engine 818 would be de-coupled (e.g., with a clutch) or free wheeling. Engine 818 may also be de-coupled by idling while remaining ready for operation in another mode.

b) In another mode, engine 818 may be coupled to induction generator 806, and by controlling the speed of engine 818, induction generator 806 may supply power to both AC power grid 807 and load 810 through energy windings 803 and 804 respectively. Induction generator 806, with auxiliary windings 817, provides control of the quality of the outputs 809 in response to feedback signals load voltage 812 and load current 815 and generator controller 805. Generator controller 805 would switch capacitors in auxiliary winding 817 in response to processing of parameters of load voltage 812 and load current 815 by suppling control signals (e.g., CN1 147, CN2 157 and CN3 167) to control elements (e.g., 750, 760 and 770). c.) A third mode occurs if the AC power grid fails (e.g., shorts) while running in mode "a" above. A failure may be detected by monitoring lines 808 via controller 805. A signal 820 from controller 805 would disconnect the AC power grid 807 with switch 821. Energy storage inertia 814 would maintain the rotational speed of generator 806 and controller 805 would control the capacitors in auxiliary windings 817 to optimize the generator 806 for a self-excited mode in response to parameters of load voltage 812 and load current 815. Master controller 893 would signal a set point speed for engine control 811 which would couple and stabilize a idling engine 818 to the required speed. Because the energy windings 803 and 804 are electrically isolated and auxiliary windings 817 are isolated from energy windings 803, the failure of AC power grid 807 does not adversely affect stored energy in induction generator 806 before the switch 821 disconnects the lines 808. If a "blinkless" (where the variable electrical load 810 (e.g., lighting system) does not experience any significant variation of supplied outputs 809 due to the loss of AC power grid 807) system is desired in this mode, then engine 818 may be maintained at a speed corresponding to a load condition so starting delay and or delay in establishing a speed from an idle speed is minimized.

c) Another mode similar to mode "c" occurs when induction generator 806 is running in a line excited mode where energy from engine 818 is supplying both the AC power grid 807 and load 810. A failure in AC power grid 807 is detected and switch 821 is signaled (via control signals 897) to disconnect the AC power grid 807. In this mode, flywheel 814 maintains speed while engine control 811 receives and controls to a set point from master control 893 or generator controller 805 in response to parameters of load voltage 812 and load current 815. Generator controller 805 determines and switches in capacitance to auxiliary winding 817 to change induction generator 806 from a line excited to a self excited mode according to embodiments of the present invention.

d) An additional mode occurs when switch 821 disconnects energy winding 803, switch 830 disconnects energy winding 804 and switch 822 connects the power grid 807 directly to the load 838.

Figure 9:
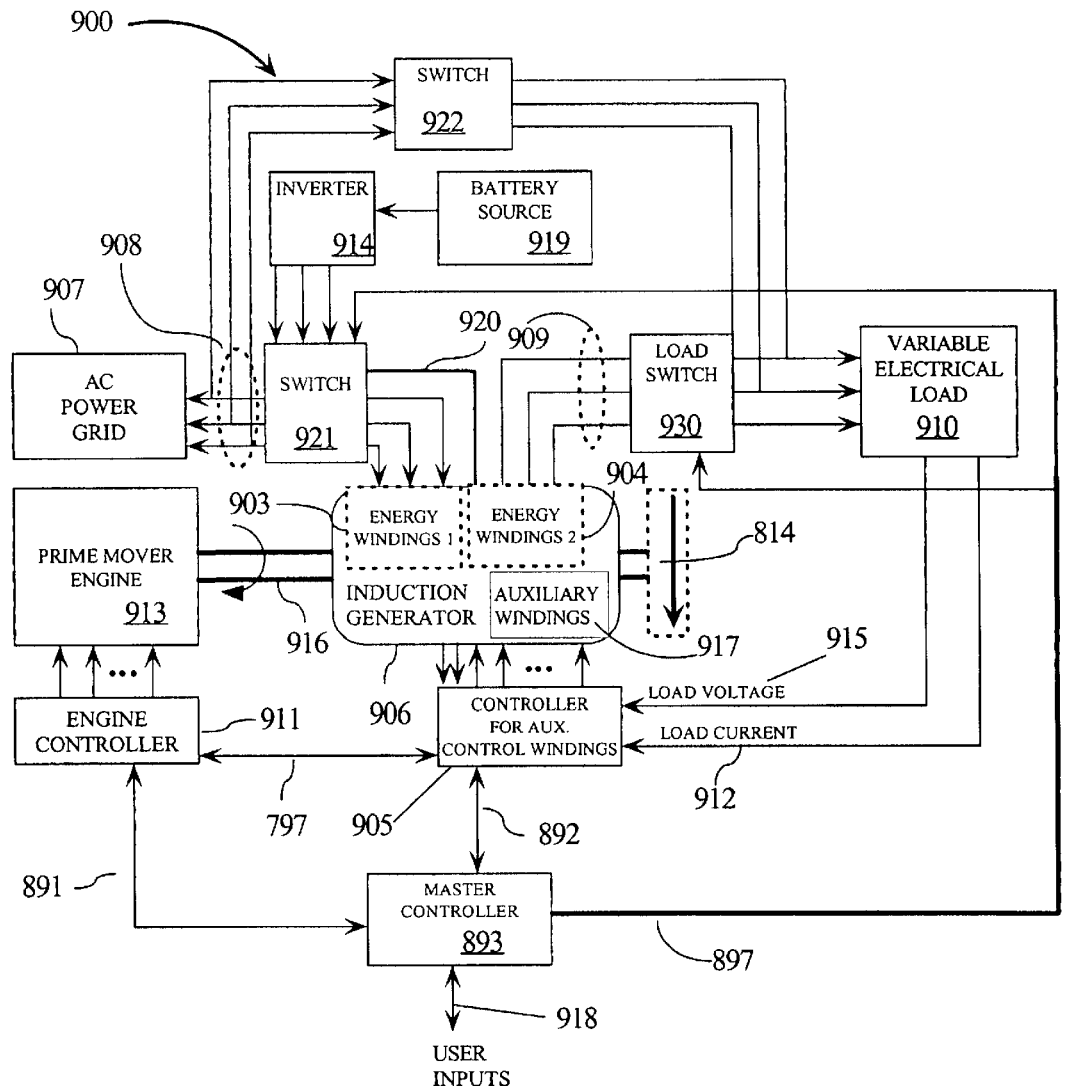
FIG. 9 is a block diagram of a combination system of an induction machine, according to another embodiment of the present invention, operating as a stand-alone self-excited induction generator, a driven generator feeding multiple loads or a blink-less generator system supplying a variable load.

FIG. 9 is another induction system 900 employing an induction generator 906 according to embodiments of the present invention. AC power grid 907 has three phase lines 908 (either inputs or outputs) coupled to energy windings 903 via switch 921. Induction generator 906 is coupled to a variable electrical load 910 via load switch 930 with three phase energy windings 904 which generate outputs 909. Induction generator 906 also has auxiliary windings 917 configured according to embodiments of the present invention and controlled by controller 905. Controller 905 receives feedback signals load voltage 915 and load current 912 from variable electrical load 910. An engine 913 is coupled to induction generator 906 via a shaft 916 and is operable to supply rotational mechanical energy. Engine 913 is controlled by engine controller 911 which is coupled to master controller 893 with signals 891. Master controller 893 sends mode information and receives signals from controller 905 via signals 892. Induction generator 906 also may also optionally have an inertial energy storage element (flywheel) 814. Engine controller 911 operates according to the description of the engine controller in FIG. 11. Signal lines 797 allows generator controller 905 and engine controller 911 to communicate directly.

The induction system 900 uses induction generator 906 which has two electrically and magnetically isolated energy windings 903 and 904 and auxiliary windings 917 which are electrically isolated from both energy windings but may be magnetically coupled to energy winding 904. The possible generator 906 embodiments are explained in the descriptions of FIGS. 3A–3K and 6A–6K. The induction generator 906 with the two isolated energy windings 903 and 904 along with an energy backup inverter 914 powered by a battery source 919 allows multiple modes of operation which may be set by user inputs 918 to master controller 893. The modes of operation that are possible with system 900 are as follows:

a) AC power grid 907 my drive induction generator 906 as a motor via energy windings 903 and conditioned power may be delivered to energy windings 904 as an induction generator with auxiliary windings 917, according to embodiments of the present invention, providing control of the quality of the outputs 909 in response to feedback signals load voltage 915 and load current 912 and generator controller 905. Generator controller 905 would switch capacitors in auxiliary winding 917 in response to processing of parameters of load voltage 915 and load current 912 by suppling control signals (e.g., CN1 147, CN2 157 and CN3 167) to control elements (e.g., 750, 760 and 770). In this mode, engine 913 would be de-coupled (e.g., with a clutch) or free wheeling. Engine 913 may also be de-coupled by idling and ready for operation in another mode.

b) In another mode, engine 913 may be coupled to induction generator 906 and by controlling the speed of engine 913, and induction generator may supply power to both AC power grid 907 and load 910 through energy windings 903 and 904 respectively. Induction generator 906, with auxiliary windings 917 provides control of the quality of the outputs 909 in response to feedback signals load voltage 912 and load current 915 and generator controller 905. Generator controller 905 would switch capacitors in auxiliary windings 917 in response to processing of parameters of load voltage 915 and load current 912 by suppling control signals (e.g., CN1 147, CN2 157 and CN3 167) to control elements (e.g., 750, 760 and 770).

c) A third mode occurs if the AC power grid fails (e.g., shorts) while running in mode "a" above. A failure may be detected by monitoring lines 908 via controller 906 monitoring. A signal 920 from controller 905 would disconnect the AC power grid 907 with switch 921. Energy storage inverter 914 with battery source 919 would maintain the rotational speed of generator 906 and controller 905 would control the capacitors in auxiliary windings 917 to optimize the generator 906 controlling the output quality of outputs 909 in response to parameters of load voltage 915 and load current 912. Because the energy windings 903 and 904 are electrically isolated and auxiliary windings 917 are isolated from energy windings 903, the failure of AC power grid 907 does not adversely affect stored energy in induction generator 906 before the switch 921 disconnects the lines 908. A "blinkless" (where the variable electrical load 910 (e.g., lighting system) does not experience any significant variation of supplied outputs 909 due to the loss of AC power grid 907) system is possible in this mode.

d) Another mode similar to mode "c" occurs when induction generator 906 is running in a line-excited mode where energy from engine 913 is supplying both the AC power grid 907 and load 910. A failure in AC power grid 907 is detected and switch 921 is signaled to disconnect the AC power grid 907. In this mode, energy storage inverter 914 with battery source 919 maintains speed of generator 906 (operating it as a motor) while engine control 911 receives and controls engine 913 to a set point speed received from master control 893 in response parameters of load voltage 915 and load current 912. The system 900 may not have an engine 913 at all and operate with energy storage inverter 914 with battery source 919 as the only backup.

Because of the isolation of the energy windings 903 and 904 and the isolation of the auxiliary windings 917 from the energy windings 903 connected to the AC power grid 907, a failure in the AC power grid 907 (e.g., a short circuit) does not affect the operation of induction generator 906 immediately allowing time for the fault to be detected and for switch 921 to take the AC power grid 907 off-line. Inverter 914 and battery source 919, along with feedback control of auxiliary control windings 917 allows the induction generator to be controlled and thus the voltage output to the load remains stable. Inverter 914 may be maintained or engine 913 may be brought up to speed and coupled to induction generator 906 allowing inverter 914 to be removed. In either case the feedback control of auxiliary windings 917 with controller 905 maintains a stable output for this "blinkless" system. The fast response of controller 905 and auxiliary windings 917 according to embodiments of the present invention, enables a system 900 to operate "blinkless" where the variable electrical load 910 (e.g., lighting system) does not experience any significant variation of supplied outputs 909 due to the loss of AC power grid 907. Additional switch 922 allows switches 921 and 930 to disconnect the induction generator 906 and power grid 907 to supply load 910 directly.

Figure 10A:
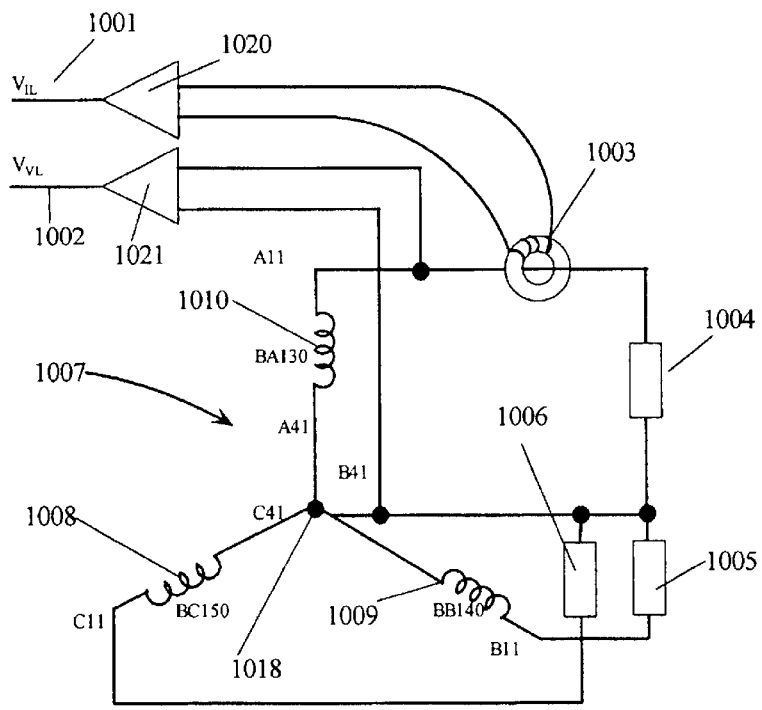
FIG. 10A is a circuit diagram of analog circuits operable to generate load voltage and current signals.
Figure 10B:
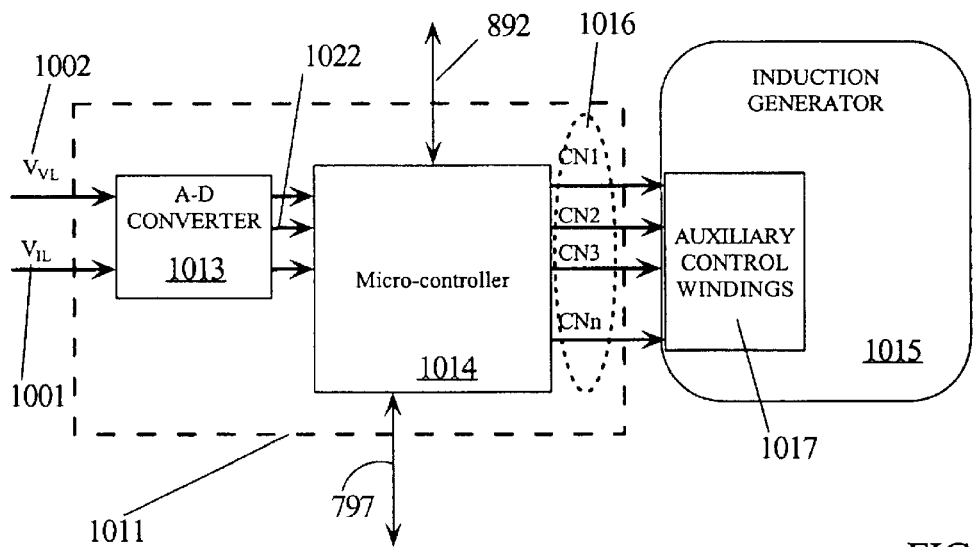
FIG. 10B is a block diagram of a generator controller according to embodiments of the present invention.

FIGS. 10A and 10B are circuit diagrams of analog and digital circuits which may be used according to embodiments of the present invention. FIG. 10A illustrates three phase energy winding 1007 which comprises branch energy windings 1009, 1008 and 1010. Loads 1004, 1005 and 1006 are coupled between terminals A11, B11 and C11 and node 1018 respectively. Three phase energy winding 1007 may be any one of the three phase winding configurations explained in embodiments of the present invention (e.g., FIGS. 1A–1L, 3A–3K and 6A–6K). Current transformer 1003 is an analog component that may be used to sense the load current through load 1004. Other sense elements may also be used (e.g., a series sense resistor or Hall effect devices). The output of current transformer 1003 is coupled to an isolation and conditioning amplifier 1020 which generates a voltage VIL 1001 which is proportional to the load current in load 1004. Likewise, conditioning amplifier 1021 is used to sense the load voltage across load 1004 and generate a voltage VVL 1002 which is proportional to the load voltage across load 1004. Other embodiments of the present invention may sense all three phase load currents and voltages in the case the loads are unequal, in which case further processing of all three signals may be done to determine an appropriate feedback response.

FIG. 10B is a circuit diagram illustrating further processing of the signals VIL 1001 and VVL 1002. Signals VIL 1001 and VVL 1002 are coupled to an exemplary analog to digital (A-D) converter 1013 which produces digital outputs 1022. A-D converter 1013 may digitize more than one parameter of signals VIL 1001 and VVL 1002, for example amplitude, frequency, and phase angle. Micro-controller 1014 may be any of a variety of commercially available micro-controllers which are operable to perform the function in FIG. 10B (e.g., Intel 8051). Alternately, a micro-controller may have the A-D function built into the unit along with other programmable functions. Micro-controller 1014 generates outputs 1016 for control elements (e.g., control elements 750, 760 and 770 for the auxiliary control winding 126 in FIG. 1H) of auxiliary windings 1017 in induction generator 1015. Outputs 1016 may comprise signals for a auxiliary windings like auxiliary windings 140 in the embodiment of FIGS. 1K and 1L. Micro-controller 1014 would also generate outputs and receive inputs 892 which are coupled to master controller 893. The controller 1011 may be used for the implementation of any of controllers 784, 793, 855, 805, and 905. Micro-controller 1014 also receives and sends control signals 797 to an engine controller (e.g., 911, 811, and 783) as described in embodiments of the present invention.

Figure 11:
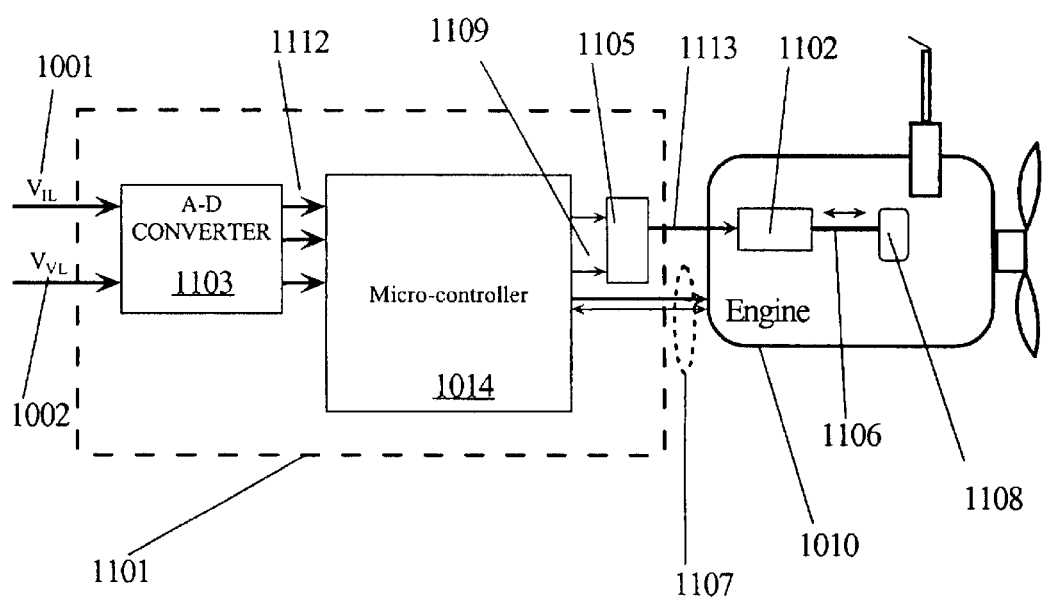
FIG. 11 is a block diagram of a engine controller according to embodiments of the present invention.

FIG. 11 is a block diagram of an engine controller 1101. Engine controller 1101 may be used in any of the systems 780, 800, and 900 for engine controllers 783, 811, 861 and 911 respectively. Signals VIL 1001 and VVL 1002 are derived load parameter signals from FIG. 10A. A-D converter 1103 generates digital signals 1112 which are coupled to micro-controller 1014. In one embodiment of the present invention, only one micro-controller 1014 may used in both the engine controller and the auxiliary winding controller. Modern low cost micro-controllers are fast enough to provide both control functions. Micro-controller 1014 generates output signals 1109 which are coupled to an electromechanical driver circuit 1105. Drive circuit 1105 has an output 1113 and may be a solenoid, linear motor or stepping motor driver. Signals 1107 may control other electromechanical or electronic devices (not shown) on engine 1010 (e.g., ignition circuits). Electro-mechanical device 1102 is coupled to throttle device 1108 through a coupling rod 1106, which moves in both directions to speed up and slow down engine 1010 by controlling a fuel valve (not shown). Electro-mechanical device 1102 may be a linear stepping motor, a rotary stepping motor with an actuating screw or an indexing solenoid device. A particular electromechanical device 1102 may have its drive circuitry contained within and receive only control signals from microcontroller 1014. Even though micro-controller 1014 may be used for both the engine and auxiliary winding controllers, their control algorithms would be different and would be incorporated in control code within micro-controller 1014. The control code in micro-controller 1014 may be modified depending on a particular engine 1010 and the particular generator embodiment it is controlling.

Engine controller 1101 may not use the load signals 1001 and 1002 but rather receive set point data on signals 891 from a master controller or a generator controller. In this embodiment, micro-controller 1014 would receive an engine speed signal 1107 and use control algorithms to send signals to throttle 1102 to bring engine 1010 into speed control. The algorithms and the micro-controller 1014 operate with high speed electro-mechanical actuators and electronic ignition devices on engine 1010 to produce an engine speed control system that is fast and with a controlled and near critically damped response when changing between a present speed and a new set point speed.

Figure 12:
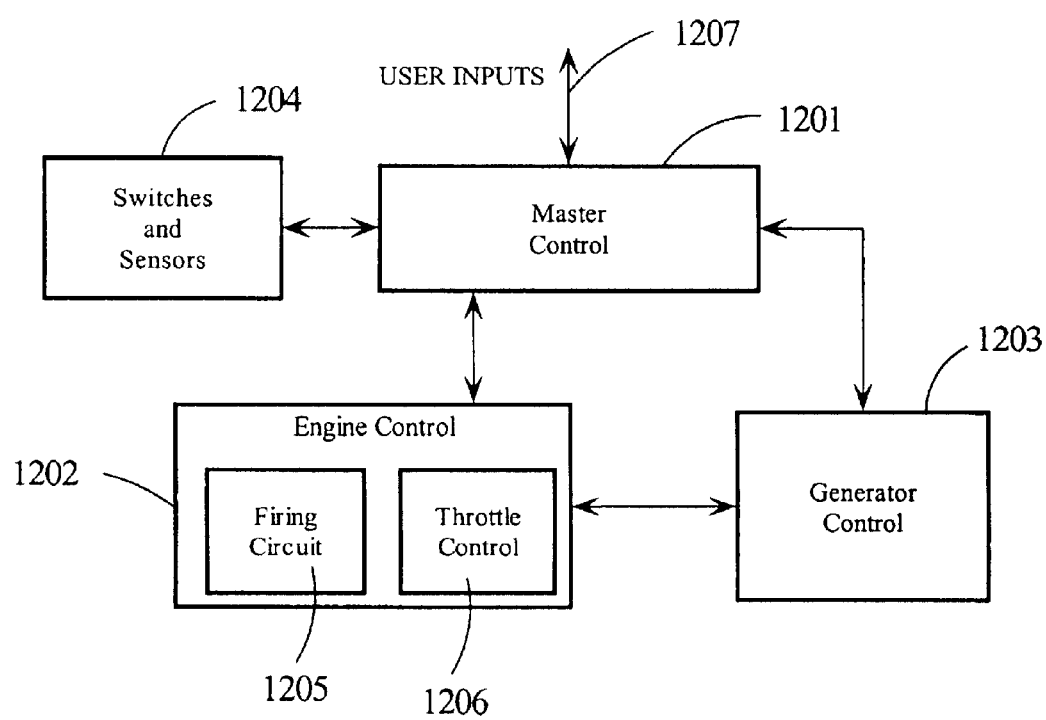
FIG. 12 is a block of connections between a master controller and a engine and a generator controller.

Referring to FIG. 12, throughout the description of the various embodiments of the present invention, reference is made to an engine control, or controller, primarily for controlling operation of the prime mover engine, and a controller for auxiliary (aux.) control windings, or generator control, or controller, primarily for controlling the operation of the generator. More specifically, the generator control operates to control the switching in or switching out of capacitors in the auxiliary windings of the various embodiments. A master control or controller 1201 operates to provide master control over the engine control 1202 and the generator control 1203. Furthermore, in some of the embodiments of the present invention, the master control 1201 will receive inputs from sensors and/or operate switches 1204, such as to switch in or out the load or to switch in or out the power grid.

Figure 14:
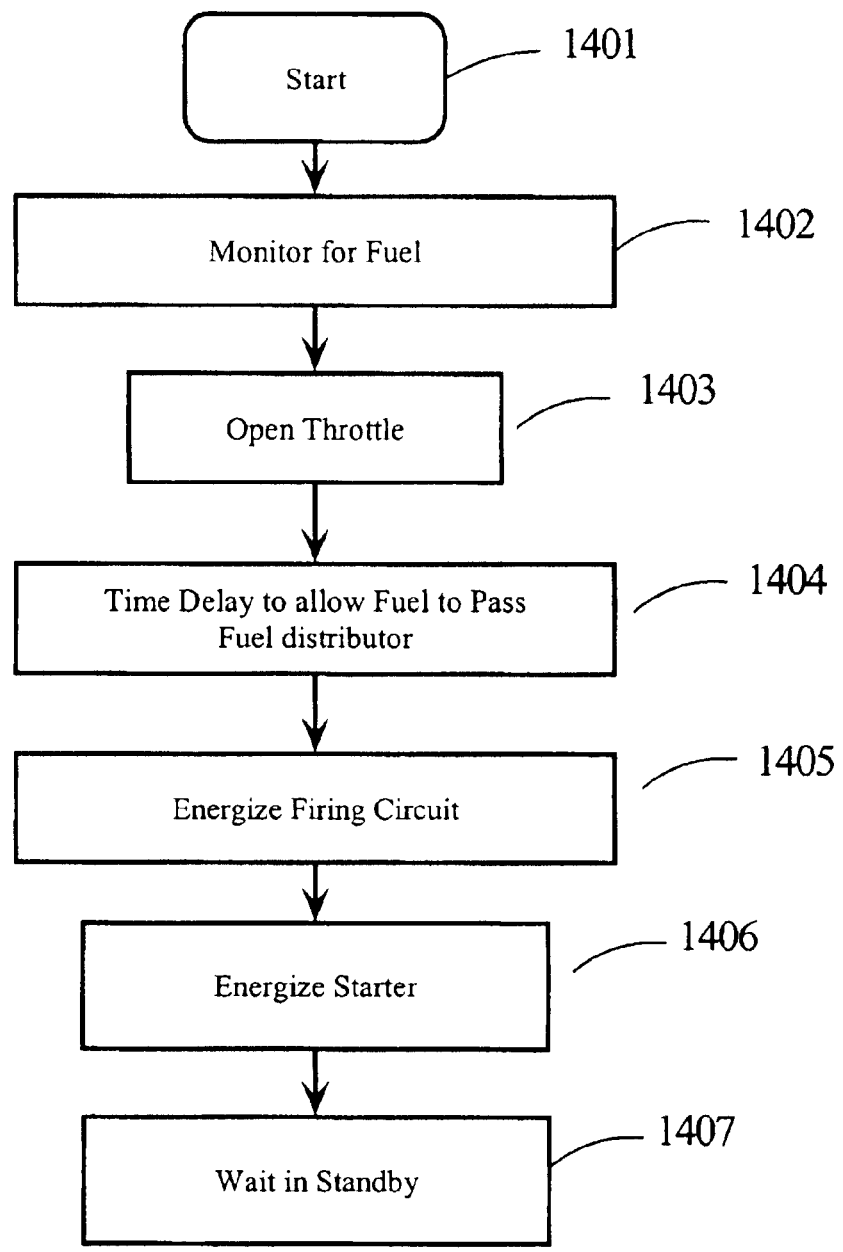
FIG. 14 is a flow diagram of another engine start sequence used embodiments of the present invention.
Figure 15:
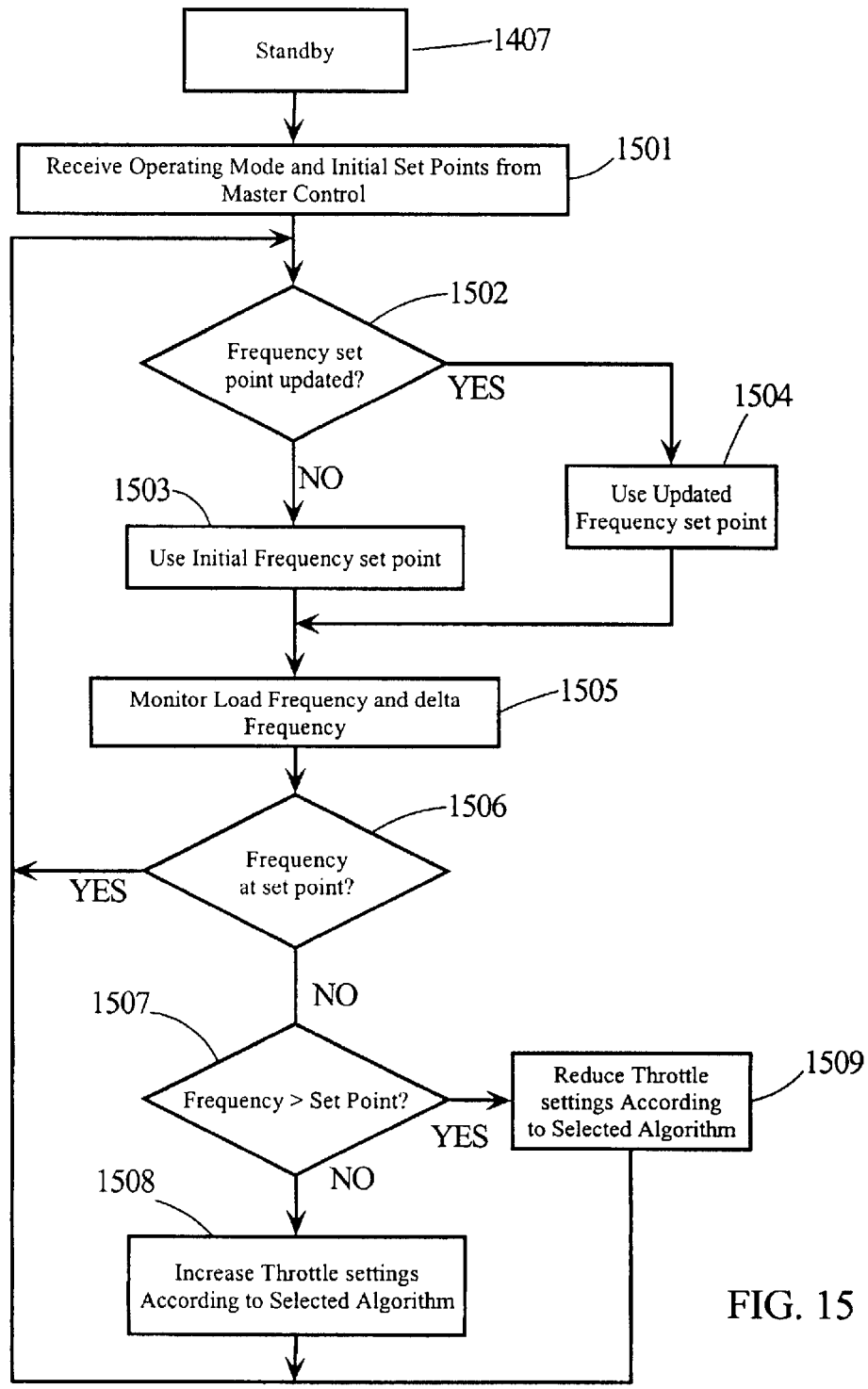
FIG. 15 is a flow diagram of an engine control sequence used in embodiments of the present invention.

As will be further described with respect to FIGS. 14 and 15, the engine control 1202 also includes a firing circuit 1205 and a throttle control, or controller 1206.

Figure 13:
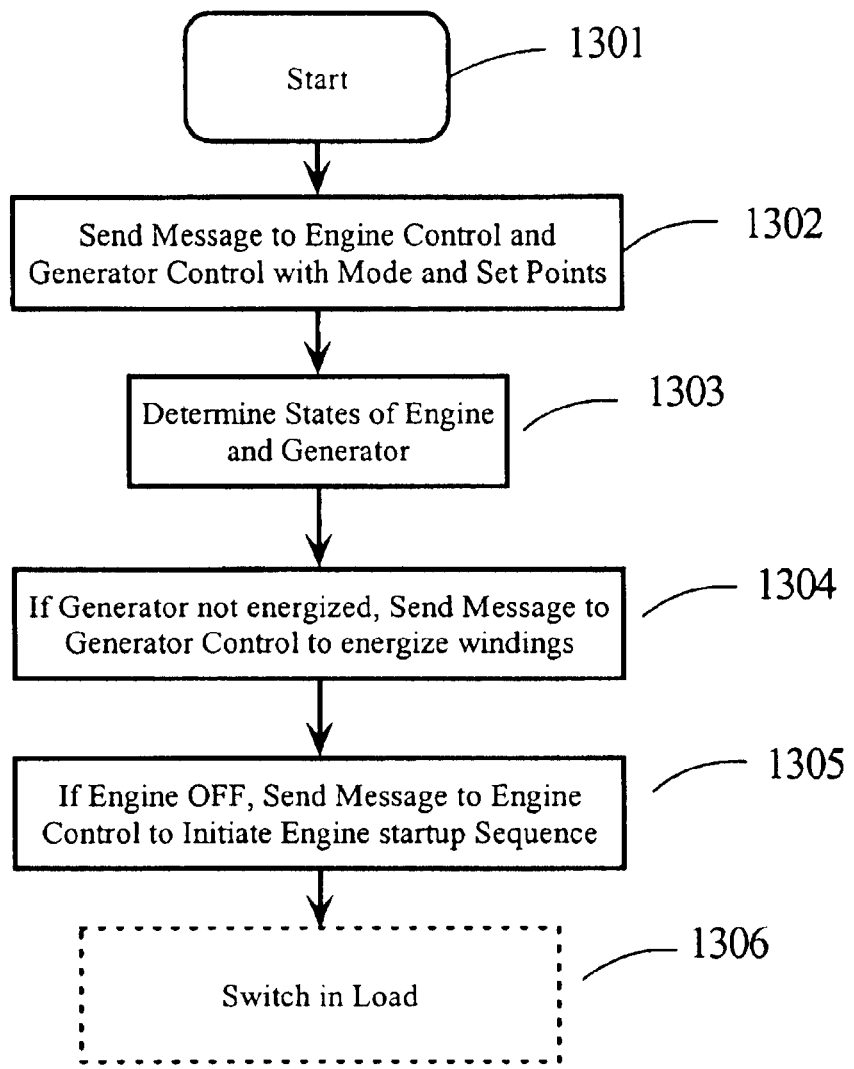
FIG. 13 is a flow diagram of an engine start sequence used embodiments of the present invention.

Referring to FIG. 13, there is illustrated a flow diagram for a process implemented within the master control 1201, as illustrated in FIG. 12. In step 1301 a start initializes the generator and may involve applying a direct current (DC) to one of the windings to establish a residual magnetic field in the induction generator. In step 1302, the master control 1201 operates to receive user inputs 1207 as to a particular mode in which the system is to operate. Such modes, as described previously, include a backup mode, a stand-alone mode, a full generator output parallel mode, a balanced load parallel mode, a line conditioning mode, and all other modes described herein. Once the master control 1201 has received inputs informing it of its particular mode of operation, the master control 1201 will then determine the states of the engine and generator in step 1303. Such states of the engine and generator may include whether the engine is running, in a startup phase, in a standby state, or engaged with a load. Master control 1201 may also determine whether the generator is energized, and may also determine whether a power grid is coupled to the system. More particularly, the voltage and current magnitudes of the load, generator outputs, and/or grid inputs may also be sensed. Step 1302 may be performed in a manual fashion with a user inputting these various parameters, or may be performed automatically using various sensors coupled to the engine, generator, load, and power grid.

Next, in step 1303, if the mode of operation includes the implementation of a prime mover engine driving the generator, then the master control 1201 will determine what state the engine is in. For example, if the engine is idle, the master control 1201 will send a signal to the engine control 1202 to initiate the engine startup sequence, which is described more particularly with respect to FIG. 14. In step 1304, the master control 1201 will determine if the generator is energized (the energy windings energized). If the generator is not energized, then the master control 1201 will send a signal, or message, to the generator control 1203 to energize its energy windings, which is described in more detail with respect to FIG. 16.

In step 1305, the master control 1201 will also send a message to the generator control 1203 and, if applicable, the engine control 1202 as to what mode of operation is being implemented and the initial RPM (revolutions per minute) set points which the engine is to operate. If the Engine is OFF, a message is sent to the engine control to initiate an Engine start up sequence. Thereafter, in step 1306, if a software switch is implemented in the system to switch in or out the load from the generator, then an optional step can be performed whereby the master control 1201 signals the switch to connect the load to the generator. Note, as an option to such a software switch, an electromagnetic switch, such as a solenoid switch, could be utilized to switch in and out the load from the generator. Such an electromagnetic switch would operate automatically without any control inputs to switch in the load if sufficient voltage and current is present on the output of the generator to the load, and switch out the load if such sufficient voltage and current are not present.

Referring to FIG. 14, there is illustrated the startup sequence for the prime mover engine. The process might begin in step 1401, such as in response to the message received from the master control 1201 in step 1303 described with respect to FIG. 13. Thereafter, the startup sequence proceeds to step 1402 to monitor for the presence of a fuel for the engine. Such a monitor may be sensing the presence of a fuel pressure. Thereafter, in step 1403, the engine throttle is opened for startup. Next, in step 1404, a time delay is allowed for the fuel to pass to the carburetor. In step 1405, the firing circuit 1205 is energized, and the starter is engaged in step 1406. The starter will remain engaged until a threshold oil pressure is measured putting the engine in a standby state 1407. Such a standby state may be a predetermined RPM monitored by a sensor on the flywheel of the engine.

Referring to FIG. 15, there is illustrated a flow diagram implemented within the engine control of the various embodiments when an engine is applicable to the mode of operation of the system. As noted in the description of the engine startup sequence of FIG. 14, the engine will be placed in a standby state 1407. Next, in step 1501, the engine control will have received the specified operating mode and initial load frequency set points from the master control 1201, as described with respect to step 1305 in FIG. 13. Monitoring and controlling to engine RPMS would be an indirect and possibly a less accurate method of control. Preferably, the frequency of the load voltage is used to control the engine speed. Only in those cases where the engine is not yet driving the induction generator would it be preferable to use RPMS as a control parameter. In step 1502, a determination will be made whether the frequency set points have been updated. This determination may be made by monitoring whether the values within a specified set of registers have been updated. The updating of these frequency set point registers is further described with respect to steps 1608 and 1610 in FIG. 16. If the frequency set points have been updated, then the process will use these updated frequency set points in step 1504. However, if the frequency set points have not been updated, then the initial set points sent from the master control 1201 will be utilized in step 1503.

Thereafter, in step 1505, the frequency of the load voltage and any change in the frequency from a previous frequency setting will be monitored. In step 1506, if the monitored frequency is at the designated set points of either of steps 1503 or 1504, then the process will merely return to step 1502. If the frequency monitored in step 1505 is not at the designated set points, the process will proceed to step 1507 to determine if the frequency of the load voltage is now greater than the designated set points. If the frequency of the load voltage is greater than the designated set points, then the process will proceed to step 1509 to reduce the throttle settings on the engine according to a pre-selected algorithm implemented within engine control 1202. If the frequency of the load voltage is less than the designated set points, then the process will proceed to step 1508 to increase the throttle settings according to the selected algorithm. In steps 1508 and 1509 the process returns to step 1502.

Embodiments of the present invention utilize a throttle control algorithm that is faster than typical engine throttle control systems, by implementing a fast near critically damped response to the frequencies of the load voltage, which is sufficient to respond to the dynamic conditions of the system with an engine overshoot that is within an acceptable threshold.

Figure 16:
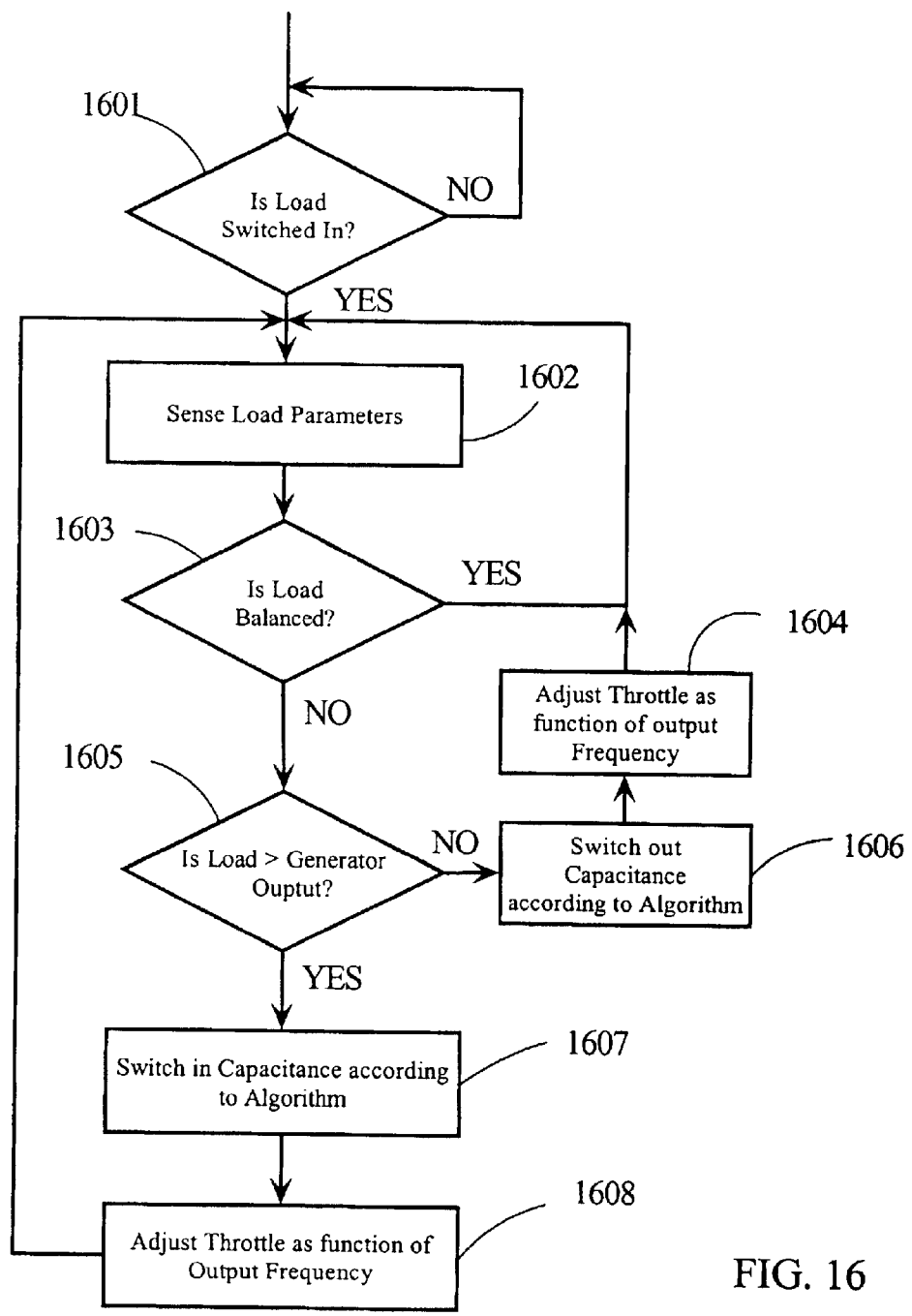
FIG. 16 is a flow diagram of an generator control sequence used in embodiments of the present invention.

FIG. 16 illustrates a flow diagram implemented within the generator control 1203. In step 1601, a determination is made as to whether the load is connected. If the load is not connected, then a wait is initiated until load connection. As described with respect to FIG. 13, the master control 1201 may have already switched in the load to the energy windings of the generator. Or, an electromagnetic switch may have automatically switched in the load to the energy windings of the generator.

When the load is connected, then in step 1602 load parameters measured from the load are sensed. Such parameters may include the voltage and current levels, the instantaneous change in voltage, the instantaneous change in current, the phase angle, etc. As a result of this measurement of the load parameters, the generator can be in a balanced state, an overload state, or an under-load state. This is determined in steps 1603 and 1605. In step 1603, a determination is made whether the load is balanced. If the load is balanced, then the process returns to step 1602. If the load is not balanced, then a determination is made whether an overload condition is occurring where the load is greater than the generator output (L>G). This can be determined by determining whether the voltage is sagging and the current is increasing. Note, in one embodiment of the present invention, the voltage sag is checked first by the process.

If the load is greater than the generator output, then the process proceeds to step 1607 to switch in more capacitance into the auxiliary windings in accordance with a predetermined algorithm. This will increase the excitation field strength within the generator. In step 1608, the throttle is adjusted as a function of the frequency of the load voltage. The process then returns to step 1604.

If in step 1605, it is determined that the load is less than the generator output, in other words, the voltage is increasing and the current is sagging, then the process will proceed to step 1606 to switch out capacitance within the auxiliary windings of the generator according to a pre-selected algorithm. In step 1610, the throttle is again adjusted as a function of the output frequency. The process returns to step 1604.

The algorithms utilized by steps 1607 and 1606 may be implemented in one of various manners. In one embodiment, the switching capacitors described previously can be switched in monotonically, one value increment at a time. Alternatively, capacitors can be switched in as a function of the magnitude of the voltage and/or current increase or decrease sensed in steps 1604. Other algorithms for switching in the switched capacitors may be utilized, and the present invention should not be limited to any one particular algorithm.

Figure 17:
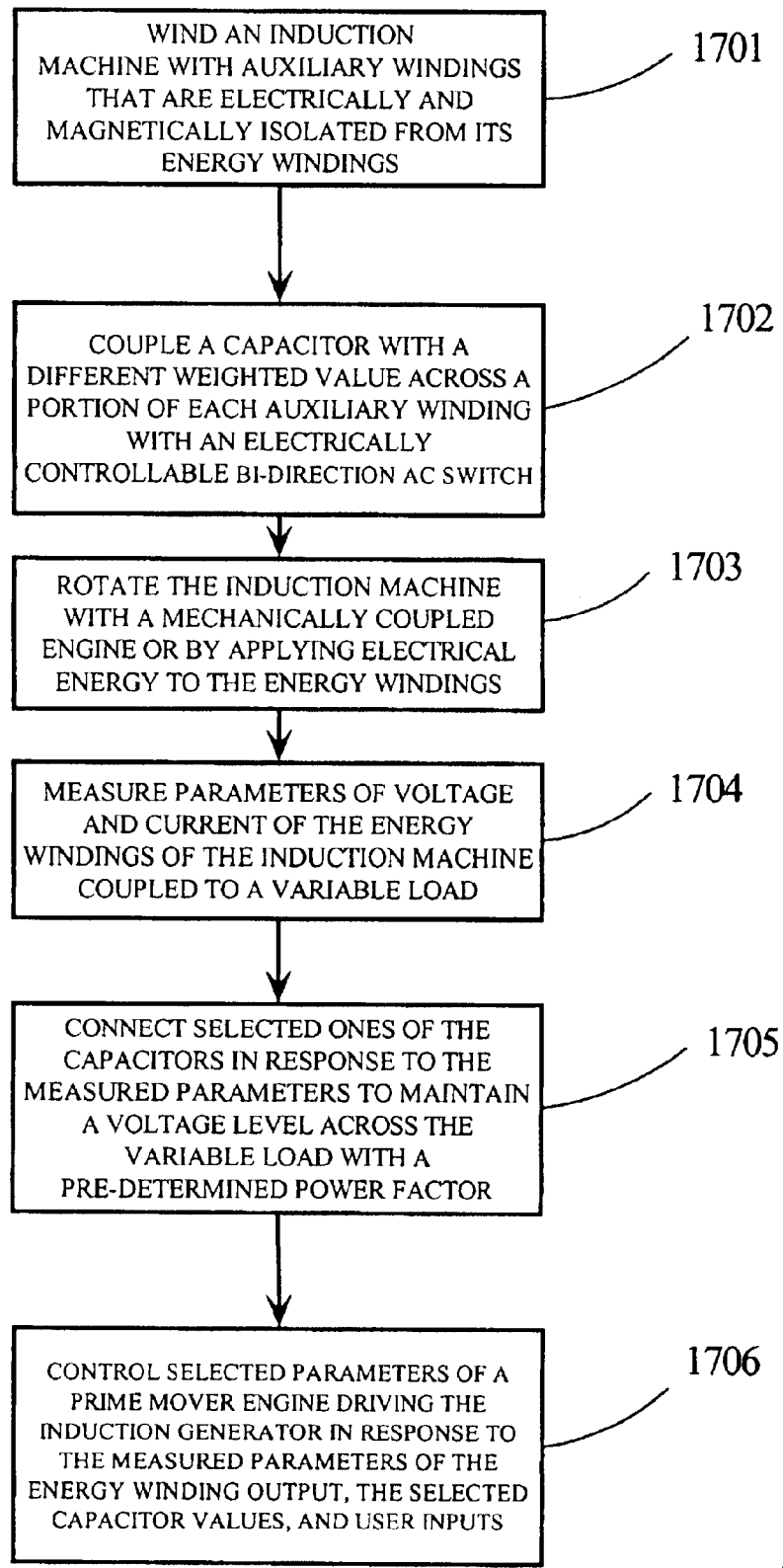
FIG. 17 is a flow diagram method steps in controlling an induction machine according to embodiments of the present invention.

FIG. 17 is a flow diagram of method steps according to embodiments of the present invention for controlling an induction generator. In step 1701, an induction machine (generator/motor) is would with auxiliary windings that are electrically and magnetically isolated from its energy windings. In step 1702, capacitors of different weighted values are coupled via electrically controllable alternating current switches (e.g., a Triac) across a portion of each auxiliary winding. In step 1703, the induction machine is rotated either by a mechanically coupled engine or by a power line excitation of the energy windings. In step 1704, voltage and current parameters of the of the energy windings are measured. These may include magnitude of the voltage and current, frequency of the voltage, as well as phase between voltage and current. In step 1705, selected capacitors are switched into or out of the auxiliary windings according to selected algorithms to maintain the amplitude and power factor of energy delivered to a load. In the method of FIG. 17, the same magnitude capacitors are not required to be switched into or out of each winding, rather the windings may have different values of capacitors. In step 1706, selected parameters of a prime mover engine mechanically coupled to and rotating the induction machine are controlled in response to the measured parameters of the energy winding, the selected capacitor values, and user inputs setting desired set parameters for the energy delivered to the variable load Although the present invention and its advantages have been described in detail, it should be understood that various changes, substitutions and alterations can be made herein without departing from the spirit and scope of the invention as defined by the appended claims.

What is claimed is:

1. A rotary induction machine comprising:
   a cylindrical stator;
   a rotor axially rotatably positioned in the center of said stator;
   rotor windings integral to said rotor;
   a three-phase energy winding integral to said stator and magnetically coupled to said rotor windings;
   a first three-phase auxiliary winding integral to said stator and magnetically coupled to said rotor windings and electrically isolated from said energy winding, said three-phase auxiliary winding comprising three branch windings electrically coupled forming three-phase electrical terminals;
   a first capacitor electrically coupled across each of said three-phase electrical terminals;
   a second capacitor coupled with a first branch switch across a portion of a first one of said three branch windings;
   a control circuit for gating said first branch switch in response to parameters of a first voltage corresponding to a first selected branch winding and parameters of a voltage and a current corresponding to said energy winding;
   a second three-phase auxiliary winding integral to said stator and magnetically coupled to said rotor windings and electrically isolated from said energy winding, said second three-phase auxiliary winding electrically isolated from and magnetically coupled to said first auxiliary winding, said second auxiliary winding comprising three branch windings electrically coupled forming three-phase electrical terminals;
   a fifth capacitor electrically coupled across each of said three-phase electrical terminals of said second auxiliary winding;
   a sixth capacitor coupled with a fourth branch switch across a portion of a first one of said three branch windings of said second auxiliary winding; and
   control signals from said control circuit gating said fourth branch switch in response to parameters of a fourth branch voltage of said second auxiliary winding and said parameters of said voltage and said current of said energy winding.

2. The rotary induction machine of claim 1, wherein a third capacitor is coupled with a second branch switch across a portion of a second one of said three branch windings, said second branch switch gated by said control circuit in response to parameters of a second voltage corresponding to a second selected branch winding and said parameters of said voltage and current corresponding to said energy winding.

3. The rotary induction machine of claim 2, wherein a fourth capacitor is coupled with a third branch switch across a portion of a third one of said three branch windings, said third branch switch gated by said control circuit in response to parameters of a third voltage corresponding to a third selected branch winding and said parameters of said voltage and current corresponding to said energy winding.

4. The rotary induction machine of claim 3, wherein said second, third and fourth capacitors are not equal.

5. The rotary induction machine of claim 1, wherein said first voltage corresponds to the voltage across said second capacitor.

6. The rotary induction machine of claim 1, wherein said parameters of said voltage of said energy winding comprise the output voltage amplitude across a phase of said energy winding supplying a load.

7. The rotary induction machine of claim 1, wherein said parameters of said current of said energy winding comprise the output current amplitude in a phase of said energy winding supplying a load across a phase said energy winding.

8. The rotary induction machine of claim 1, wherein said parameters of said voltage and current of said energy winding comprise the phase relationship of said voltage and said current of said energy winding resulting from a load across said phase of said energy winding.

9. The rotary induction machine of claim 5, wherein said parameter of said first voltage corresponds to a measure of the zero crossing time of said first voltage.

10. The rotary induction machine of claim 1, where said branch switch is gated on based on a first value of said parameter of said first voltage and gated off based on a second value of said parameter of said first voltage.

11. The rotary induction machine of claim 1, wherein said branch switch is an electronic switch operable to conduct alternating current (AC) when gated on.

* * * * *